(12) United States Patent
Tateishi et al.

(10) Patent No.: US 7,087,107 B2
(45) Date of Patent: *Aug. 8, 2006

(54) PHTHALOCYANINE COMPOUND, INK, INKJET RECORDING INK, INK-JET RECORDING METHOD AND METHOD FOR IMPROVING OZONE GAS RESISTANCE OF COLOR IMAGE MATERIAL

(75) Inventors: Keiichi Tateishi, Kanagawa (JP); Masaki Noro, Kanagawa (JP); Yoshiharu Yabuki, Kanagawa (JP); Hideaki Naruse, Kanagawa (JP); Tadashi Omatsu, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 11 days.

This patent is subject to a terminal disclaimer.

(21) Appl. No.: 10/470,730

(22) PCT Filed: Jan. 18, 2002

(86) PCT No.: PCT/JP02/00349

§ 371 (c)(1),
(2), (4) Date: Jul. 31, 2003

(87) PCT Pub. No.: WO02/060994

PCT Pub. Date: Aug. 8, 2002

(65) Prior Publication Data

US 2004/0045478 A1 Mar. 11, 2004

(30) Foreign Application Priority Data

| Jan. 31, 2001 | (JP) | 2001-024352 |
| Feb. 22, 2001 | (JP) | 2001-047013 |
| Mar. 1, 2001 | (JP) | 2001-057063 |
| Mar. 16, 2001 | (JP) | 2001-076689 |
| Mar. 26, 2001 | (JP) | 2001-087690 |
| Mar. 29, 2001 | (JP) | 2001-096610 |
| Jul. 26, 2001 | (JP) | 2001-226275 |

(51) Int. Cl.
C09D 11/00 (2006.01)
C09B 47/04 (2006.01)
B41J 2/01 (2006.01)

(52) U.S. Cl. .............. 106/31.49; 106/31.78; 540/131; 347/100

(58) Field of Classification Search ............. 106/31.49, 106/31.78; 427/466; 540/131; 347/100
See application file for complete search history.

(56) References Cited

U.S. PATENT DOCUMENTS

| 3,365,463 | A | | 1/1968 | Groll et al. | |
| 3,764,360 | A | | 10/1973 | Langley | |
| 4,791,165 | A | * | 12/1988 | Bearss et al. | 524/516 |
| 5,102,459 | A | | 4/1992 | Ritter et al. | |
| 5,183,501 | A | * | 2/1993 | Kawashita et al. | 106/31.44 |
| 6,015,455 | A | * | 1/2000 | Yano et al. | 106/31.58 |
| 6,379,441 | B1 | * | 4/2002 | Kanaya et al. | 106/31.49 |
| 6,517,621 | B1 | * | 2/2003 | Andrievsky et al. | 106/31.49 |
| 6,645,281 | B1 | * | 11/2003 | Yabuki et al. | 106/31.27 |
| 2002/0107301 | A1 | * | 8/2002 | Yamanouchi et al. | 523/160 |
| 2003/0217671 | A1 | * | 11/2003 | Ozawa | 106/31.49 |
| 2004/0035322 | A1 | * | 2/2004 | Ishizuka et al. | 106/31.59 |
| 2004/0045478 | A1 | * | 3/2004 | Tateishi et al. | 106/31.49 |
| 2004/0050291 | A1 | * | 3/2004 | Taguchi et al. | 106/31.27 |
| 2004/0099181 | A1 | * | 5/2004 | Tateishi et al. | 106/31.47 |
| 2004/0154496 | A1 | * | 8/2004 | Taguchi | 106/31.48 |
| 2004/0187734 | A1 | * | 9/2004 | Ozawa et al. | 106/31.27 |
| 2004/0187738 | A1 | * | 9/2004 | Taguchi et al. | 106/31.48 |
| 2005/0073563 | A1 | * | 4/2005 | Hanaki et al. | 347/100 |
| 2005/0081745 | A1 | * | 4/2005 | Ogawa et al. | 106/31.27 |
| 2005/0132927 | A1 | * | 6/2005 | Takeishi et al. | 106/31.47 |

FOREIGN PATENT DOCUMENTS

| EP | 0 418 792 | 3/1991 |
| GB | 1388048 | 3/1975 |
| JP | 4-39365 | 2/1992 |
| JP | 8-034942 A | 2/1996 |
| JP | 2001-288391 A | 10/2001 |
| JP | 2002-121414 | 4/2002 |
| WO | WO 99/13009 | 3/1999 |

OTHER PUBLICATIONS

EPO Search Report dated May 14, 2004 in EP Application No. 02716320.3-2117-JP0200349.
Patent Abstracts of Japan, vol. 1996, NO. 06, Jun. 28, 1996, JP 08-034942.
Database WPI, Section Ch, Week 200223, AN 2002-174300, XP-002278504, JP 2001-288391, Nov. 2001.

* cited by examiner

*Primary Examiner*—Helene Klemanski
(74) *Attorney, Agent, or Firm*—Buchanan Ingersoll PC

(57) ABSTRACT

According to the present invention, a novel phthalocyanine compound having a specific structure is provided, and an ink, an inkjet recording ink, an inkjet recording method and a method for improving preservability of a formed image, each using the compound, are also provided. The novel phthalocyanine compound of the present invention has a sufficiently high fastness to light, heat, humidity and active gases in the environment and by using an ink, particularly inkjet recording ink, containing the phthalocyanine compound, an image having high fastness to light and ozone gas in the environment can be formed.

16 Claims, No Drawings

PHTHALOCYANINE COMPOUND, INK, INKJET RECORDING INK, INK-JET RECORDING METHOD AND METHOD FOR IMPROVING OZONE GAS RESISTANCE OF COLOR IMAGE MATERIAL

TECHNICAL FIELD

The present invention relates to a novel phthalocyanine compound and also relates to an ink, an inkjet recording ink, particularly a water-soluble cyan color inkjet recording ink, an inkjet recording method and a method for improving the ozone gas resistance of a formed color image material, each using the compound.

BACKGROUND ART

In recent years, the image recording material is predominated by a material particularly for forming a color image and specifically, a recording material using an inkjet system, an image recording material using a heat-sensitive transfer system, a recording material using an electrophotographic system, a silver halide light-sensitive material using a transfer system, a printing ink, a recording pen and the like are popularly used. Also, a color filter is used in a display such as LCD and PDP or in an electronic component such as CCD of photographing equipment.

In these color image recording materials or color filters, three primary color dyes (dyes or pigments) by a so-called additive or subtractive color mixing method are used for reproducing or recording a full color image, however, a dye having absorption properties capable of realizing a preferred color reproduction region and having fastness capable of enduring various use conditions is not found at present and improvements are keenly demanded.

The inkjet recording method has been abruptly spread and is further growing because the material cost is low, high-speed recording can be obtained, noises are less generated at the recording and color recording is easy.

The inkjet recording method includes a continuous system of continuously jetting out a liquid droplet and an on-demand system of jetting out a liquid droplet according to image information signals, and the ejection system therefor includes a system of ejecting a liquid droplet by applying a pressure using a piezoelectric element, a system of ejecting a liquid droplet by generating a bubble in the ink using heat, a system of using an ultrasonic wave, and a system of ejecting a liquid droplet by suction using an electrostatic force.

The ink used for inkjet recording includes an aqueous ink, an oily ink and a solid (fusion-type) ink.

The dye used in these inkjet recording inks is required to have good solubility or dispersibility in a solvent, enable high-density recording, provide good color, have fastness to light, heat and active gases in the environment (for example, oxidative gas (e.g., NOx, ozone) and SOx), exhibit excellent resistance against water and chemicals, ensure good fixing property to an image-receiving material to cause less blurring, give an ink having excellent storability, have no toxicity and high purity and be available at a low cost.

In particular, a dye having good cyan color and fastness to light and active gases in the environment, particularly oxidative gases such as ozone, is strongly demanded.

A representative skeleton of the cyan dye used in a water-soluble ink for inkjet recording is phthalocyanine or triphenylmethane.

Representative examples of the phthalocyanine dye which has been reported and is used over the widest range include phthalocyanine derivatives classified into the following (1) to (6):

(1) copper phthalocyanine-base dyes such as Direct Blue 86 and Direct blue 87 [for example, $Cu\text{-}Pc\text{-}(SO_3Na)_m$: a mixture of m=1 to 4] (Pc in this formula and used hereinafter means a phthalocyanine skeleton);

(2) Direct Blue 199 and phthalocyanine-base dyes described in JP-A-62-190273 (the term "JP-A" as used herein means an "unexamined published Japanese patent application"), JP-A-63-28690, JP-A-63-306075, JP-A-63-306076, JP-A-2-131983, JP-A-3-122171, JP-A-3-200883, JP-A-7-138511, etc. [for example, $Cu\text{-}Pc\text{-}(SO_3Na)_m(SO_2NH_2)_n$: a mixture of m+n=1 to 4];

(3) phthalocyanine-base dyes described in JP-A-63-210175, JP-A-63-37176, JP-A-63-304071, JP-A-5-171085, WO00/08102, etc. [for example, $Cu\text{-}Pc\text{-}(CO_2H)_m(CONR_1R_2)_n$: m+n=a number of 0 to 4];

(4) phthalocyanine-base dyes described in JP-A-59-30874, JP-A-1-126381, JP-A-1-190770, JP-A-6-16982, JP-A-7-82499, JP-A-8-34942, JP-A-8-60053, JP-A-8-113745, JP-A-8-310116, JP-A-10-140063, JP-A-10-298463, JP-A-11-29729, JP-A-11-320921, EP-A-173476, EP-A-468649, EP-A-559309, EP-A-596383, German Patent 3,411,476, U.S. Pat. No. 6,086,955, WO99/13009, UK-A-2341868, etc. [for example, $Cu\text{-}Pc\text{-}(SO_3H)_m(SO_2NR_1R_2)_n$: m+n=a number of 0 to 4 and m≠0];

(5) phthalocyanine-base dyes described in JP-A-60-208365, JP-A-61-2772, JP-A-6-57653, JP-A-8-60052, JP-A-8-295819, JP-A-10-130517, JP-A-11-72614, JP-T-11-515047 (the term "JP-T" as used herein means a "published Japanese translation of a PCT patent application"), JP-T-11-515048, EP-A-196901, WO95/29208, WO98/49239, WO98/49240, WO99/50363, WO99/67334, etc. [for example, $Cu\text{-}Pc\text{-}(SO_3H)\ 1\ (SO_2NH_2)_m\text{---}(SO_2NR_1R_2)_n$: 1+m+n=a number of 0 to 4]; and (6) phthalocyanine-base dyes described in JP-A-59-22967, JP-A-61-185576, JP-A-1-95093, JP-A-3-195783, EP-A-649881, WO00/08101, WO00/08103, etc. [for example, $Cu\text{-}Pc\text{-}(SO_2NR_1R_2)_n$: n=a number of 1 to 5].

Phthalocyanine-base dyes widely used in general at present, represented by Direct Blue 87 and Direct Blue 199, are excellent in the light fastness as compared with generally known magenta dyes and yellow dyes.

The phthalocyanine-base dye provides a green-tinted color hue under acidic conditions and is improper for a cyan ink. In the case of using this dye for a cyan ink, the dye is most suitably used under conditions from neutral to alkaline. However, even when the ink is in the region from neutral to alkaline, if the material on which an image or the like is recorded is an acidic paper, the color hue of the printed matter may greatly change.

Furthermore, discoloration to a green tint or decoloration occurs due to oxidative gases such as nitrogen oxide gas and ozone, which are often taken as a problem also from an environmental issue, and this simultaneously causes reduction in the printing density.

On the other hand, the triphenylmethane-base dye provides a good color hue but is very inferior in the light fastness, resistance against ozone gas and the like.

If the use field hereafter expands and the printed matter is widely used for exhibition such as advertisement, the case of being exposed to light or active gases in the environment increases and to cope with this, a dye and an ink composition having good color hue, high light fastness and excellent resistance against active gases (for example, oxidative gas (e.g., NOx, ozone) and SOx) in the environment are more strongly demanded.

However, it is very difficult to find out a cyan dye (for example, phthalocyanine-base dye) and a cyan ink satisfying these requirements in a high level.

The phthalocyanine-base dyes imparted with ozone gas resistance are heretofore disclosed, for example, in JP-A-3-

103484, JP-A-4-39365 and JP-A-2000-303009, however, none of these dyes have succeeded in satisfying both the color and the fastness to light and oxidative gases. A cyan ink product fully satisfying the requirements on the market is not yet provided.

DISCLOSURE OF THE INVENTION

The present invention has been made to solve those problems in conventional techniques and achieve the following objects. That is, an object of the present invention is to provide:

(1) a novel dye having absorption properties ensuring excellent color reproduction as a dye for three primary colors and at the same time, having sufficiently high fastness to light, heat, humidity and active gases in the environment;

(2) various coloring compositions of giving a color image or a color material excellent in the color hue and fastness, for example, an ink composition for printing by ink jetting or the like, an ink sheet of a heat-sensitive transfer type image forming material, an electrophotographic toner, a coloring composition for a color filter used in LCD, PDP or CCD, and a dyeing solution for the dyeing of various fibers; and (3) an inkjet recording ink and an inkjet recording method, which can form an image having good color hue by the use of a phthalocyanine dye derivative and having high fastness to light and active gases in the environment, particularly ozone gas.

As a result of extensive investigations on phthalocyanine compounds of giving good color hue and high fastness to light and gases (particularly ozone gas), the present inventors have found that the above-described object can be attained by a phthalocyanine compound having conventionally unknown specific oxidation potential and specific dye structure (where specific substituent species are introduced into specific substitution sites in a specific number of substituents), and further by a phthalocyanine compound represented by the following formula (I), (II), (III), (IV), (V) or (VI). The present invention has been accomplished based on this finding. More specifically, the present invention provides the followings.

1. An ink comprising at least one compound represented by the following formula (I) or (II): Formula (I):

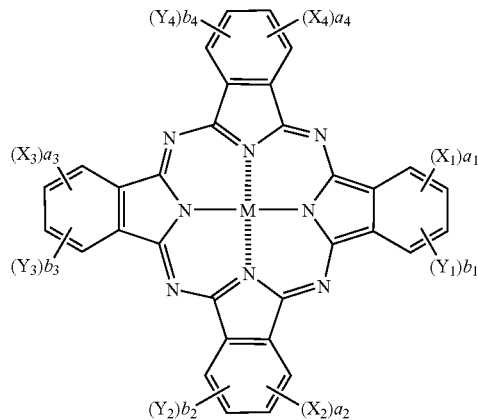

wherein $X_1$, $X_2$, $X_3$ and $X_4$ each independently represents —SO—Z or —SO$_2$—Z, wherein each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_1$ to $a_4$ and $b_1$ to $b_4$ represent the number of substituents $X_1$ to $X_4$ and $Y_1$ to $Y_4$, respectively, $a_1$ to $a_4$ each independently represents an integer of 0 to 4, provided that all are not 0 at the same time, and $b_1$ to $b_4$ each independently represents an integer of 0 to 4; and M represents a hydrogen atom, a metal element or an oxide, hydroxide or halide thereof;

provided that at least one of $X_1$, $X_2$, $X_3$, $X_4$, $Y_1$, $Y_2$, $Y_3$ and $Y_4$ is an ionic hydrophilic group or a group having an ionic hydrophilic group as a substituent;

Formula (II):

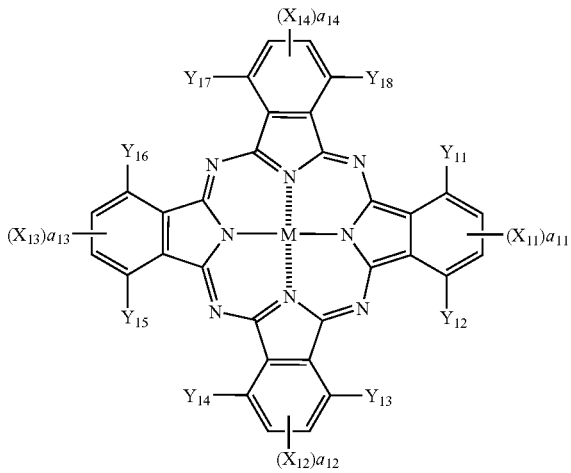

wherein $X_{11}$, $X_{12}$, $X_{13}$ and $X_{14}$ each independently represents —SO$_2$NR$_1$R$_2$ and/or a sulfo group, provided that $X_{11}$, $X_{12}$, $X_{13}$ and $X_{14}$ all are not a sulfo group at the same time above, wherein $R_1$ represents, when a plurality of $R_1$s are present, each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, $R_2$ represents, when a plurality of $R_2$s are present, each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, and $R_1$ and $R_2$ may combine with each other to form a 5- or 6-membered nitrogen-containing heterocyclic ring;

$Y_{11}$, $Y_{12}$, $Y_{13}$, $Y_{14}$, $Y_{15}$, $Y_{16}$, $Y_{17}$ and $Y_{18}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_{11}$ to $a_{14}$ represent the number of substituents $X_{11}$ to $X_{14}$, respectively, and each independently represents an integer of 0 to 2, provided that all are not 0 at the same time; and M represents a hydrogen atom, a metal element or an oxide, hydroxide or halide thereof;

provided that at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$ and $Y_{18}$ is an ionic hydrophilic group or a group having an ionic hydrophilic group as a substituent.

2. The ink as described in 1 above, wherein the compound represented by formula (I) or (II) contains at least one compound represented by the following formula (III) or (IV):

Formula (III):

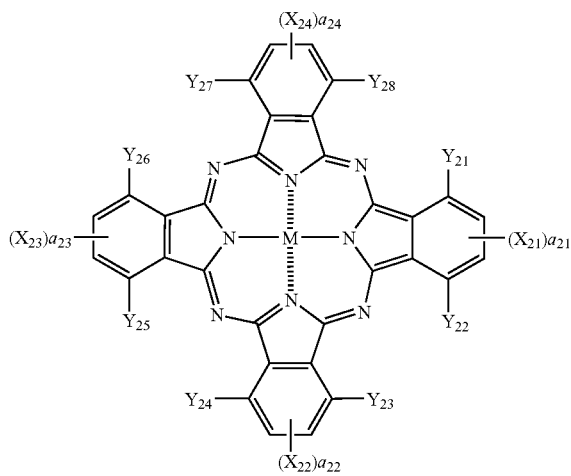

wherein $X_{21}$, $X_{22}$, $X_{23}$ and $X_{24}$ each independently represents —SO—Z and/or —SO$_2$—Z, wherein each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_{21}$, $Y_{22}$, $Y_{23}$, $Y_{24}$, $Y_{25}$, $Y_{26}$, $Y_{27}$ and $Y_{28}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_{21}$ to $a_{24}$ represent the number of substituents $X_{21}$ to $X_{24}$, respectively, and each independently represents an integer of 1 to 2; and M has the same meaning as M in formula (I);

provided that at least one of $X_{21}$, $X_{22}$, $X_{23}$, $X_{24}$, $Y_{21}$, $Y_{22}$, $Y_{23}$, $Y_{24}$, $Y_{25}$, $Y_{26}$, $Y_{27}$ and $Y_{28}$ is an ionic hydrophilic group or a group having an ionic hydrophilic group as a substituent;

Formula (IV):

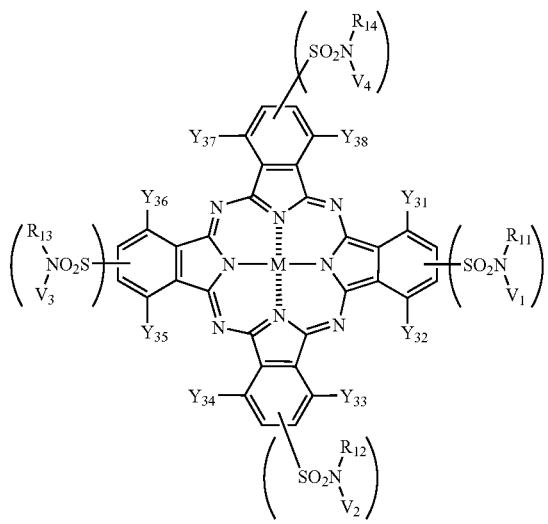

wherein $R_{11}$, $R_{12}$, $R_{13}$ and $R_{14}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$V_1$, $V_2$, $V_3$ and $V_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_{31}$, $Y_{32}$, $Y_{33}$, $Y_{34}$, $Y_{35}$, $Y_{36}$, $Y_{37}$ and $Y_{38}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent; and M has the same meaning as M in formula (I);

provided that at least one of $R_{11}$, $R_{12}$, $R_{13}$, $R_{14}$, $V_1$, $V_2$, $V_3$, $V_4$, $Y_{31}$, $Y_{32}$, $Y_{33}$, $Y_{34}$, $Y_{35}$, $Y_{36}$, $Y_{37}$ and $Y_{38}$ is an ionic hydrophilic group or a group having an ionic hydrophilic group as a substituent.

3. The ink as described in 1 above, wherein the compound represented by formula (I) or (II) contains at least one phthalocyanine compound represented by the following formula (V) or (IV):

Formula (V):

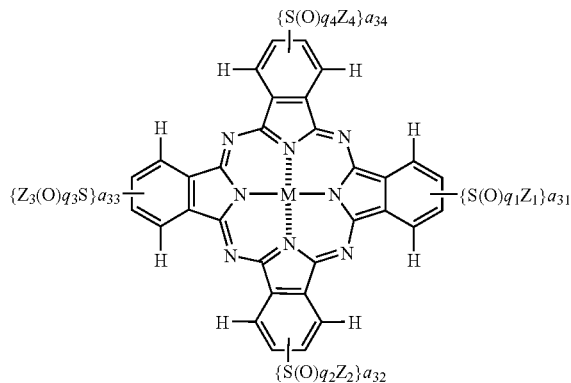

wherein $Z_1$, $Z_2$, $Z_3$ and $Z_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$q_1$, $q_2$, $q_3$ and $q_4$ each independently represents an integer of 1 or 2;

$a_{31}$, $a_{32}$, $a_{33}$ and $a_{34}$ each independently represents an integer of 1 or 2; and M has the same meaning as M in formula (I);

provided that at least one of $Z_1$, $Z_2$, $Z_3$ and $Z_4$ has an ionic hydrophilic group as a substituent;

Formula (VI):

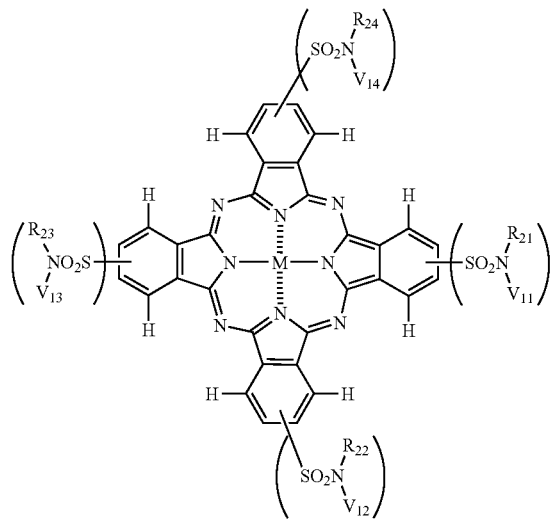

wherein $R_{21}$, $R_{22}$, $R_{23}$ and $R_{24}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$V_{11}$, $V_{12}$, $V_{13}$ and $V_{14}$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; and M has the same meaning as M in formula (I);

provided that at least one of $R_{21}$, $R_{22}$, $R_{23}$, $R_{24}$, $V_{11}$, $V_{12}$, $V_{13}$ and $V_{14}$ has an ionic hydrophilic group as a substituent.

4. The ink as described in any one of 1 to 3 above, wherein the phthalocyanine compound represented by formulae (I) to (VI) has at least two ionic hydrophilic groups selected from a carboxyl group, a sulfo group and a quaternary ammonium within one molecule.

5. The ink as described in 4 above, wherein the ionic hydrophilic group is at least either a carboxyl group or a sulfo group.

6. The ink as described in any one of 1 to 5 above, which is an inkjet recording ink.

7. The ink as described in any one of 1 to 5 above, which contains the phthalocyanine compound represented by formulae (I) to (IV) in an amount of 0.2% by mass to 10 parts by mass per 100 parts by mass of the ink.

8. An inkjet recording method, comprising forming an image using the inkjet recording ink described in 6 above on an image-receiving material having an ink-accepting layer containing a white inorganic pigment particle on a support.

9. A method for improving an ozone gas resistance of a color image material, comprising forming an image using the inkjet recording ink described in 6 above.

10. An ink comprising a phthalocyanine compound having an oxidation potential nobler than 1.0 V (vs SCE).

11. A phthalocyanine compound represented by either formula (I) or (II).

12. The phthalocyanine compound as described in 11 above, wherein either one of formulae (I) and (II) is represented by either one of formulae (III) and (IV).

13. The phthalocyanine compound as described above, which is represented by either formula (V) or (VI).

BEST MODE FOR CARRYING OUT THE INVENTION

The present invention is described in detail below.

[Phthalocyanine Compound]

In the present invention, a phthalocyanine compound having an oxidation potential nobler than 1.0 V (vs SCE) is used. A nobler oxidation potential is more preferred and the oxidation potential is preferably nobler than 1.10 V (vs SCE) and most preferably nobler than 1.15 V (vs SCE).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho* (*Electrochemical Measuring Method*), Gihodo Shuppan Sha (1984).

More specifically, a test sample is dissolved to a concentration of $1 \times 10^{-4}$ to $1 \times 10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) using a cyclic voltammetry or a direct current polarography. This value sometimes deviates on the order of tens of millivolt due to the effect of liquid junction potential, liquid resistance of sample solution, or the like, however, the reproducibility of potential can be guaranteed by adding a standard sample (for example, hydroquinone). The supporting electrolyte and solvent used can be appropriately selected according to the oxidation potential or solubility of the test sample. The supporting electrolyte and solvent which can be used are described in Akira Fujishima et al., *Denkikagaku Sokutei Ho (Electrochemical Measuring Method)*, pp. 101–118, Gihodo Shuppan Sha (1984).

The Eox value indicates the transferability of an electron from the sample to the electrode and as the value is larger (the oxidation potential is nobler), the electron is less transferable from the sample to the electrode, in other words, the oxidation less occurs. As for the relationship with the structure of compound, the oxidation potential becomes nobler by introducing an electron withdrawing group and becomes baser by introducing an electron donating group. In the present invention, the oxidation potential is preferably rendered nobler by introducing an electron withdrawing group into the phthalocyanine skeleton so as to reduce the reactivity with ozone which is an electrophilic agent. Accordingly, when the Hammett's substituent constant σp value as a measure for the electron withdrawing property or electron donating property of substituent is used, the oxidation potential can be rendered nobler by introducing a substituent having a large σp value, such as sulfinyl group, sulfonyl group, sulfamoyl group and sulfonylsulfamoyl group.

Here, the Hammett's substituent constant σp value used in the present invention is briefly described. The Hammett's rule is a rule of thumb advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki (Chemistry Region)*, special number, No. 122, pp. 96–103, Nankodo (1979). In the present invention, each substituent is limited or described using the Hammett's substituent constant σp value but this does not mean that the substituent is limited only to those having a known value which can be found in the publications. Needless to say, the substituent includes substituents of which σp value is not known in publications but when measured based on the Hammett's rule, falls within the range specified. The σp value is used as a measure for showing the electron effect of the substituent in the compounds represented by formulae (I), (II), (III), (IV), (V) and (VI) of the present invention, irrespective of the substitution site. In the present invention, the σp value is hereinafter used in this meaning.

The phthalocyanine compound of the present invention includes a salt and a hydrate thereof in addition to the phthalocyanine compound itself.

The phthalocyanine compounds represented by formulae (I) and (II) of the present invention are described in detail below.

Formula (I):

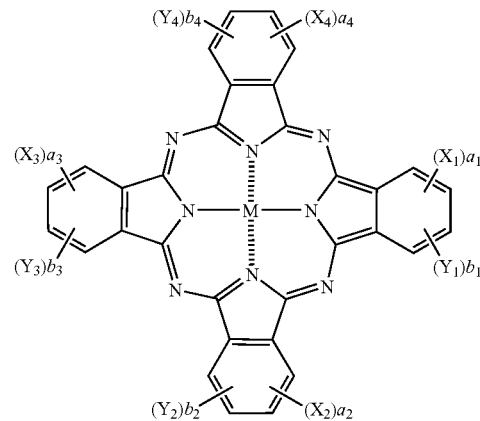

Formula (II):

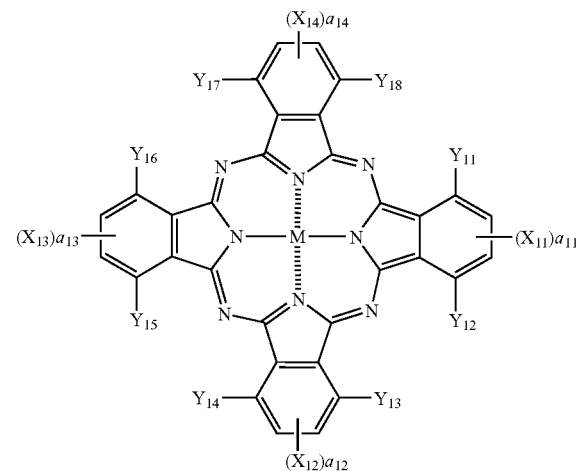

In formula (I), $X_1$, $X_2$, $X_3$ and $X_4$ each independently represents —SO—Z or —SO$_2$—Z, preferably —SO$_2$—Z.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, still more preferably a substituted alkyl group or a substituted aryl group, and most preferably a substituted alkyl group.

In formula (II), $X_{11}$, $X_{12}$, $X_{13}$ and $X_{14}$ each independently represents —SO$_2$NR$_1$R$_2$ or a sulfo group, preferably —SO$_2$NR$_1$R$_2$, provided that $X_{11}$, $X_{12}$, $X_{13}$ and $X_{14}$ all are not a sulfo group at the same time. R$_1$ and R$_2$ may combine with each other to form a 5- or 6-membered nitrogen-containing heterocyclic ring.

Each R$_1$ independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, still more preferably a hydrogen atom or a substituted alkyl group, and most preferably a hydrogen atom.

Each $R_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, still more preferably a substituted alkyl group or a substituted aryl group, and most preferably a substituted alkyl group.

The substituted or unsubstituted alkyl group represented by $R_1$, $R_2$ and Z is preferably an alkyl group having from 1 to 30 carbon atoms. Examples of the substituent include those described later as the substituent when Z, $R_1$, $R_2$, $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ can further have a substituent. In particular, a hydroxyl group, an alkoxy group, a cyano group, a halogen atom and an ionic hydrophilic group are preferred.

The substituted or unsubstituted cycloalkyl group represented by $R_1$, $R_2$ and Z is preferably a cycloalkyl group having from 5 to 30 carbon atoms. Examples of the substituent include those described later as the substituent when Z, $R_1$, $R_2$, $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ can further have a substituent. In particular, a hydroxyl group, an alkoxy group, a cyano group, a halogen atom and an ionic hydrophilic group are preferred.

The substituted or unsubstituted alkenyl group represented by $R_1$, $R_2$ and Z is preferably an alkenyl group having from 2 to 30 carbon atoms. Examples of the substituent include those described later as the substituent when Z, $R_1$, $R_2$, $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ can further have a substituent. In particular, a hydroxyl group, an alkoxy group, a cyano group, a halogen atom and an ionic hydrophilic group are preferred.

The substituted or unsubstituted aralkyl group represented by $R_1$, $R_2$ and Z is preferably an aralkyl group having from 7 to 30 carbon atoms. Examples of the substituent include those described later as the substituent when Z, $R_1$, $R_2$, $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ can further have a substituent. In particular, a hydroxyl group, an alkoxy group, a cyano group, a halogen atom and an ionic hydrophilic group are preferred.

The substituted or unsubstituted aryl group represented by $R_1$, $R_2$ and Z is preferably an aryl group having from 6 to 30 carbon atoms. Examples of the substituent include those described later as the substituent when Z, $R_1$, $R_2$, $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ can further have a substituent. In particular, a hydroxyl group, an alkoxy group, a cyano group, a halogen atom and an ionic hydrophilic group are preferred.

The heterocyclic group represented by $R_1$, $R_2$ and Z is preferably a 5- or 6-membered ring and the ring may be further condensed. Also, the heterocyclic group may be an aromatic heterocyclic group or a non-aromatic heterocyclic group. Examples of the heterocyclic group represented by $R_1$, $R_2$ and Z are shown below in the form of a heterocyclic ring by omitting the substitution site. The substitution site is not limited and for example, pyridine may be substituted at the 2-position, 3-position and 4-position. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole.

These groups each may have a substituent and examples of the substituent include those described later as the substituent when Z, $R_1$, $R_2$, $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ can further have a substituent. In particular, a hydroxyl group, an alkoxy group, a cyano group, a halogen atom and an ionic hydrophilic group are preferred.

$Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group, and these groups each may further have a substituent.

Among these, preferred are a hydrogen atom, a halogen atom, an alkyl group, an aryl group, a cyano group, an alkoxy group, an amido group, a ureido group, a sulfonamido group, a carbamoyl group, an alkoxycarbonyl group, a carboxyl group and a sulfo group, more preferred are a hydrogen atom, a halogen atom, a cyano group, a carboxyl group and a sulfo group, and most preferred is a hydrogen atom.

When Z, $R_1$, $R_2$, $Y_1$, $Y_2$, $Y_3$, $Y_4$, $Y_{11}$ $Y_{12}$, $Y_{13}$, $Y_{14}$, $Y_{15}$, $Y_{16}$, $Y_{17}$ and $Y_{18}$ each is a group which can further have a substituent, the group may further have the following substituent.

Examples of the substituent which is further substituted include a halogen atom (e.g., chlorine, bromine), a linear or branched alkyl group having from 1 to 12 carbon atoms, an aralkyl group having from 7 to 18 carbon atoms, an alkenyl group having from 2 to 12 carbon atoms, a linear or branched alkynyl group having from 2 to 12 carbon atoms, a cycloalkyl group having from 3 to 12 carbon atoms, which may have a side chain, and a cycloalkenyl group having from 3 to 12 carbon atoms, which may have a side chain. More specific examples thereof include an alkyl group (e.g., methyl, ethyl, propyl, isopropyl, tert-butyl, 2-methanesulfonylethyl, 3-phenoxypropyl, trifluoromethyl, cyclopentyl), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido, octadecane), a carbamoyl group (e.g., N-ethylcarbamoyl, N,N-dibutylcarbamoyl), a sulfamoyl group (e.g., N-ethylsulfamoyl, N,N-dipropylsulfamoyl, N,N-diethylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylamino-phenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), an ionic hydrophilic group (e.g., carboxyl, sulfo, quaternary ammonium, sulfonylsulfamoyl, acylsulfamoyl), a cyano group, a hydroxyl group, a nitro group, a carboxyl group and an amino group.

Examples of the halogen atom represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ include a fluorine atom, a chlorine atom and a bromine atom.

The alkyl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an alkyl group having a substituent and an unsubstituted alkyl group. The alkyl group is preferably an alkyl group having from 1 to 30 carbon atoms. Examples of the substituent include a hydroxyl group, an alkoxy group, a cyano group, a halogen atom and an ionic hydrophilic group. Examples of the alkyl group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group and a 4-sulfobutyl group.

The cycloalkyl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a cycloalkyl group having a substituent and an unsubstituted cycloalkyl group. The cycloalkyl group is preferably a cycloalkyl group having from 5 to 30 carbon atoms. Examples of the substituent include an ionic hydrophilic group. Examples of the cycloalkyl group include a cyclohexyl group.

The alkenyl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an alkenyl group having a substituent and an unsubstituted alkenyl group. The alkenyl group is preferably an alkenyl group having from 2 to 30 carbon atoms. Examples of the substituent include an ionic hydrophilic group. Examples of the alkenyl group include a vinyl group and an allyl group.

The aralkyl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ include an aralkyl group having a substituent and an unsubstituted aralkyl group. The aralkyl group is preferably an aralkyl group having from 7 to 30 carbon atoms. Examples of the substituent include an ionic hydrophilic group. Examples of the aralkyl group include a benzyl group and a 2-phenethyl group.

The aryl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an aryl group having a substituent and an unsubstituted aryl group. The aryl group is preferably an aryl group having from 6 to 30 carbon atoms. Examples of the substituent include an alkyl group, an alkoxy group, a halogen atom, an alkylamino group and an ionic hydrophilic group. Examples of the aryl group include a phenyl group, a p-tolyl group, a p-methoxyphenyl group, an o-chlorophenyl group and an m-(3-sulfopropylamino)phenyl group.

The heterocyclic group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a heterocyclic group having a substituent and an unsubstituted heterocyclic group. The heterocyclic group is preferably a 5- or 6-membered heterocyclic group. Examples of the substituent include an ionic hydrophilic group. Examples of the heterocyclic group include a 2-pyridyl group, a 2-thienyl group and a 2-furyl group.

The alkylamino group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ include an alkylamino group having a substituent and an unsubstituted alkylamino group. The alkylamino group is preferably an alkylamino group having from 1 to 30 carbon atoms. Examples of the substituent include an ionic hydrophilic group. Examples of the alkylamino group include a methylamino group and a diethylamino group.

The alkoxy group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an alkoxy group having a substituent and an unsubstituted alkoxy group. The alkoxy group is preferably an alkoxy group having from 1 to 30 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an aryloxy group having a substituent and an unsubstituted aryloxy group. The aryloxy group is preferably an aryloxy group having from 6 to 30 carbon atoms. Examples of the substituent include an alkoxy group and an ionic hydrophilic group. Examples of the aryloxy group include a phenoxy group, a p-methoxyphenoxy group and an o-methoxyphenoxy group.

The amido group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an amido group having a substituent and an unsubstituted amido group. The amido group is preferably an amido group having from 2 to 30 carbon atoms. Examples of the substituent include an ionic hydrophilic group. Examples of the amido group include an acetamido group, a propionamido group, a benzamido group and a 3,5-disulfobenzamido group.

The arylamino group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an arylamino group having a substituent and an unsubstituted arylamino group. The arylamino group is preferably an arylamino group having from 6 to 30 carbon atoms. Examples of the substituent include a halogen atom and an ionic hydrophilic group. Examples of the arylamino group include an anilino group and a 2-chloroanilino group.

The ureido group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a ureido group having a substituent and an unsubstituted ureido group. The ureido group is preferably a ureido group having from 1 to 30 carbon atoms. Examples of the substituent include an alkyl group and an aryl group. Examples of the ureido group include a 3-methylureido group, a 3,3-dimethylureido group and a 3-phenylureido group.

The sulfamoylamino group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a sulfamoylamino group having a substituent and an unsubstituted sulfamoylamino group. Examples of the substituent include an alkyl group. Examples of the sulfamoylamino group include an N,N-dipropylsulfamoylamino group.

The alkylthio group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an alkylthio group having a substituent and an unsubstituted alkylthio group. The alkylthio group is preferably an alkylthio group having from 1 to 30 carbon atoms. Examples of the substituent include an ionic hydrophilic group. Examples of the alkylthio group include a methylthio group and an ethylthio group.

The arylthio group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an arylthio group having a substituent and an unsubstituted arylthio group. The arylthio group is preferably an arylthio group having from 6 to 30 carbon atoms. Examples of the substituent include an alkyl group and an ionic hydrophilic group. Examples of the arylthio group include a phenylthio group and a p-tolylthio group.

The alkoxycarbonylamino group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an alkoxycarbonylamino group having a substituent and an unsubstituted alkoxycarbonylamino group. The alkoxycarbonylamino group is preferably an alkoxycarbonylamino group having from 2 to 30 carbon atoms. Examples of the substituent include an ionic hydrophilic group. Examples of the alkoxycarbonylamino group include an ethoxycarbonylamino group.

The sulfonamido group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a sulfonamido group having a substituent and an unsubstituted sulfonamido group. The sulfonamido group is preferably a sulfonamido group having from 1 to 30 carbon atoms. Examples of the substituent include an ionic hydrophilic group. Examples of the sulfonamido group include methanesulfonamido, benzenesulfonamido and 3-carboxybenzenesulfonamido.

The carbamoyl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a carbamoyl group having a substituent and an unsubstituted carbamoyl group. Examples of the substituent include an alkyl group. Examples of the carbamoyl group include a methylcarbamoyl group and a dimethylcarbamoyl group.

The alkoxycarbonyl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an alkoxycarbonyl group having a substituent and an unsubstituted alkoxycarbonyl group. The alkoxycarbonyl group is preferably an alkoxycarbonyl group having from 2 to 30 carbon atoms. Examples of the substituent include an ionic hydrophilic group. Examples of the alkoxycarbonyl group include a methoxycarbonyl group and an ethoxycarbonyl group.

The heterocyclic oxy group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a heterocyclic oxy group having a substituent and an unsubstituted heterocyclic oxy group. The heterocyclic oxy group is preferably a heterocyclic oxy group having a 5- or 6-membered heterocyclic ring. Examples of the substituent include a hydroxyl group and an ionic hydrophilic group. Examples of the heterocyclic oxy group include a 2-tetrahydropyranyloxy group.

The azo group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an azo group having a substituent and an unsubstituted azo group. Examples of the azo group include a p-nitrophenylazo group.

The acyloxy group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an acyloxy group having a substituent and an unsubstituted acyloxy group. The acyloxy group is preferably an acyloxy group having from 1 to 30 carbon atoms. Examples of the substituent include an ionic hydrophilic group. Examples of the acyloxy group include an acetoxy group and a benzoyloxy group.

The carbamoyloxy group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a carbamoyloxy group having a substituent and an unsubstituted carbamoyloxy group. Examples of the substituent include an alkyl group. Examples of the carbamoyloxy group include an N-methylcarbamoyloxy group.

The silyloxy group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a silyloxy group having a substituent and an unsubstituted silyloxy group. Examples of the substituent include an alkyl group. Examples of the silyloxy group include a trimethylsilyloxy group.

The aryloxycarbonyl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an aryloxycarbonyl group having a substituent and an unsubstituted aryloxycarbonyl group. The aryloxycarbonyl group is preferably an aryloxycarbonyl group having from 7 to 30 carbon atoms. Examples of the substituent include an ionic hydrophilic group. Examples of the aryloxycarbonyl group include a phenoxycarbonyl group.

The aryloxycarbonylamino group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an aryloxycarbonylamino group having a substituent and an unsubstituted aryloxycarbonylamino group. The aryloxycarbonylamino group is preferably an aryloxycarbonylamino group having from 7 to 30 carbon atoms. Examples of the substituent include an ionic hydrophilic group. Examples of the aryloxycarbonylamino group include a phenoxycarbonylamino group.

The imido group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an imido group having a substituent and an unsubstituted imido group. Examples of the imido group include an N-phthalimido group and an N-succinimido group.

The heterocyclic thio group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a heterocyclic thio group having a substituent and an unsubstituted heterocyclic thio group. The heterocyclic thio group preferably has a 5- or 6-membered heterocyclic ring. Examples of the substituent include an ionic hydrophilic group. Examples of the heterocyclic thio group include a 2-pyridylthio group.

The phosphoryl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes a phosphoryl group having a substituent and an unsubstituted phosphoryl group. Examples of the phosphoryl group include a phenoxyphosphoryl group and a phenylphosphoryl group.

The acyl group represented by $Y_1$, $Y_2$, $Y_3$, $Y_4$, $Y_{11}$, $Y_{12}$, $Y_{13}$, $Y_{14}$, $Y_{15}$, $Y_{16}$, $Y_{17}$ and $Y_{18}$ includes an acyl group having a substituent and an unsubstituted acyl group. The acyl group is preferably an acyl group having from 1 to 12 carbon atoms. Examples of the substituent include an ionic hydrophilic group. Examples of the acyl group include an acetyl group and a benzoyl group.

In formula (I), $a_1$ to $a_4$ and $b_1$ to $b_4$ represent the number of the substituents $X_1$ to $X_4$ and $Y_1$ to $Y_4$, respectively. $a_1$ to $a_4$ each is independently an integer of 0 to 4 and $b_1$ to $b_4$ each independently an integer of 0 to 4. Here, when $a_1$ to $a_4$ and $b_1$ to $b_4$ each is an integer of 2 or more, the plurality of $X_1$s, $X_2$s, $X_3$s, $X_4$s, $Y_1$s, $Y_2$s, $Y_3$s or $Y_4$s may be the same of different.

$a_1$ and $b_1$ satisfy the relationship of $a_1+b_1=4$ and each independently represents an integer of 0 to 4. In particular, a combination where $a_1$ is 1 or 2 and $b_1$ is 3 or 2 is preferred and a combination where $a_1$ is 1 and $b_1$ is 3 is most preferred.

$a_2$ and $b_2$ satisfy the relationship of $a_2+b_2=4$ and each independently represents an integer of 0 to 4. In particular, a combination where $a_2$ is 1 or 2 and $b_2$ is 3 or 2 is preferred and a combination where $a_2$ is 1 and $b_2$ is 3 is most preferred.

$a_3$ and $b_3$ satisfy the relationship of $a_3+b_3=4$ and each independently represents an integer of 0 to 4. In particular, a combination where $a_3$ is 1 or 2 and $b_3$ is 3 or 2 is preferred and a combination where $a_3$ is 1 and $b_3$ is 3 is most preferred.

$a_4$ and $b_4$ satisfy the relationship of $a_4+b_4=4$ and each independently represents an integer of 0 to 4. In particular, a combination where $a_4$ is 1 or 2 and $b_2$ is 3 or 2 is preferred and a combination where $a_4$ is 1 and $b_4$ is 3 is most preferred.

In formula (II), $a_{11}$ to $a_{14}$ represent the number of substituents $X_{11}$ to $X_{14}$, respectively, and each represents an integer of 0 to 2, provided that $a_{11}$ to $a_{14}$ all are not 0 at the same time. $a_{11}$ to $a_{14}$ each is independently preferably 1. In particular, $a_{11}=a_{12}=a_{13}=a_{14}=1$ is more preferred.

M represents a hydrogen atom, a metal element, a metal oxide, a metal hydroxide or a metal halide.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, a metal oxide such as VO and Geo, a metal hydroxide such as $Si(OH)_2$, $Cr(OH)_2$ and $Sn(OH)_2$, or a metal halide such as AlCl, $SiCl_2$, VCl, $VCl_2$, VOCl, FeCl, GaCl and ZrCl, more preferably Cu, Ni, Zn or Al, and most preferably Cu.

In the phthalocyanine compound represented by formulae (I) and (II), the phthalocyanine ring (Pc) may form a dimer (for example, Pc-M-L-M-Pc) or a trimer through a divalent linking group (L) and the plurality of Ms may be the same or different.

The divalent linking group represented by L is preferably an oxy group —O—, a thio group —S—, a carbonyl group —CO—, a sulfonyl group —$SO_2$—, an imino group —NH—, a methylene group —$CH_2$— or a group formed by combining two or more of these groups.

The molecular weight of the phthalocyanine compound of formulae (I) and (II) is preferably from 750 to 3,000, more preferably from 995 to 2,500, still more preferably from 995 to 2,000, particularly preferably from 995 to 1,800.

However, when in the phthalocyanine compound represented by formulae (I) and (II), the phthalocyanine ring (Pc) forms a dimer (for example, Pc-M-L-M-Pc) or a trimer through a divalent linking group (L), the preferred molecular weight is two times (in the case of a dimer) or three times (in the case of a trimer) the above-described particularly preferred molecular weight (from 995 to 1,800). Here, the preferred molecular weight of dimer or trimer is a value including the linking group L.

In the phthalocyanine compound represented by formula (I), at least one of $X_1$, $X_2$, $X_3$, $X_4$, $Y_1$, $Y_2$, $Y_3$ and $Y_4$ is an ionic hydrophilic group or a group having an ionic hydrophilic group as a substituent.

In the phthalocyanine compound represented by formula (II), at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$ and $Y_{18}$ is an ionic hydrophilic group or a group having an ionic hydrophilic group as a substituent.

Examples of the ionic hydrophilic group as a substituent include a sulfo group ($—SO_3^-X^+$), a carboxyl group ($—CO_2^-X^+$), a quaternary ammonium group ($—N^+RR'R''X^-$), an acylsulfamoyl group ($—SO_2N^+X^-COR$), a sulfonylcarbamoyl group ($—CON^+X^-SO_2R$) and a sulfonylsulfamoyl group ($—SO_2N^+X^-SO_2R$). Among these, preferred are a sulfo group, a carboxyl group and a quaternary ammonium group, more preferred is a sulfo group. The sulfo group, carboxyl group, acylsulfamoyl group, sulfonylcarbamoyl group and sulfonylsulfamoyl group each may be in the state of a salt and examples of the counter ion for forming a salt include alkali metal ion (e.g., sodium ion, potassium ion), organic cation (e.g., tetramethyl guanidium ion), and organic and/or inorganic anion (e.g., halogen ion, methanesulfonate ion, benzenesulfonate ion). In the parentheses above, X represents a hydrogen atom or a counter ion and R, R' and R'' each represents a substituent.

In the phthalocyanine compound represented by formulae (I) and (II), at least one ionic hydrophilic group or at least one group having an ionic hydrophilic group as a substituent is present within one molecule and therefore, this compound exhibits good solubility or dispersibility in an aqueous medium. From this viewpoint, the phthalocyanine compound represented by formulae (I) and (II) is preferably a compound which has at least two ionic hydrophilic groups within one molecule, more preferably a compound where at least one of the plurality of ionic hydrophilic groups is a sulfo group, and most preferably a compound which has at least two sulfo groups within one molecule.

The phthalocyanine compound represented by formula (I) is preferably a compound having a combination of the following (i) to (vi).

(i) $X_1$, $X_2$, $X_3$ and $X_4$ each is independently —$SO_2$—Z.

(ii) Each Z is independently a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group.

(iii) $Y_1$ to $Y_4$ each is independently a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

(iv) $a_1$ to $a_4$ each is independently 1 or 2, more preferably 1. $b_1$ to $b_4$ each is independently 3 or 2, more preferably 3.

(v) M is Cu, Ni, Zn or Al, most preferably Cu.

(vi) The molecular weight of the phthalocyanine compound is from 750 to 3,000, more preferably from 995 to 2,500, still more preferably from 995 to 2,000, and most preferably from 995 to 1,800.

As for the combination of preferred substituents in the compound represented by formula (I), a compound where at least one of various substituents is the preferred group is preferred, a compound where a larger number of various substituents are the preferred groups is more preferred, and a compound where all substituents are the preferred groups is most preferred.

The phthalocyanine compound represented by formula (II) is preferably a compound having a combination of the following (i) to (vii).

(i) $X_{11}$ to $X_{14}$ each is independently —$SO_2NR_1R_2$.

(ii) $R_1$ is a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(iii) $R_2$ is a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group. Furthermore, it is more preferred that at least one of $R_1$ and $R_2$ has, as a substituent, an ionic hydrophilic group or a group having an ionic hydrophilic group as a substituent.

(iv) $Y_{11}$ to $Y_{18}$ each is independently a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

(v) $a_{11}$ to $a_{14}$ each is independently 1, more preferably $a_{11}=a_{12}=a_{13}=a_{14}=1$.

(vi) M is Cu, Ni, Zn or Al, most preferably Cu.

(vii) The molecular weight of the phthalocyanine compound is from 750 to 3,000, more preferably from 995 to 2,500, still more preferably from 995 to 2,000, and most preferably from 995 to 1,800.

As for the combination of preferred substituents in the compound represented by formula (II), a compound where at least one of various substituents is the preferred group is preferred, a compound where a larger number of various substituents are the preferred groups is more preferred, and a compound where all substituents are the preferred groups is most preferred.

Among the phthalocyanine compounds represented by formula (I), a phthalocyanine compound represented by the following formula (III) is preferred. Also, among the phthalocyanine compounds represented by formula (II), a phthalocyanine compound represented by the following formula (IV) is preferred. The phthalocyanine compounds represented by formulae (III) and (IV) of the present invention are described in detail below.

Formula (III):

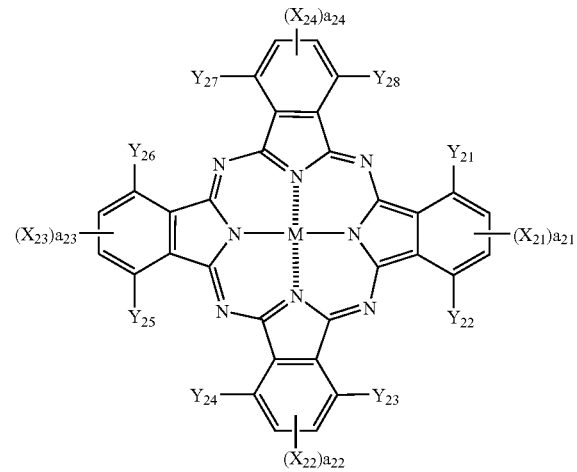

Formula (IV):

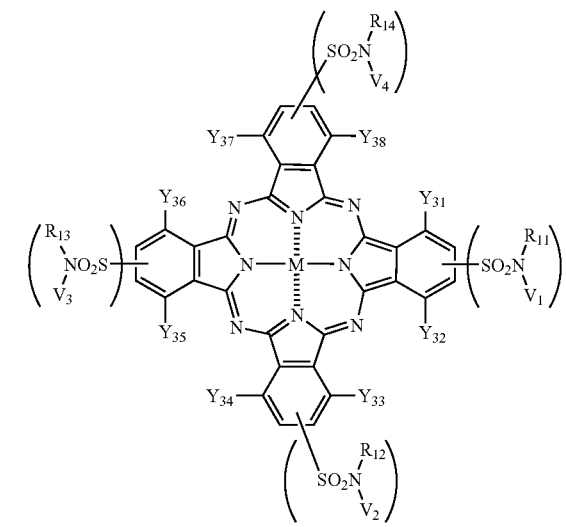

In formula (III), $X_{21}$, $X_{22}$, $X_{23}$ and $X_{24}$ each independently represents —SO—Z or —$SO_2$—Z, preferably —$SO_2$—Z.

Z has the same meaning as Z in formula (I) and preferred examples thereof are also the same.

$Y_{21}$ to $Y_{28}$ each independently has the same meaning as $Y_1$, $Y_2$, $Y_3$ and $Y_4$ in formula (I) and preferred examples thereof are also the same.

$a_{21}$ to $a_{24}$ satisfy $4 \leq a_{21}+a_{22}+a_{23}+a_{24} \leq 8$, preferably $4 \leq a_{21}+a_{22}+a_{23}+a_{24} \leq 6$, and each independently represents an integer of 1 or 2. In particular, $a_{21}=a_{22}=a_{23}=a_{24}=1$ is preferred.

M has the same meaning as M in formula (I).

At least one of $X_{21}$, $X_{22}$, $X_{23}$, $X_{24}$, $Y_{21}$, $Y_{22}$, $Y_{23}$, $Y_{24}$, $Y_{25}$, $Y_{26}$, $Y_{27}$ and $Y_{28}$ is an ionic hydrophilic group or a group having an ionic hydrophilic group as a substituent.

Examples of the ionic hydrophilic group are the same as those described above for $X_1$, $X_2$, $X_3$ and $X_4$ in formula (I) and preferred examples are also the same.

In formula (IV), $R_{11}$, $R_{12}$, $R_{13}$ and $R_{14}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group.

Preferred examples of $R_{11}$, $R_{12}$, $R_{13}$ and $R_{14}$ are the same as those of $R_1$ in formula (II).

$V_1$, $V_2$, $V_3$ and $V_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group.

Preferred examples of $V_1$, $V_2$, $V_3$ and $V_4$ are the same as those of $R_2$ in formula (II).

$Y_{31}$ to $Y_{38}$ each independently has the same meaning as $Y_{11}$, $Y_{12}$, $Y_{13}$, $Y_{14}$, $Y_{15}$, $Y_{16}$, $Y_{17}$ and $Y_{18}$ in formula (II) and preferred examples thereof are also the same.

M has the same meaning as M in formula (II) and preferred examples thereof are also the same.

However, at least one of $R_{11}$, $R_{12}$, $R_{13}$, $R_{14}$, $V_1$, $V_2$, $V_3$, $V_4$ $X_{31}$, $X_{32}$, $X_{33}$, $X_{34}$, $Y_{31}$, $Y_{32}$, $Y_{33}$, $Y_{34}$, $Y_{35}$, $Y_{36}$, $Y_{37}$ and $Y_{38}$ is an ionic hydrophilic group or a group having an ionic hydrophilic group as a substituent.

Examples of the ionic hydrophilic group are the same as those described above for $X_{11}$, $X_{12}$, $X_{13}$ and $X_{14}$ in formula (II) and preferred examples are also the same.

In the phthalocyanine compound represented by formulae (III) and (IV), at least one ionic hydrophilic group or at least one group having an ionic hydrophilic group as a substituent is present within one molecule and therefore, this compound exhibits good solubility or dispersibility in an aqueous medium. From this viewpoint, the phthalocyanine compound represented by formulae (III) and (IV) is preferably a compound which has at least two ionic hydrophilic groups within one molecule, more preferably a compound where at least one of the plurality of ionic hydrophilic groups is a sulfo group, and most preferably a compound which has at least two sulfo groups within one molecule of the phthalocyanine compound.

The molecular weight of the phthalocyanine compound of formulae (III) and (IV) is preferably from 750 to 3,000, more preferably from 995 to 2,500, still more preferably from 995 to 2,000, particularly preferably from 995 to 1,800.

However, when in the phthalocyanine compound represented by formulae (III) and (IV), the phthalocyanine ring (Pc) forms a dimer (for example, Pc-M-L-M-Pc) or a trimer through a divalent linking group (L), the preferred molecular weight, for example, the particularly preferred molecular weight is two times (in the case of a dimer) or three times (in the case of a trimer) the above-described particularly preferred molecular weight (from 995 to 1,800). Here, the preferred molecular weight of dimer or trimer is a value including the linking group L.

The phthalocyanine compound represented by formula (III) is preferably a compound having a combination of the following (i) to (vi).

(i) $X_{21}$ to $X_{24}$ each is independently —$SO_2$—Z.

(ii) Each Z is independently a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group.

(iii) $Y_{21}$ to $Y_{28}$ each is independently a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

(iv) $a_{11}$ to $a_{14}$ each is independently 1 or 2, more preferably $a_{11}=a_{12}=a_{13}=a_{14=1}$.

(v) M is Cu, Ni, Zn or Al, most preferably Cu.

(vi) The molecular weight of the phthalocyanine compound is from 750 to 2,500, more preferably from 995 to 2,500, still more preferably from 995 to 2,000, and most preferably from 995 to 1,800.

As for the combination of preferred substituents in the compound represented by formula (III), a compound where at least one of various substituents is the preferred group is preferred, a compound where a larger number of various substituents are the preferred groups is more preferred, and a compound where all substituents are the preferred groups is most preferred.

The phthalocyanine compound represented by formula (IV) is preferably a compound having a combination of the following (i) to (v).

(i) $R_{11}$, $R_{12}$, $R_{13}$ and $R_{14}$ each is independently a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(ii) $V_{11}$, $V_{12}$, $V_{13}$ and $V_{14}$ each is independently a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group. Furthermore, it is more preferred that at least one of $R_{11}$, $R_{12}$, $R_{13}$, $R_{14}$, $V_{11}$, $V_{12}$, $V_{13}$ and $V_{14}$ is an ionic hydrophilic group or a group having an ionic hydrophilic group as a substituent.

(iii) $Y_{31}$ to $Y_{38}$ each is independently a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

(iv) M is Cu, Ni, Zn or Al, most preferably Cu.

(v) The molecular weight of the phthalocyanine compound is from 750 to 2,500, more preferably from 995 to 2,500, still more preferably from 995 to 2,000, and most preferably from 995 to 1,800.

As for the combination of preferred substituents in the compound represented by formula (IV), a compound where at least one of various substituents is the preferred group is preferred, a compound where a larger number of various substituents are the preferred groups is more preferred, and a compound where all substituents are the preferred groups is most preferred.

Among the phthalocyanine compounds represented by formula (III), a phthalocyanine compound represented by the following formula (V) is preferred. Also, among the phthalocyanine compounds represented by formula (IV), a phthalocyanine compound represented by the following formula (VI) is preferred. The phthalocyanine compounds represented by formulae (V) and/or (VI) of the present invention are described in detail below.

Formula (V):

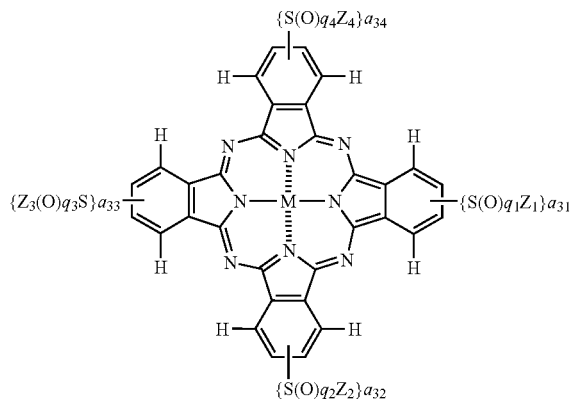

Formula (VI):

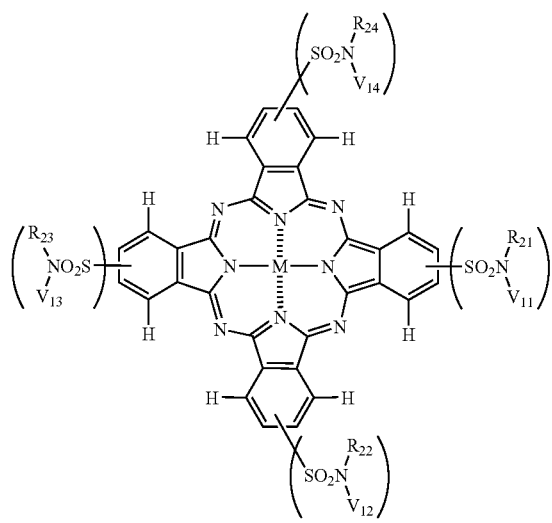

In formula (V), $Z_1$, $Z_2$, $Z_3$ and $Z_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a substituted alkyl group, a substituted aryl group or a substituted heterocyclic group, and most preferably a substituted alkyl group.

The alkyl group represented by $Z_1$, $Z_2$, $Z_3$ and $Z_4$ includes an alkyl group having a substituent and an unsubstituted alkyl group. The alkyl group is preferably an alkyl group having from 1 to 12 carbon atoms excluding the substituent. Examples of the substituent include a hydroxyl group, an alkoxy group, a cyano group, a halogen atom and an ionic hydrophilic group. Examples of the alkyl group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group and a 4-sulfobutyl group.

The cycloalkyl group represented by $Z_1$, $Z_2$, $Z_3$ and $Z_4$ includes a cycloalkyl group having a substituent and an unsubstituted cycloalkyl group. The cycloalkyl group is preferably a cycloalkyl group having from 5 to 12 carbon atoms excluding the substituent. Examples of the substituent include an ionic hydrophilic group. Examples of the cycloalkyl group include a cyclohexyl group.

The alkenyl group represented by $Z_1$, $Z_2$, $Z_3$ and $Z_4$ includes an alkenyl group having a substituent and an unsubstituted alkenyl group. The alkenyl group is preferably an alkenyl group having from 2 to 12 carbon atoms excluding the substituent. Examples of the substituent include an ionic hydrophilic group. Examples of the alkenyl group include a vinyl group and an allyl group.

The aralkyl group represented by $Z_1$, $Z_2$, $Z_3$ and $Z_4$ include an aralkyl group having a substituent and an unsubstituted aralkyl group. The aralkyl group is preferably an aralkyl group having from 7 to 12 carbon atoms excluding the substituent. Examples of the substituent include an ionic hydrophilic group. Examples of the aralkyl group include a benzyl group and a 2-phenethyl group.

The aryl group represented by $Z_1$, $Z_2$, $Z_3$ and $Z_4$ includes an aryl group having a substituent and an unsubstituted aryl group. The aryl group is preferably an aryl group having from 6 to 12 carbon atoms excluding the substituent. Examples of the substituent include an alkyl group, an alkoxy group, a halogen atom, an alkylamino group and an ionic hydrophilic group. Examples of the aryl group include a phenyl group, a p-tolyl group, a p-methoxyphenyl group, an o-chlorophenyl group and an m-(3-sulfopropylamino)-phenyl group.

The heterocyclic group represented by $Z_1$, $Z_2$, $Z_3$ and $Z_4$ includes a heterocyclic group having a substituent and an unsubstituted heterocyclic group.

Each heterocyclic group represented by $Z_1$, $Z_2$, $Z_3$ and $Z_4$ may be independently a saturated heterocyclic ring or an unsaturated heterocyclic ring.

Furthermore, each heterocyclic group represented by $Z_1$, $Z_2$, $Z_3$ and $Z_4$ may independently form a condensed ring with other ring.

The heterocyclic group represented by $Z_1$, $Z_2$, $Z_3$ and $Z_4$ is preferably a 5- or 6-membered heterocyclic group.

Examples of the heterocyclic group represented by $Z_1$, $Z_2$, $Z_3$ and $Z_4$ are shown below in the form of a heterocyclic ring by omitting the substitution site. The substitution site is not limited and for example, pyridine may be substituted at the 2-position, 3-position and 4-position. Examples of the heterocyclic group include pyridine, pyrazine, pyrimidine, pyridazine, triazine, quinoline, isoquinoline, quinazoline, cinnoline, phthalazine, quinoxaline, pyrrole, benzopyrrole, indole, furan, benzofuran, thiophene, benzothiophene, pyrazole, benzopyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, aromatic heterocyclic groups are preferred. Preferred examples thereof, shown in the same manner as above, include pyridine, pyrazine, pyrimidine, pyridazine, triazine, pyrazole, imidazole, benzimidazole, triazole, thiazole, benzothiazole, isothiazole, benzisothiazole and thiadiazole.

In the case where the heterocyclic group represented by $Z_1$, $Z_2$, $Z_3$ and $Z_4$ further has a substituent, examples of the substituent include an alkyl group (R—), an alkoxy group (RO—), an alkylamino group (RNH—, RR'N—), a carbamoyl group (—CONHR), a sulfamoyl group (—SO$_2$NHR), a sulfonylamino group (—NHSO$_2$R), a halogen atom and an ionic hydrophilic group (R and R' each represents an alkyl group or a phenyl group and may further have an ionic hydrophilic group).

$q_1$, $q_2$, $q_3$ and $q_4$ each independently represents an integer of 1 or 2, preferably 2, most preferably $q_1=q_2=q_3=q_4=2$.

$a_{31}$, $a_{32}$, $a_{33}$ and $a_{34}$ each independently represents an integer of 1 or 2, preferably 1, most preferably $a_{31}=a_{32}=a_{33}=a_{34}=1$.

M has the same meaning as M in formula (I).

At least one of $Z_{11}$, $Z_{12}$, $Z_{13}$ and $Z_{14}$ has an ionic hydrophilic group as a substituent.

Examples of the ionic hydrophilic group are the same as those described above for Z in formula (I) and preferred examples are also the same.

The molecular weight of the phthalocyanine compound is preferably from 750 to 2,500, more preferably from 995 to 2,500, still more preferably from 995 to 2,000, particularly preferably from 995 to 1,800.

In formula (VI), $R_{21}$, $R_{22}$, $R_{23}$ and $R_{24}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a hydrogen atom, a substituted alkyl group, a substituted aryl group or a substituted heterocyclic group, more preferably a hydrogen atom or a substituted alkyl group, and most preferably a hydrogen atom.

$V_{11}$, $V_{12}$, $V_{13}$ and $V_{14}$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a substituted alkyl group, a substituted aryl group or a substituted heterocyclic group, and most preferably a substituted alkyl group.

The alkyl group represented by $R_{21}$, $R_{22}$, $R_{23}$, $R_{24}$, $V_{11}$, $V_{12}$, $V_{13}$ and $V_{14}$ includes an alkyl group having a substituent and an unsubstituted alkyl group. The alkyl group is preferably an alkyl group having from 1 to 12 carbon atoms excluding the substituent. Examples of the substituent include a hydroxyl group, an alkoxy group, a cyano group, a halogen atom and an ionic hydrophilic group. Examples of the alkyl group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group and a 4-sulfobutyl group.

The cycloalkyl group represented by $R_{21}$, $R_{22}$, $R_{23}$, $R_{24}$, $V_{11}$, $V_{12}$, $V_{13}$ and $V_{14}$ includes a cycloalkyl group having a substituent and an unsubstituted cycloalkyl group. The cycloalkyl group is preferably a cycloalkyl group having from 5 to 12 carbon atoms excluding the substituent. Examples of the substituent include an ionic hydrophilic group. Examples of the cycloalkyl group include a cyclohexyl group.

The alkenyl group represented by $R_{21}$, $R_{22}$, $R_{23}$, $R_{24}$, $V_{11}$, $V_{12}$, $V_{13}$ and $V_{14}$ includes an alkenyl group having a substituent and an unsubstituted alkenyl group. The alkenyl group is preferably an alkenyl group having from 2 to 12 carbon atoms excluding the substituent. Examples of the substituent include an ionic hydrophilic group. Examples of the alkenyl group include a vinyl group and an allyl group.

The aralkyl group represented by $R_{21}$, $R_{22}$, $R_{23}$, $R_{24}$, $V_{11}$, $V_{12}$, $V_{13}$ and $V_{14}$ include an aralkyl group having a substituent and an unsubstituted aralkyl group. The aralkyl group is preferably an aralkyl group having from 7 to 12 carbon atoms excluding the substituent. Examples of the substituent include an ionic hydrophilic group. Examples of the aralkyl group include a benzyl group and a 2-phenethyl group.

The aryl group represented by $R_{21}$, $R_{22}$, $R_{23}$, $R_{24}$, $V_{11}$, $V_{12}$, $V_{13}$ and $V_{14}$ includes an aryl group having a substituent and an unsubstituted aryl group. The aryl group is preferably an aryl group having from 6 to 12 carbon atoms excluding the substituent. Examples of the substituent include an alkyl group, an alkoxy group, a halogen atom, an alkylamino group and an ionic hydrophilic group. Examples of the aryl group include a phenyl group, a p-tolyl group, a p-methoxyphenyl group, an o-chlorophenyl group and an m-(3-sulfopropylamino)phenyl group.

The heterocyclic group represented by $R_{21}$, $R_{22}$, $R_{23}$, $R_{24}$, $V_{11}$, $V_{12}$, $V_{13}$ and $V_{14}$ includes a heterocyclic group having a substituent and an unsubstituted heterocyclic group.

Each heterocyclic group represented by $R_{21}$, $R_{22}$, $R_{23}$, $R_{24}$, $V_{11}$, $V_{12}$, $V_{13}$ and $V_{14}$ may be independently a saturated heterocyclic ring or an unsaturated heterocyclic ring.

Furthermore, each heterocyclic group represented by $R_{21}$, $R_{22}$, $R_{23}$, $R_{24}$, $V_{11}$, $V_{12}$, $V_{13}$ and $V_{14}$ may independently form a condensed ring with other ring.

The heterocyclic group represented by $R_{21}$, $R_{22}$, $R_{23}$, $R_{24}$, $V_{11}$, $V_{12}$, $V_{13}$ and $V_{14}$ is preferably a 5- or 6-membered heterocyclic group.

The heterocyclic ring represented by $R_{21}$, $R_{22}$, $R_{23}$, $R_{24}$, $V_{11}$, $V_{12}$, $V_{13}$ and $V_{14}$ or a condensed ring thereof is preferably a 5- or 6-membered nitrogen-containing heterocyclic ring (which may further form a condensed ring with other ring), provided that when $W_1$, $W_2$, $W_3$ and $W_4$ each independently forms a 6-membered nitrogen-containing heterocyclic ring (which may further form a condensed ring with other ring), the number of nitrogen atom constituting the 6-membered nitrogen-containing heterocyclic ring is 1 or 2 (the case where the number of nitrogen atoms constituting the 6-membered nitrogen-containing heterocyclic ring is 3 or more, for example, a triazine ring, is excluded).

Examples of the heterocyclic group represented by $R_{21}$, $R_{22}$, $R_{23}$, $R_{24}$, $V_{11}$, $V_{12}$, $V_{13}$ and $V_{14}$ are shown below in the form of a heterocyclic ring by omitting the substitution site. The substitution site is not limited and for example, pyridine may be substituted at the 2-position, 3-position and 4-position.

Examples of the heterocyclic group include pyridine, pyrazine, pyrimidine, pyridazine, quinoline, isoquinoline, quinazoline, cinnoline, phthalazine, quinoxaline, pyrrole, benzopyrrole, indole, furan, benzofuran, thiophene, benzothiophene, pyrazole, benzopyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, aromatic heterocyclic groups are preferred. Preferred examples thereof, shown in the same manner as above, include pyridine, pyrazine, pyrimidine, pyridazine, pyrazole, imidazole, benzimidazole, triazole, thiazole, benzothiazole, isothiazole, benzisothiazole and thiadiazole.

In the case where the heterocyclic group represented by $R_{21}$, $R_{22}$, $R_{23}$, $R_{24}$, $V_{11}$, $V_{12}$, $V_{13}$ and $V_{14}$ further has a substituent, examples of the substituent include an alkyl group (R—), an alkoxy group (RO—), an alkylamino group (RNH—, RR'N—), a carbamoyl group (—CONHR), a sulfamoyl group (—SO$_2$NHR), a sulfonylamino group (—NHSO$_2$R), a halogen atom and an ionic hydrophilic group (R and R' each represents an alkyl group or a phenyl group and may further have an ionic hydrophilic group).

M has the same meaning as M in formula (II) and preferred examples thereof are also the same.

However, at least one of $R_{21}$, $R_{22}$, $R_{23}$, $R_{24}$, $V_{11}$, $V_{12}$, $V_{13}$ and $V_{14}$ has an ionic hydrophilic group as a substituent.

Examples of the ionic hydrophilic group are the same as those described for $X_{11}$, $X_{12}$, $X_{13}$ and $X_{14}$ in formula (II) and preferred examples are also the same.

The molecular weight of the phthalocyanine compound is preferably from 750 to 2,500, more preferably from 995 to 2,500, still more preferably from 995 to 2,000, particularly preferably from 995 to 1,800.

The phthalocyanine compound represented by formulae (V) and (VI) has at least one ionic hydrophilic group or at least one group having an ionic hydrophilic group as a substituent within one molecule and therefore, exhibits good solubility or dispersibility in an aqueous medium. From this viewpoint, the phthalocyanine compound represented by formulae (V) and (VI) is preferably a compound which has at least two ionic hydrophilic groups within one molecule, more preferably a compound where at least one of the plurality of ionic hydrophilic groups is a sulfo group, and most preferably a compound which has at least two sulfo groups within one molecule of the phthalocyanine compound.

The phthalocyanine compound represented by formula (V) is preferably a compound having a combination of the following (i) to (vi).

(i) $Z_1$ to $Z_4$ each is independently a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, more preferably a substituted alkyl group, a substituted aryl group or a substituted heterocyclic group, still more preferably a substituted alkyl group, and most preferably an alkyl group having an ionic hydrophilic group as a substituent.

(ii) $q_1$, $q_2$, $q_3$ and $q_4$ each is independently an integer of 1 or 2, more preferably 2, and most preferably $q_1=q_2=q_3=q_4=2$.

(iii) $a_{31}$, $a_{32}$, $a_{33}$ and $a_{34}$ each is independently an integer of 1 or 2, more preferably 1, most preferably $a_{31}=a_{32}=a_{33}=a_{34}=1$.

(iv) M is Cu, Ni, Zn or Al, most preferably Cu.

(v) The molecular weight of the phthalocyanine compound is from 750 to 2,500, more preferably from 995 to 2,500, still more preferably from 995 to 2,000, and most preferably from 995 to 1,800.

(vi) The phthalocyanine compound represented by formula (V) has at least one or more ionic hydrophilic group within the molecule and therefore, exhibits good solubility or dispersibility in an aqueous medium. From this viewpoint, the phthalocyanine compound represented by formula (V) is preferably a compound which has at least two ionic hydrophilic groups within one molecule, more preferably a compound where at least one of the plurality of ionic hydrophilic groups is a sulfo group, and most preferably a compound which has at least two sulfo groups within one molecule of the phthalocyanine compound.

As for the combination of preferred substituents in the compound represented by formula (V), a compound where at least one of various substituents is the preferred group is preferred, a compound where a larger number of various substituents are the preferred groups is more preferred, and a compound where all substituents are the preferred groups is most preferred.

The phthalocyanine compound represented by formula (VI) is preferably a compound having a combination of the following (i) to (v).

(i) $R_{21}$, $R_{22}$, $R_{23}$ and $R_{24}$ each is independently a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(ii) $V_{11}$, $V_{12}$, $V_{13}$ and $V_{14}$ each is independently a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, more preferably a substituted alkyl group, a substituted aryl group or a substituted heterocyclic group, and most preferably an alkyl group having an ionic hydrophilic group as a substituent.

(iii) M is Cu, Ni, Zn or Al, most preferably Cu.

(iv) The molecular weight of the phthalocyanine compound is from 750 to 2,500, more preferably from 995 to 2,500, still more preferably from 995 to 2,000, and most preferably from 995 to 1,800.

(v) The phthalocyanine compound represented by formula (VI) has at least one ionic hydrophilic group within the molecule and therefore, exhibits good solubility or dispersibility in an aqueous medium. From this viewpoint, the phthalocyanine compound represented by formula (VI) is preferably a compound which has at least two ionic hydrophilic groups within one molecule, more preferably a compound where at least one of the plurality of ionic hydrophilic groups is a sulfo group, and most preferably a compound which has at least two sulfo groups within one molecule. As for the combination of preferred substituents in the compound represented by formula (VI), a compound where at least one of various substituents is the preferred group is preferred, a compound where a larger number of various substituents are the preferred groups is more preferred, and a compound where all substituents are the preferred groups is most preferred.

The phthalocyanine compounds represented by formulae (I), (II), (III), (IV), (V) and (VI) of the present invention are described in detail below.

Phthalocyanine derivatives conventionally used are a mixture of isomers different in the site to which a specific substituent is introduced (depending on the case, the number of sites to which introduced). The compounds (the compounds represented by formulae (II) to (VI); phthalocyanine derivatives having a specific structure where specific substituents each in a specific number are selectively introduced into specific sites) of the present invention each is a novel compound having a specific structure which has heretofore not been isolated and recognized. By virtue of the performance brought out from the specific structure, these compounds are very useful as a water-soluble dye for ink jetting imparted with high functionality or as an intermediate for the synthesis of the water-soluble dye (a system comprising a mixture of isomers different in the site to which a specific substituent is introduced, namely, conventional phthalocyanine derivatives, cannot exert the objective performance of high level) and can be a useful intermediate for chemical, medical or agricultural organic compounds.

It is generally known to use various phthalocyanine derivatives as the ink composition for inkjet recording. The phthalocyanine derivative represented by the following formula (VII) sometimes contains an isomer differing in the substitution site of the substituent $R_n$ (n=1 to 16) (here, $R_1$ to $R_{16}$ are defined as 1-position to 16-position, respectively), which inevitably occurs at the time of synthesis, however, these substitution site isomers are not distinguished from each other but regarded as the same derivative in many cases. Also, in the case where the substituent R contains an isomer, these are not distinguished but regarded as the same phthalocyanine derivative in many cases.

Formula (VII):

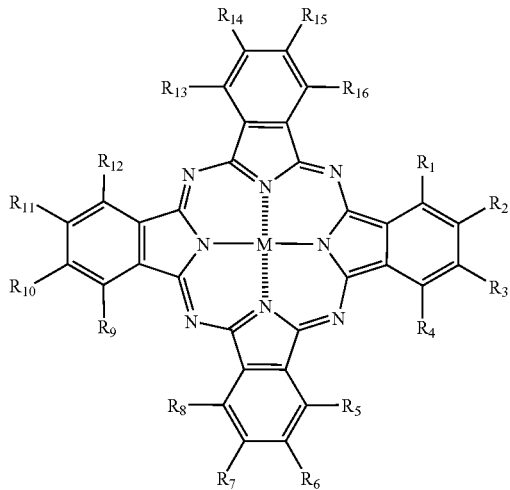

When it is stated that the phthalocyanine compound is different in the structure, this is defined in the present invention as follows by referring to formula (VII). That is, when the constituent atom species of the substituent $R_n$ (n=1 to 16) is different, this means that the number of substituents $R_n$ is different or that the substitution site of the substituent $R_n$ is different.

In the present invention, the derivatives where the structure of the phthalocyanine compound represented by formula (VII) is different (particularly, in the substitution site) are defined by classifying these into the following three types.

β-Position Substitution Type:

A phthalocyanine compound having specific substituents at the 2- and/or 3-position, the 6- and/or 7-position, the 10- and/or 11-position, and the 14- and/or 15-position.

α-Position Substitution Type:

A phthalocyanine compound having specific substituents at the 1- and/or 4-position, the 5- and/or 8-position, the 9- and/or 12-position, and the 13- and/or 16-position.

α,β-Position Mixed Substitution Type:

A phthalocyanine compound having specific substitutions at the 1- to 16-position without any regularity.

In the present invention, phthalocyanine compound derivatives different in the structure (particularly, in the substitution site) are described by using these β-position substitution type, α-position substitution type and α,β-position mixed substitution type.

The phthalocyanine derivative for use in the present invention can be synthesized by combining the methods described or cited, for example, in Shirai and Kobayashi, *Phthalocyanine —Kagaku to Kino—(Phthalocyanine— Chemistry and Function—)*, pp. 1–62, IPC, and C. C. Leznoff and A. B. P. Lever, *Phthalocyanines—Properties and Applications*, pp. 1–54, VCH, or methods analogous thereto.

Phthalocyanine compounds heretofore reported can be synthesized, for example, through sulfonation, sulfonyl chloridation or amidation of an unsubstituted phthalocyanine compound as described in International Patents WO00/17275, WO00/08103, WO00/08101 and WO98/41853 and JP-A-10-36471.

In this case, (1) sulfonation takes place at any site of the phthalocyanine nucleus and (2) the number of sites sulfonated is difficult to control.

Accordingly, when a sulfo group is introduced under such reaction conditions, the site and number of sulfo groups introduced into the product cannot be specified and a mixture of those different in the number of substituents or in the substitution site inevitably results.

If a phthalocyanine compound is synthesized starting from such a product, the compound is obtained as a mixture containing several kinds of compounds different in the number of substituents or in the substitution site because the number of sulfamoyl groups substituted or their substitution sites cannot be specified.

As described above, for example, when many electron withdrawing groups such as sulfamoyl group are introduced into the phthalocyanine nucleus, the oxidation potential becomes nobler and the ozone resistance is increased.

However, according to the above-described synthesis method, a phthalocyanine dye where the number of electron withdrawing groups introduced is small, namely, the oxidation potential is baser, is inevitably mingled.

Accordingly, in order to improve the ozone resistance, it is necessary to use a synthesis method where the production of a compound having a baser oxidation potential is suppressed.

On the other hand, out of the phthalocyanine compounds represented by formulae (I) to (VI) of the present invention, for example, the phthalocyanine compound represented by formula (VIII) can be synthesized by reacting a phthalonitrile derivative represented by the following formula (IX) and/or a diiminoisoindoline derivative represented by the following formula (X) with a metal derivative represented by the following formula (XI).

Also, the phthalocyanine compound represented by formula (VIII) of the present invention can be synthesized by reacting a sodium 4-sulfophthalate represented by formula (XII) and a metal derivative represented by formula (XI) to obtain phthalocyanine copper(II)-tetrasodium tetrasulfonate, deriving a corresponding sulfonyl chloride therefrom and reacting it with an objective amine or aniline derivative (for example, when $G_1$, $G_2$, $G_3$ and $G_4$ are $G_1$: {—$SO_2N(R_{21})(V_{11})$}, $G_2$: {—$SO_2N(R_{22})(V_{12})$}, $G_3$: {—$SO_2N(R_{23})(V_{13})$} and $G_4$: {—$SO_2N(R_{24})(V_{14})$}).

In formula (VIII), l, m, n and p have the same meaning as t in formula (IX) and/or formula (X). In formula (VIII), $G_1$, $G_2$, $G_3$ and $G_4$ each independently represents $G_1$: {—$S(O)q_1$—$Z_1$}, $G_2$: {—$S(O)q_2$—$Z_2$}, $G_3$: {—$S(O)q_3$—$Z_3$} and $G_4$: {—$S(O)q_4$—$Z_4$} in formula (V) and/or $G_1$: {—$SO_2N(R_{21})(V_{11})$}, $G_2$: {—$SO_2N(R_{22})(V_{12})$}, $G_3$: {—$SO_2N(R_{23})(V_{13})$} and $G_4$: {—$SO_2N(R_{24})(V_{14})$} in formula (VI).

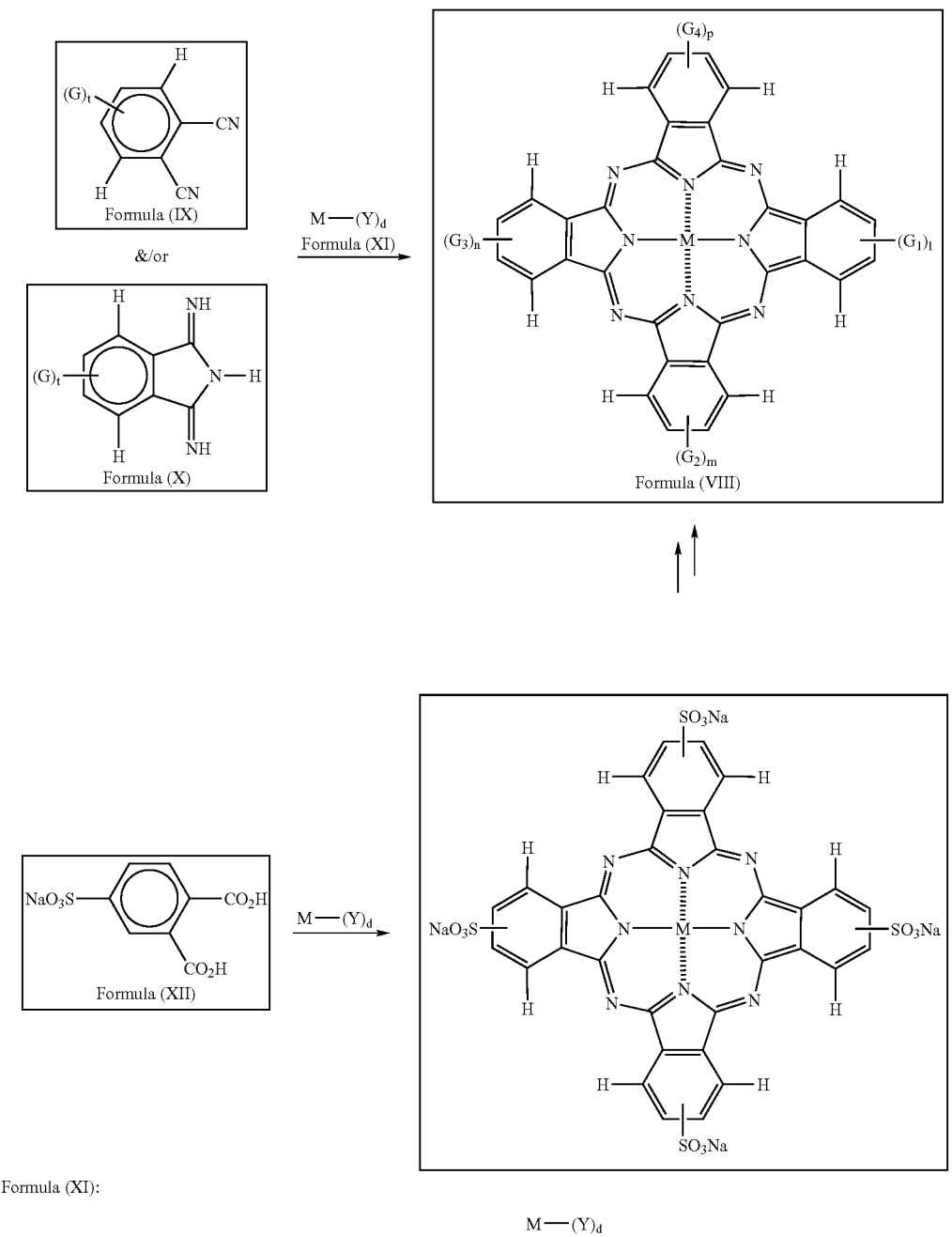

Formula (XI):

M—(Y)$_d$ wherein M has the same meaning as M in formulae (I) to (IV), Y represents a monovalent or divalent ligand such as halogen atom, acetate anion, acetyl acetonate and oxygen, and d represents an integer of 1 to 4.

Examples of the metal derivative represented by formula (XI) include a halide, a carboxylic acid derivative, a sulfate, a nitrate, a carbonyl compound, an oxide and a complex of Al, Si, Ti, V, Mn, Fe, Co, Ni, Cu, Zn, Ge, Ru, Rh, Pd, In, Sn, Pt and Pb. Specific examples thereof include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, acetylacetone manganese, manganese chloride, lead chloride, lead acetate, indium chloride, titanium chloride and tin chloride.

The amounts of the metal derivative and the phthalonitrile compound represented by formula (IX) used are preferably, in terms of the molar ratio, from 1:3 to 1:6.

The amounts of the metal derivative and the diiminoisoindoline derivative represented by formula (X) are preferably, in terms of the molar ratio, from 1:3 to 1:6.

The reaction is usually performed in the presence of a solvent. For the solvent, an organic solvent having a boiling point of 80° C. or more, preferably 130° C. or more is used. Examples thereof include n-amyl alcohol, n-hexanol, cyclohexanol, 2-methyl-1-pentanol, 1-heptanol, 2-heptanol, 1-octanol, 2-ethylhexanol, benzyl alcohol, ethylene glycol, propylene glycol, ethoxyethanol, propoxyethanol, butoxyethanol, dimethylaminoethanol, diethylaminoethanol, trichlorobenzene, chloronaphthalene, sulfolane, nitrobenzene, quinoline and urea. The amount of the solvent used is from 1 to 100 times in mass, preferably from 5 to 20 times in mass, the phthalonitrile compound.

In the reaction, 1,8-diazabicyclo[5.4.0]-7-undecene (DBU) or ammonium molybdate may be added as the catalyst. The amount added thereof is from 0.1 to 10 molar times, preferably from 0.5 to 2 molar times per 1 mol of the phthalonitrile compound and/or diiminoisoindoline derivative.

The reaction temperature is from 80 to 300° C., preferably from 100 to 250° C., more preferably from 130 to 230° C. If the reaction temperature is less than 80° C., the reaction rate is extremely low, whereas if it exceeds 300° C., decomposition of the phthalocyanine compound may occur.

The reaction time is from 2 to 20 hours, preferably from 5 to 15 hours, more preferably from 5 to 10 hours. If the reaction time is less than 2 hours, unreacted raw materials remain in a large amount, whereas if it exceeds 20 hours, decomposition of the phthalocyanine compound may occur.

The product obtained by this reaction is treated according to the normal after-treating method in the organic synthesis reaction and then through or not though purification, used as a commercial product.

More specifically, for example, the product isolated from the reaction system can be provided as a commercial product without purifying it or after performing a purification operation by using recrystallization, column chromatography (for example, gel permeation chromatography (SEPHADEX™ LH-20, produced by Pharmacia)) or the like individually or in combination.

Also, after the completion of reaction, the reaction solvent may or may not be removed by distillation, the product is charged in water or ice and then may or may not be neutralized, and the product isolated can be provided as a commercial product without purifying it or after performing a purification operation by using recrystallization, column chromatography or the like individually or in combination.

Furthermore, after the completion of reaction, the reaction solvent may or may not be removed by distillation, the product is charged in water or ice, neutralized or not neutralized, and then extracted with an organic solvent/an aqueous solution, and the product extracted can be provided as a commercial product without purifying it or after performing a purification operation by using crystallization or column chromatography individually or in combination.

The thus-obtained phthalocyanine compound represented by formula (VIII) (for example, when l=m=n=p=1) is usually a mixture of compounds represented by the following formulae (a)-1 to (a)-4, which are isomers different in the sites to which substituents $G_1$ ($SO_2$—$Z_1$), $G_2$ ($SO_2$—$Z_2$), $G_3$ ($SO_2$—$Z_3$) and $G_4$ ($SO_2$—$Z_4$), and/or $G_1$ {$SO_2N$—($R_{21}$)($V_{11}$)}, $G_2$ {—$SO_2N$—($R_{22}$)($V_{12}$)}, $G_3$ {—$SO_2N$—($R_{23}$)($V_{13}$)} and $G_4$ {—$SO_2N$—($R_{24}$)($V_{14}$)} are introduced (the introduction sites are commonly the β-position).

Formula (a)-1:

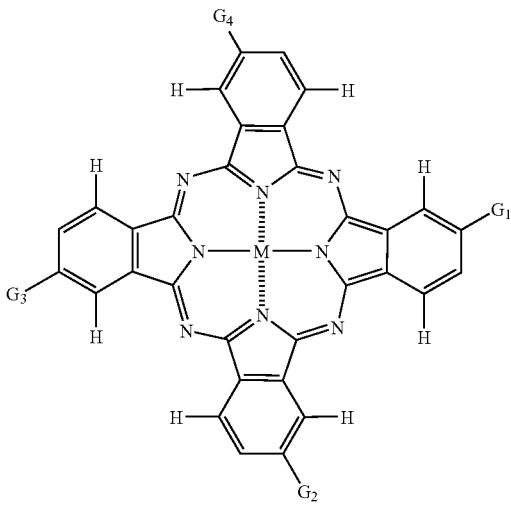

Formula (a)-2:

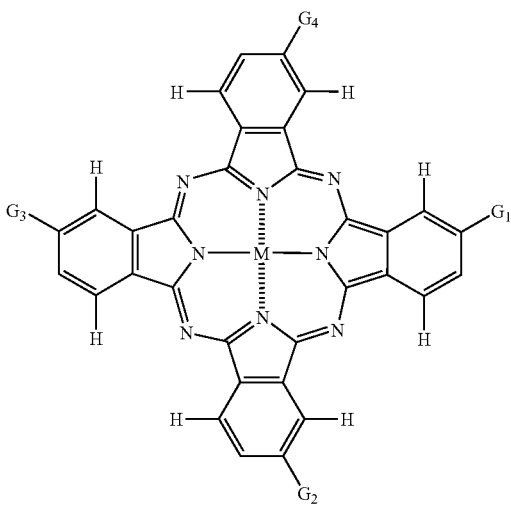

Formula (a)-3:

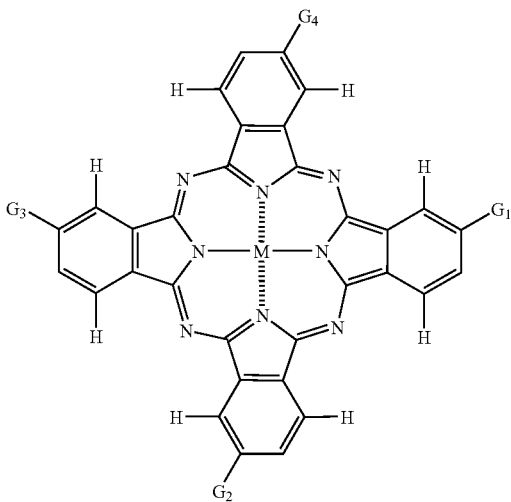

-continued

Formula (a)-4:

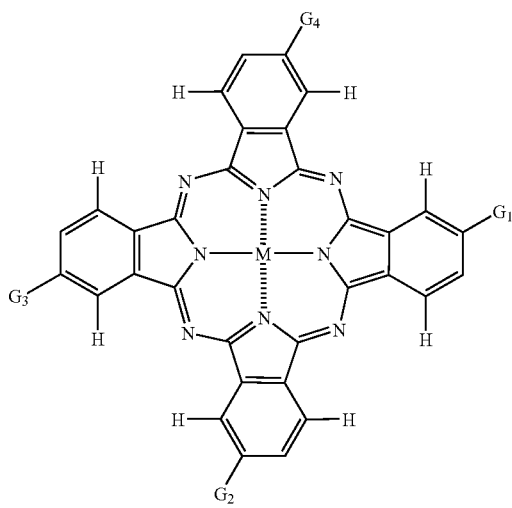

The compounds represented by formulae (a)-1 to (a)-4 are a β-position substitution type compound (a phthalocyanine compound having specific substituents at the 2- and/or 3-position, the 6- and/or 7-position, the 10- and/or 11-position, and the 14- and/or 15-position) and utterly different in the structure (different in the introduction sites of specific substituents) from the α-position substitution type and the α,β-position mixed substitution type. This structural feature is very important for achieving the objects of the present invention.

The correlation between the structure and the performance of the phthalocyanine compound of the present invention is described below from two aspects, that is, (1) oxidation potential of the phthalocyanine compound for use in an ink for the image formation and (2) structural feature of the phthalocyanine compound.

(1) Oxidation Potential of Phthalocyanine Compound of the Present Invention

In the present invention, specific substituents represented, for example, by —{SO—Z}, —{SO$_2$—Z} in formula (I) and/or {—SO$_2$N—(R$_1$)(R$_2$)} in formula (II) are very important for the improvement of fastness.

The oxidation potential (Eox) value indicates the transferability of an electron from a sample to an electrode and as the value is larger (the oxidation potential is nobler), the electron is less transferable from a sample to an electrode, in other words, the oxidation less occurs.

As for the relationship with the structure of phthalocyanine compound, the oxidation potential becomes nobler by introducing an electron withdrawing group and becomes baser by introducing an electron donating group.

In the present invention, the oxidation potential is preferably rendered nobler by introducing an electron withdrawing group into the phthalocyanine skeleton so as to reduce, for example, the reactivity with ozone which is an electrophilic agent.

Accordingly, a compound where those specific substituents —{SO—Z}, —{SO$_2$—Z} and/or {—SO$_2$N—(R$_1$)(R$_2$)} as an electron withdrawing group are selectively introduced into specific sites (β-position substitution type) in a specific number {when this is described by referring to the phthalocyanine mother nucleus represented by formula (VII), at least one specific substituent described above is introduced into each pair of (2-position and/or 3-position), (6-position and/or 7-position), (10-position and 11-position) and (14-position and 15-position)) can render nobler the oxidation potential of the corresponding phthalocyanine compound.

In all phthalocyanine compounds of the present invention, the oxidation potential is nobler than 1.0 V (vs SCE) and this physical value has been found to be very important for the improvement of fastness of an image formed.

In other words, this characteristic feature (governing the oxidation potential of phthalocyanine compound) in the structure is very important as a technique for achieving the improvement of fastness of an image formed, that is, the improvement of preservability (light fastness, ozone gas resistance, etc.), which is one object of the present invention.

(2) Structural Feature of Phthalocyanine Compound

The compounds represented by formulae (II), (III), (IV), (V) and (VI) of the present invention come under the above-described β-position substitution type (a phthalocyanine compound having specific substituents at the 2- and/or 3-position, the 6- and/or 7-position, the 10- and/or 11-position and the 14- and/or 15-position).

In the present invention, an aggregate of water-soluble phthalocyanine compound originated in the β-position substitution type (the phthalocyanine compound having specific substituents at the 2- and/or 3-position, the 6- and/or 7-position, the 10- and/or 11-position and the 14- and/or 15-position) is effectively used.

The aggregate of phthalocyanine compound as used in the present invention means an aggregate formed by two or more phthalocyanine molecules.

It has been found that when the aggregate of phthalocyanine compound of the present invention is used, stability against light, heat and oxidative gases (particularly ozone gas) is remarkably improved as compared with the compound in the monomolecular dispersion state.

It has been also found that by the formation of an aggregate, the spectral properties (cyan color: hue, excellent absorption property as a cyan dye for image forming materials) of the formed image are greatly improved and the paper dependency ascribable to difference in the material on which an image is recorded (for example, plain paper and inkjet special paper) is very small {good color hue (color reproducibility) and improved water resistance; these are brought about because, for example, the difference in the existing state or mordanted state is small due to the firm aggregate}.

Whether or not the dye is aggregated can be easily determined from the shift of absorption maximum (λmax) in the absorption spectrum as described, for example, in J. D. Wright (translated by Taro Eguchi), Bunshi Kessho (Molecular Crystal), Kagaku Dojin. In general, the aggregate is classified into two types, namely, J-aggregate which shifts to the long wave side, and H-aggregate which shifts to the short wave side. In the present invention, an aggregate is formed by the shifting of the absorption maximum to the short wave side and this aggregate is used as the water-soluble phthalocyanine aggregate.

It has been found that the structural feature of the water-soluble phthalocyanine compound of the present invention, more specifically, a compound where specific substituents {the above-described —SO—Z and/or —SO$_2$—Z and/or —SO$_2$N—(R$_1$) (R$_2$)} are introduced in a specific number into specific sites (β-position substitution type) of the phthalocyanine mother nucleus, accelerates the aggregated state and this structure is most preferred in view of fastness and color hue of the formed image.

By virtue of this effect (promotion of aggregated state), (1) the improvement of fastness (improvement of preservability) of the formed image as one object of the present invention is achieved, (2) very excellent spectral properties (cyan color hue, excellent absorption property as a cyan dye for image forming materials) of the formed image as another object of the present invention are realized and at the same time, (3) the paper dependency ascribable to the difference in the material on which the image is recorded (for example, plain paper and inkjet special paper) becomes small. Therefore, the structural feature that the phthalocyanine compound is a β-position substitution type is very important (which governs the promotion of aggregation of the phthalocyanine compound) for satisfying these (1) to (3).

The ozone gas resistance is referred to in the present invention by using the resistance against ozone gas as a representative and includes resistance against oxidative atmospheres other than ozone gas. That is, the phthalocyanine compound represented by formula (I) according to the present invention is characterized by the strong resistance against oxidative gases present in the general environment, such as nitrogen oxide mostly contained in the exhaust gas of automobiles, sulfur oxide mostly contained in the exhaust from thermal power stations or factories, ozone gas generated from these gases by a photochemically caused radical chain reaction with solar light, photochemical smog abundant in oxygen-nitrogen or oxygen-hydrogen radical, and hydrogen peroxide radical generated from sites using special chemicals, for example, hair saloon. Accordingly, in the case where the image life is limited by the oxidative deterioration of image, such as outdoor advertisement and guide in railroad facility, the resistance against oxidative atmosphere, namely, the ozone gas resistance can be improved by using the phthalocyanine compound of the present invention as the image-forming material.

To summarize these, in the present invention, it has been found that specific substituents represented, for example, by —SO—Z and —$SO_2$—Z in formula (I) and —$SO_2$N—($R_1$) ($R_2$) in formula (II) are very important for the improvement of fastness (high oxidation potential) in any substitution type and furthermore confirmed that a derivative where specific substituents are selectively introduced in a specific number (for example, from 4 to 8 per one molecule of the phthalocyanine compound and in the case of the phthalocyanine represented by formula (VII), containing at least one specific substituent in each pair of (2-position and/or 3-position), (6-position and/or 7-position), (10-position and 11-position) and (14-position and 15-position)) into specific sites (for example, β-position substitution type is by far more preferred than α-position substitution type and α,β-position mixed substitution type) of the phthalocyanine nucleus is a phthalocyanine compound having a very important structural feature for achieving the objects of the present invention.

The reasons why the objects of the present invention can be achieved are not particularly known but considered because specific substituents are selectively introduced in a specific number into specific substitution sites of a phthalocyanine compound of the present invention having (1) good spectral absorption characteristics (promotion of aggregated state of phthalocyanine compound) and (2) high image fastness (for example, discoloration by an oxidative reaction between a phthalocyanine compound and an ozone gas as an electrophilic reagent is suppressed by the high oxidation potential and the promotion of firmly aggregated state) and thereby a completely β-position substitution-type phthalocyanine compound aggregate having a high oxidation potential is produced.

In these pages, the correlation between the structure and the performance of the phthalocyanine compound of the present invention is described, but the great effect on the improvement of color hue, light fastness, ozone gas resistance and the like brought about by the structural feature using specific substituents can be hardly anticipated from conventional techniques.

Specific examples of the phthalocyanine compound represented by formula (VII) of the present invention are set forth in the following tables (Compounds 101 to 226) by specifically showing $R_{11}$ to $R_{16}$, however, the phthalocyanine compound for use in the present invention is not limited thereto.

In Tables, specific examples of each pair of ($R_1R_4E$), ($R_2R_3$), ($R_5R_8$), ($R_6R_7$), ($R_9R_{12}$), ($R_{10}R_{11}$) ($R_{13}R_{16}$) and ($R_{14}R_{15}$) are independently shown in an irregular order.

| Compound | M | $R_1R_4$ | $R_2 R_3$ | $R_5R_6$ | $R_6 R_7$ |
|---|---|---|---|---|---|
| 101 | Cu | H, H | H, —SO—$(CH_2)_3SO_3Na$ | H, H | H, —SO—$(CH_2)_3SO_3Na$ |
| 102 | Cu | H, H | H, —$SO_2$—$(CH_2)_3SO_3Na$ | H, H | H, —$SO_2$—$(CH_2)_3SO_3Na$ |
| 103 | Cu | H, H | H, —SO—⟨C6H4⟩—$O(CH_2)_4SO_3Na$ | H, H | H, —SO—⟨C6H4⟩—$O(CH_2)_4SO_3Na$ |
| 104 | Cu | H, H | H, —$SO_2$—⟨C6H4⟩—$O(CH_2)_4SO_3Na$ | H, H | H, —$SO_2$—⟨C6H4⟩—$O(CH_2)_4SO_3Na$ |
| 105 | Cu | H, H | —SO—$(CH_2)_3SO_3Na$, —SO—$(CH_2)_3SO_3Na$ | H, H | —SO—$(CH_2)_3SO_3Na$, —SO—$(CH_2)_3SO_3Na$ |
| 106 | Cu | H, H | —$SO_2$—$(CH_2)_3SO_3Na$, —$SO_2$—$(CH_2)_3SO_3Na$ | H, H | —$SO_2$—$(CH_2)_3SO_3Na$, —$SO_2$—$(CH_2)_3SO_3Na$ |

-continued

| | | | | | |
|---|---|---|---|---|---|
| 107 | Cu | H, H | 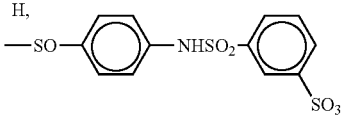 —SO—⟨phenyl⟩—NHSO₂—⟨phenyl⟩—SO₃Na | H, H | 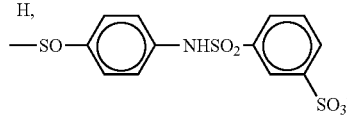 —SO—⟨phenyl⟩—NHSO₂—⟨phenyl⟩—SO₃Na |
| 108 | Cu | H, H | 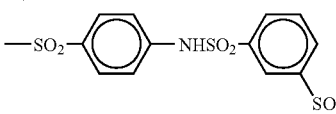 —SO₂—⟨phenyl⟩—NHSO₂—⟨phenyl⟩—SO₂Na | H, H | 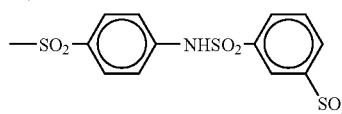 —SO₂—⟨phenyl⟩—NHSO₂—⟨phenyl⟩—SO₂Na |
| 109 | Cu | H, H | 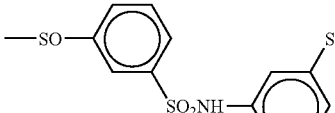 —SO—⟨phenyl⟩—SO₂NH—⟨phenyl⟩—SO₃K | H, H | 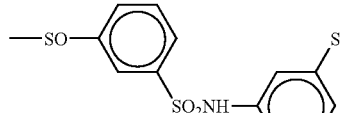 —SO—⟨phenyl⟩—SO₂NH—⟨phenyl⟩—SO₃K |
| 110 | Cu | H, H | 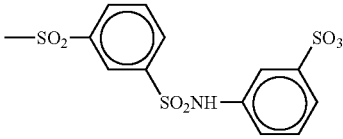 —SO₂—⟨phenyl⟩—SO₂NH—⟨phenyl⟩—SO₃K | H, H | 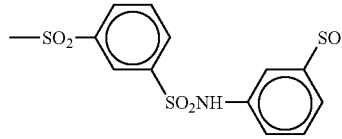 —SO₂—⟨phenyl⟩—SO₂NH—⟨phenyl⟩—SO₃K |
| 111 | Cu | H, H | 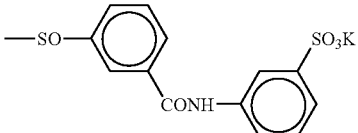 —SO—⟨phenyl⟩—CONH—⟨phenyl⟩(SO₃K)(SO₃K) | H, H |  —SO—⟨phenyl⟩—CONH—⟨phenyl⟩(SO₃K)(SO₃K) |
| 112 | Cu | H, H | 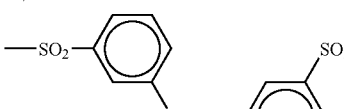 —SO₂—⟨phenyl⟩—CONH—⟨phenyl⟩(SO₃K)(SO₃K) | H, H | 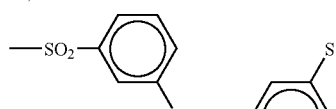 —SO₂—⟨phenyl⟩—CONH—⟨phenyl⟩(SO₃K)(SO₃K) |
| 113 | Cu | H, H | 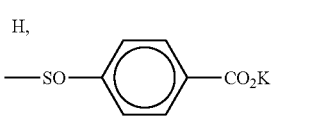 —SO—⟨phenyl⟩—CO₂K | H, H | 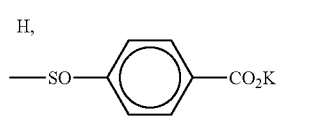 —SO—⟨phenyl⟩—CO₂K |
| 114 | Cu | H, H | 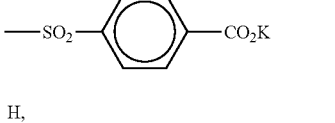 —SO₂—⟨phenyl⟩—CO₂K | H, H | 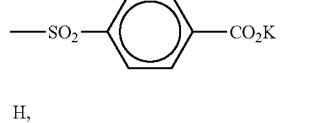 —SO₂—⟨phenyl⟩—CO₂K |
| 115 | Cu | H, H |  —SO—⟨phenyl⟩—CO₂Na | H, H |  —SO—⟨phenyl⟩—CO₂Na |

-continued

| | | | | | |
|---|---|---|---|---|---|
| 116 | Cu | H, H | —SO₂—C₆H₄(CO₂Na) (2-CO₂Na) | H, H | —SO₂—C₆H₄(CO₂Na) (2-CO₂Na) |
| 117 | Cu | H, H | —SO—(2-imidazolyl, N-(CH₂)₄SO₃K) | H, H | —SO—(2-imidazolyl, N-(CH₂)₄SO₃K) |
| 118 | Cu | H, H | —SO₂—(2-imidazolyl, N-(CH₂)₄SO₃K) | H, H | —SO₂—(2-imidazolyl, N-(CH₂)₄SO₃K) |
| 119 | Cu | H, H | —SO—(2-benzimidazolyl, N-(CH₂)₃SO₃Na) | H, H | —SO—(2-benzimidazolyl, N-(CH₂)₃SO₃Na) |
| 120 | Cu | H, H | —SO₂—(2-benzimidazolyl, N-(CH₂)₃SO₃Na) | H, H | —SO₂—(2-benzimidazolyl, N-(CH₂)₃SO₃Na) |
| 121 | Cu | H, H | —SO—(1,2,4-triazol-3-yl, 4-(CH₂)₃SO₃K) | H, H | —SO—(1,2,4-triazol-3-yl, 4-(CH₂)₃SO₃K) |
| 122 | Cu | H, H | —SO₂—(1,2,4-triazol-3-yl, 4-(CH₂)₃SO₃K) | H, H | —SO₂—(1,2,4-triazol-3-yl, 4-(CH₂)₃SO₃K) |
| 123 | Cu | H, H | —SO—(4-methyl-5-(CH₂CO₂Na)-thiazol-2-yl) | H, H | —SO—(4-methyl-5-(CH₂CO₂Na)-thiazol-2-yl) |
| 124 | Cu | H, H | —SO₂—(4-methyl-5-(CH₂CO₂Na)-thiazol-2-yl) | H, H | —SO₂—(4-methyl-5-(CH₂CO₂Na)-thiazol-2-yl) |

-continued

| 125 | Cu | H, H | H, 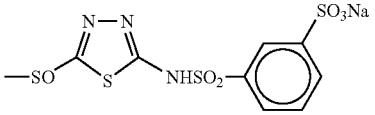 | H, H | H, 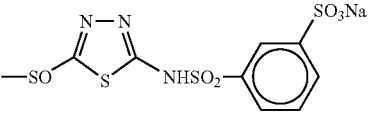 |
| 126 | Cu | H, H | H, 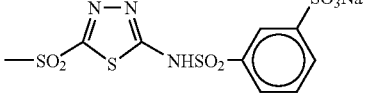 | H, H | H, 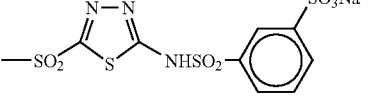 |
| 127 | Cu | H, H | H, 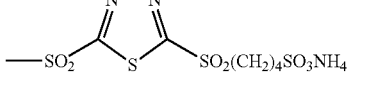 | H, H | H, 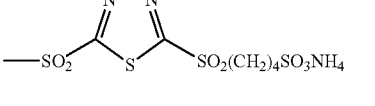 |
| 128 | Cu | H, H | H, 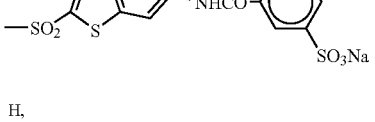 | H, H | H, 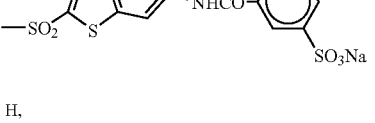 |
| 129 | Cu | H, H | H, 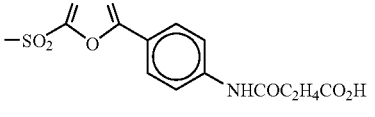 | H, H | H, 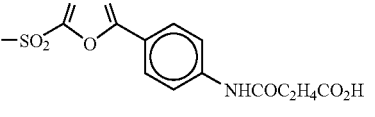 |
| 130 | Cu | H, H | H, 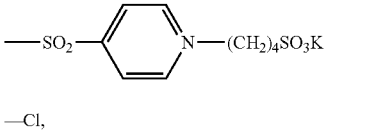 | H, H | H, 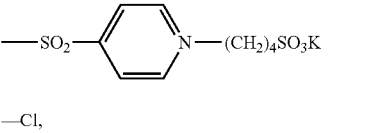 |
| 131 | Cu | H, H | —Cl, —SO$_2$—(CH$_2$)$_3$SO$_3$Na | H, H | —Cl, —SO$_2$—(CH$_2$)$_3$SO$_3$Na |
| 132 | Cu | H, H | —OCH$_3$, —SO—(CH$_2$)$_3$SO$_3$Na | H, H | —OCH$_3$, —SO—(CH$_2$)$_3$SO$_3$Na |
| 133 | Cu | H, H | —CN, —SO$_2$—(CH$_2$)$_4$—SO$_3$K | H, H | —CN, —SO$_2$—(CH$_2$)$_4$—SO$_3$K |
| 134 | Ni | H, H | —SO$_2$—(CH$_2$)$_3$SO$_3$Na, —SO$_2$—(CH$_2$)$_3$SO$_3$Na | H, H | —SO$_2$—(CH$_2$)$_3$SO$_3$Na, —SO$_2$—(CH$_2$)$_3$SO$_3$Na |
| 135 | Zn | H, H | H, —SO$_2$—(CH$_2$)$_3$SO$_3$Na | H, H | H, —SO$_2$—(CH$_2$)$_3$SO$_3$Na |
| 136 | Cu | H, H | H, 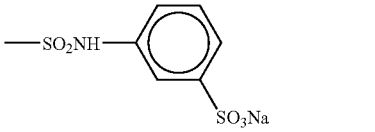 | H, H | H, 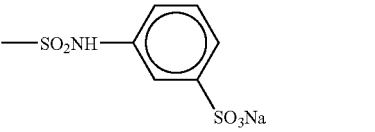 |
| 137 | Cu | H, H | H, 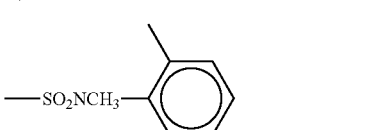 | H, H | H, 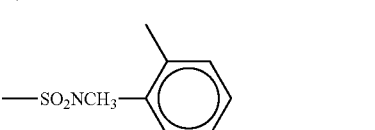 |

-continued
| | | | | | |
|---|---|---|---|---|---|
| 138 | Cu | H, H | H, 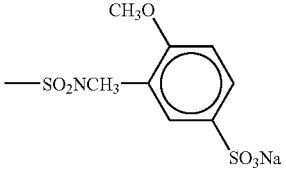 | H, H | H, 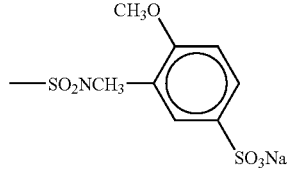 |
| 139 | Cu | H, H | H, 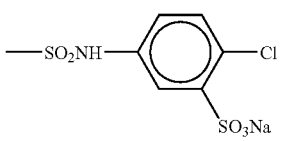 | H, H | H, 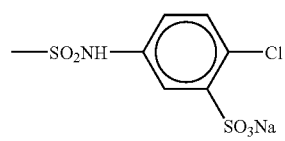 |
| 140 | Cu | H, H | H, 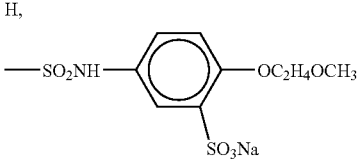 | H, H | H, 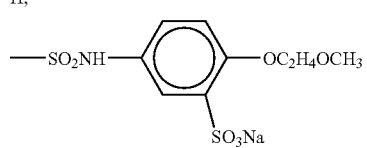 |
| 141 | Cu | H, H | H, 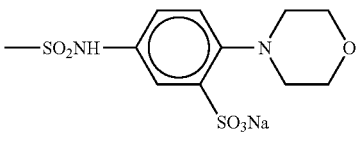 | H, H | H, 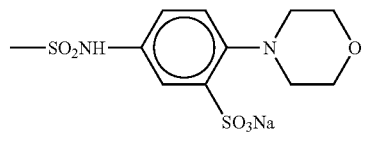 |
| 142 | Cu | H, H | H, 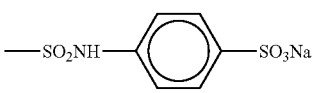 | H, H | H, 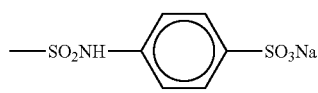 |
| 143 | Cu | H, H | H, 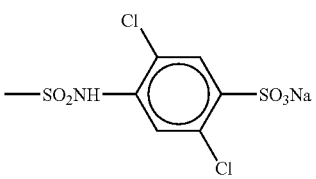 | H, H | H, 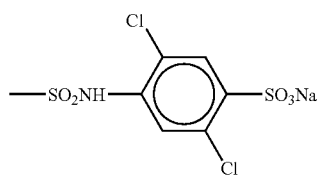 |
| 144 | Cu | H, H | H, 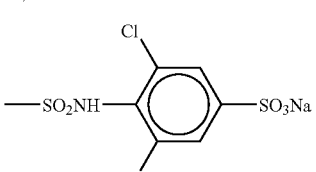 | H, H | H, 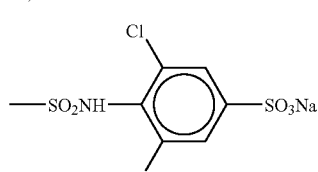 |
| 145 | Cu | H, H | H, 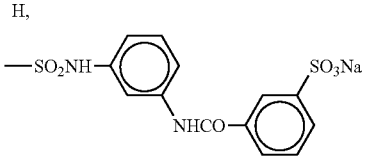 | H, H | H, 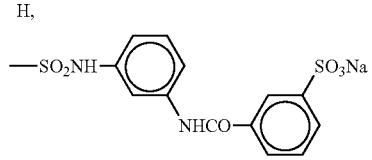 |

-continued
| | | | | | |
|---|---|---|---|---|---|
| 146 | Cu | H, H | H, 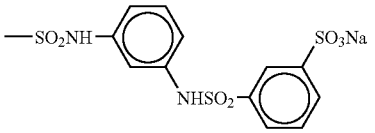 | H, H | H, 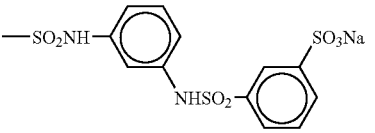 |
| 147 | Cu | H, H | H, 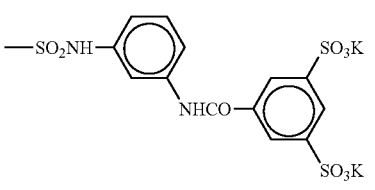 | H, H | H, 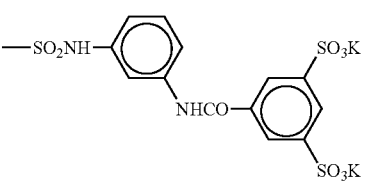 |
| 148 | Cu | H, H | H, 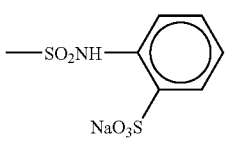 | H, H | H, 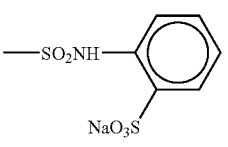 |
| 149 | Cu | H, H | H, 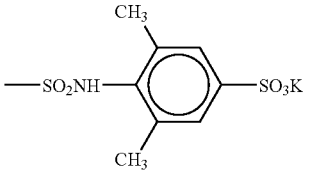 | H, H | H, 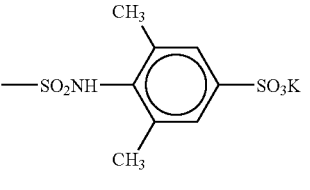 |
| 150 | Cu | H, H | H, 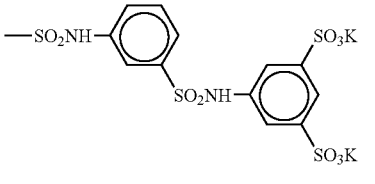 | H, H | H, 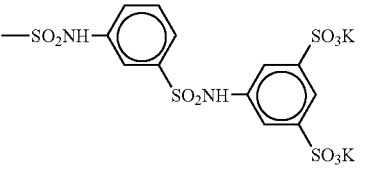 |
| 151 | Cu | H, H | H, 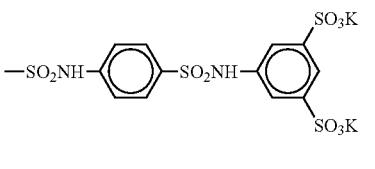 | H, H | H, 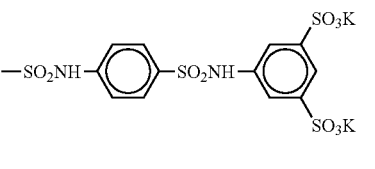 |
| 152 | Cu | H, H | H, 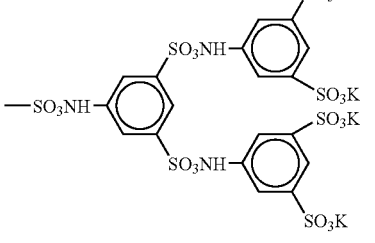 | H, H | H, 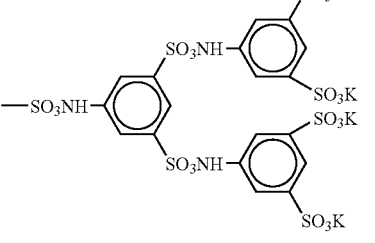 |

-continued
| | | | | | |
|---|---|---|---|---|---|
| 153 | Cu | H, H | H, 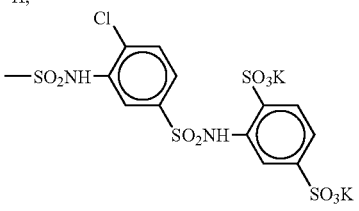 | H, H | H, 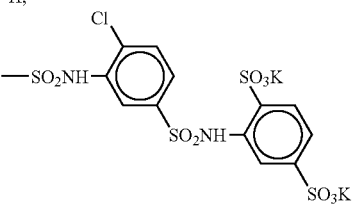 |
| 154 | Cu | H, H | H, 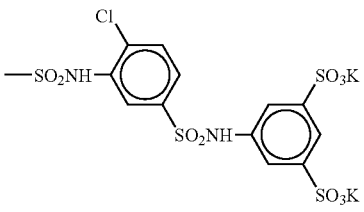 | H, H | H, 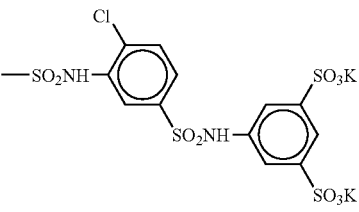 |
| 155 | Cu | H, H | H, 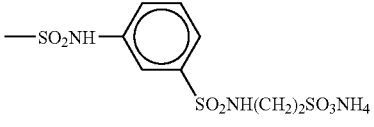 | H, H | H, 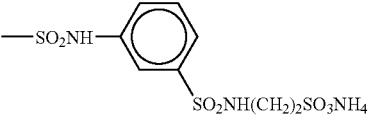 |
| 156 | Cu | H, H | H, 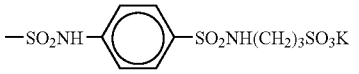 | H, H | H, 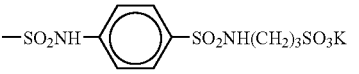 |
| 157 | Cu | H, H | H, 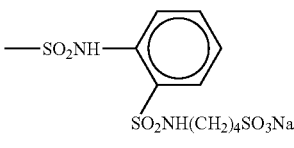 | H, H | H, 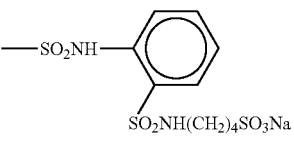 |
| 158 | Cu | H, H | H, 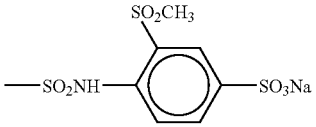 | H, H | H, 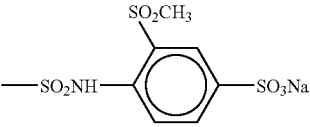 |
| 159 | Cu | H, H | H, 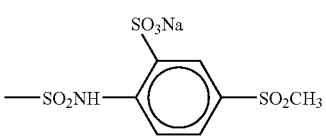 | H, H | H, 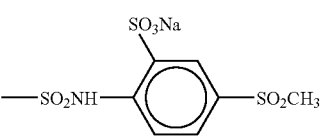 |
| 160 | Cu | H, H | H, 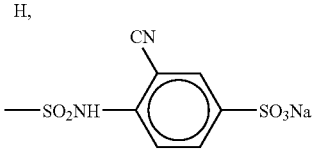 | H, H | H, 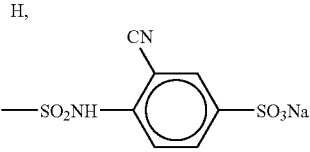 |

| | | | | | |
|---|---|---|---|---|---|
| 161 | Cu | H, H | 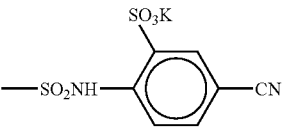 | H, H | 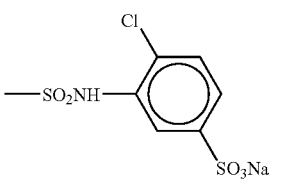 |
| 162 | Zn | H, H | 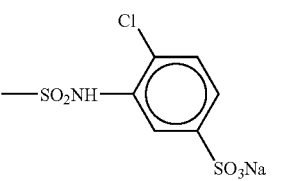 | H, H | 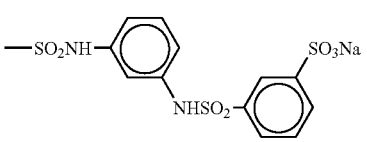 |
| 163 | Ni | H, H | 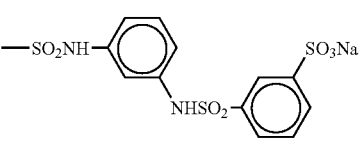 | H, H | 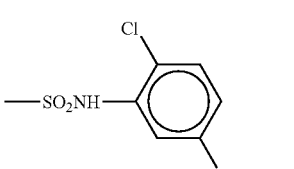 |
| 164 | Cu | H, Cl | 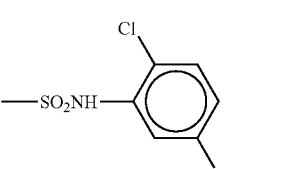 | H, Cl | 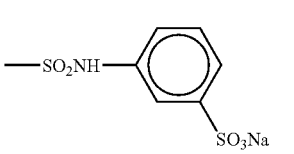 |
| 165 | Cu | H, SO₂CH₃ | 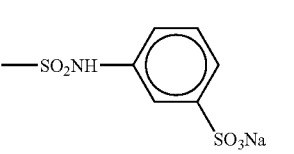 | H, SO₂CH₃ | 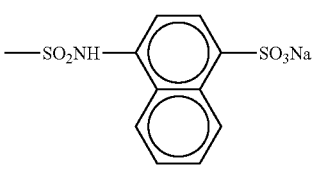 |
| 166 | Cu | H, H | 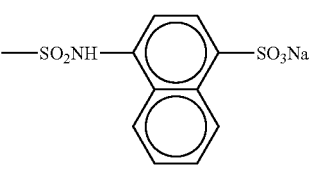 | H, H | 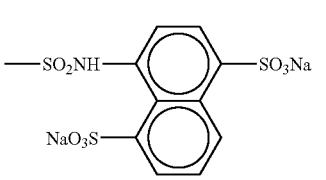 |
| 167 | Cu | H, H | 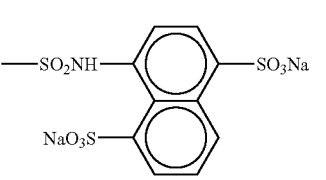 | H, H | |

| | | | | | |
|---|---|---|---|---|---|
| 168 | Cu | H, H | H, 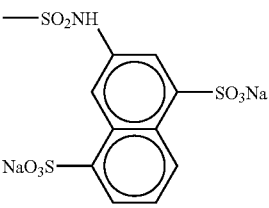 | H, H | H, 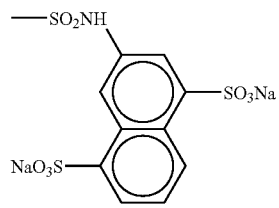 |
| 169 | Cu | H, H | H, 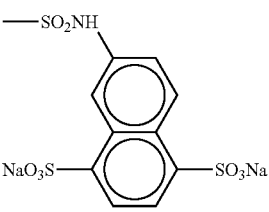 | H, H | H, 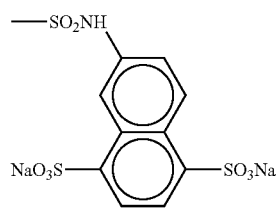 |
| 170 | Cu | H, H | H, 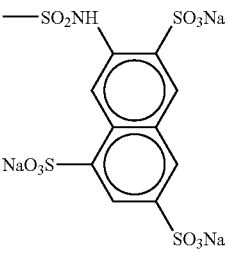 | H, H | H, 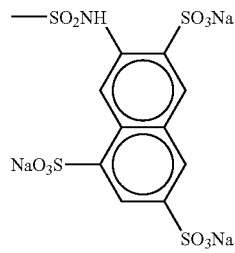 |
| 171 | Cu | H, H | H, 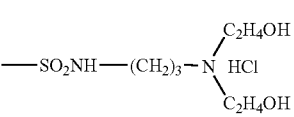 | H, H | H, 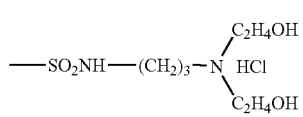 |
| 172 | Cu | H, H | H, 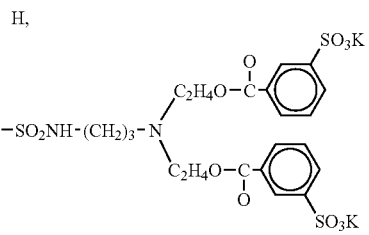 | H, H | H, 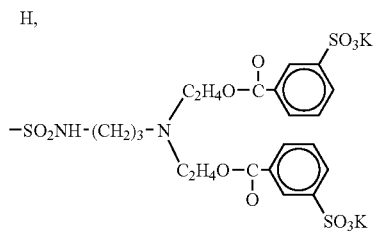 |
| 173 | Cu | H, H | H, 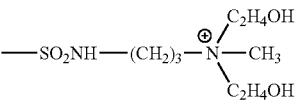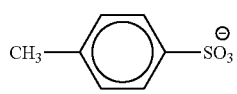 | H, H | H, 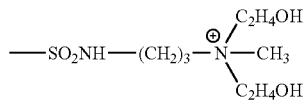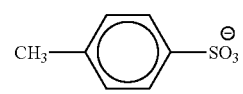 |

-continued
| | | | | | |
|---|---|---|---|---|---|
| 174 | Ni | H, H | 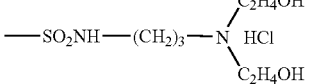 | H, H | 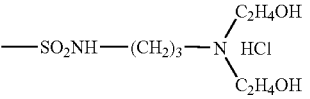 |
| 175 | Cu | H, H | 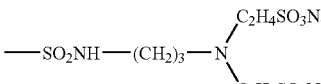 | H, H | 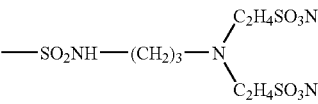 |
| 176 | Zn | H, H | 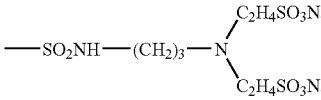 | H, H | 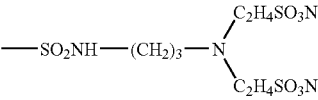 |
| 177 | Cu | H, H | 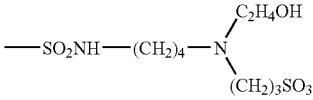 | H, H | 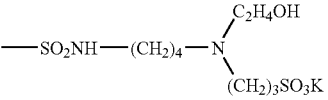 |
| 178 | Cu | H, H | 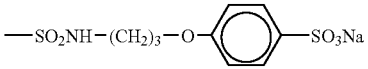 | H, H | 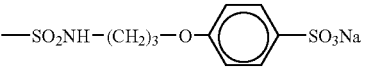 |
| 179 | Cu | H, H | 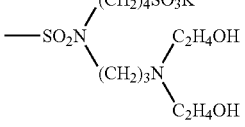 | H, H | 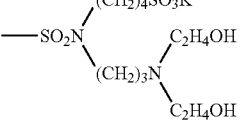 |
| 180 | Cu | H, H | H, —SO$_2$NH—(CH$_2$)$_3$—SO$_3$Na | H, H | H, —SO$_2$NH—(CH$_2$)$_3$—SO$_3$Na |
| 181 | Cu | H, H | 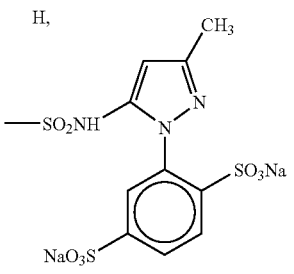 | H, H | H 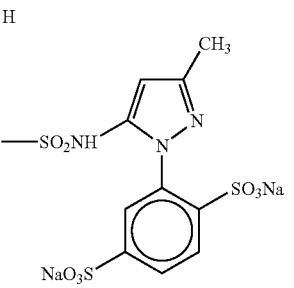 |
| 182 | Cu | H, H | CH$_3$, 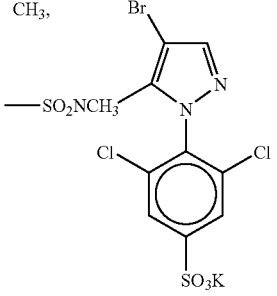 | H, H | CH$_3$ 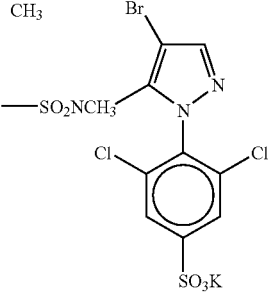 |

-continued

| # | M | | | Structure (left) | | Structure (right) |
|---|---|---|---|---|---|---|
| 183 | Ni | H, H | H, | [pyrazole with SO2NH, 2,5-dichlorophenyl, SO2K] | H, H | H [pyrazole with SO2NH, 2,5-dichlorophenyl, SO2K] |
| 184 | Cu | H, H | H, | [4-CN pyrazole with SO2NH, 2,6-dichlorophenyl, SO3K] | H, H | H [4-CN pyrazole with SO2NH, 2,6-dichlorophenyl, SO3K] |
| 185 | Zn | H, H | H, | [3-t-C4H9 pyrazole with SO2NH, 3,5-bis(NaO3S)phenyl] | H, H | H [3-t-C4H9 pyrazole with SO2NH, 3,5-bis(NaO3S)phenyl] |
| 186 | Cu | H, H | H, | [3-phenyl pyrazole with SO2NH, 2-SO3K, 4-KO3S-phenyl] | H, H | H [3-phenyl pyrazole with SO2NH, 2-SO3K, 4-KO3S-phenyl] |
| 187 | Cu | H, H | H, | [3-SCH3 triazole with SO2NH, 2-SO3Na, 4-NaO3S-phenyl] | H, H | H [3-SCH3 triazole with SO2NH, 2-SO3Na, 4-NaO3S-phenyl] |

-continued
| 188 | Cu | H, H | H, 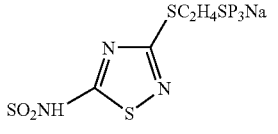 | H, H | H 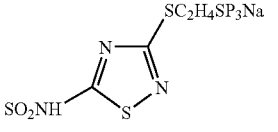 |
| 189 | Cu | H, H | H, 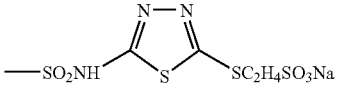 | H, H | H 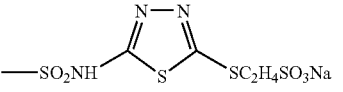 |
| 190 | Cu | H, H | H, 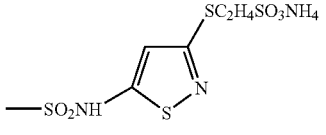 | H, H | H 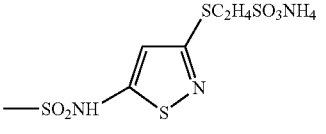 |
| 191 | Cu | H, H | H, 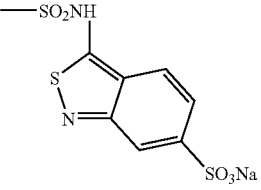 | H, H | H 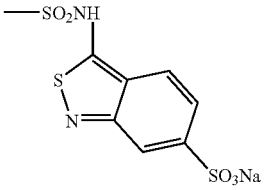 |
| 192 | Cu | H, H | H, 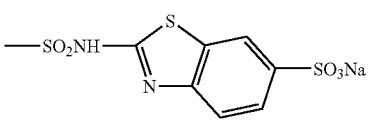 | H, H | H 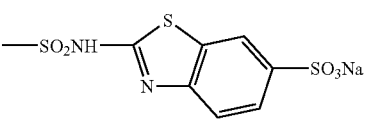 |
| 193 | Cu | H, H | H, 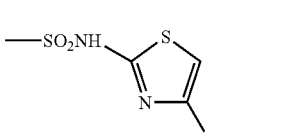 | H, H | H 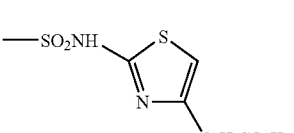 |
| 194 | Cu | H, H | H, 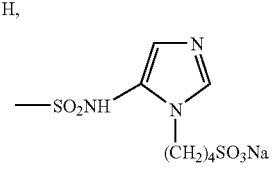 | H, H | H 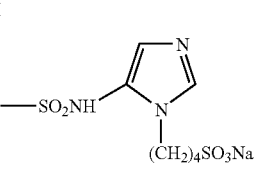 |
| 195 | Cu | H, H | H, 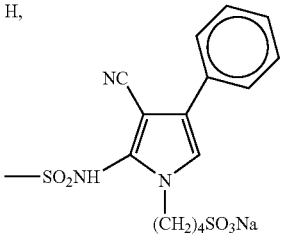 | H, H | H 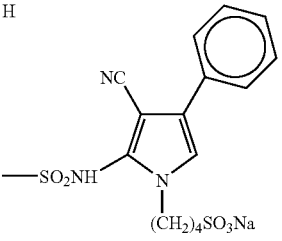 |

-continued
| | | | | | | |
|---|---|---|---|---|---|---|
| 196 | Cu | H, H | H, 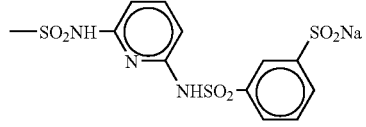 | H, H | H 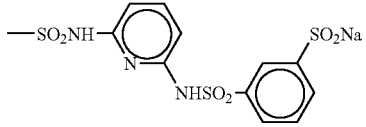 | | |
| 197 | Cu | H, H | H, 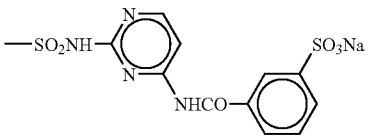 | H, H | H 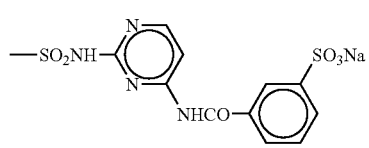 | | |
| 198 | Cu | H, H | H, 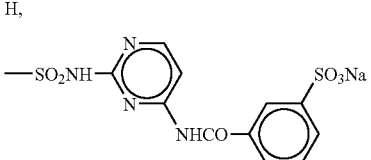 | H, H | H 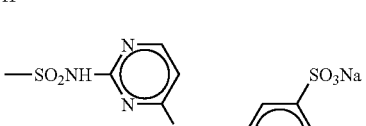 | | |
| 199 | Cu | H, H | H, 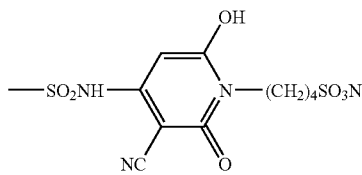 | H, H | H 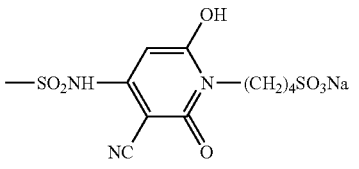 | | |
| 200 | Cu | H, SCH$_3$ | H, 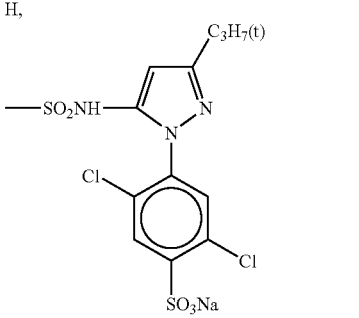 | H, SCH$_3$ | H 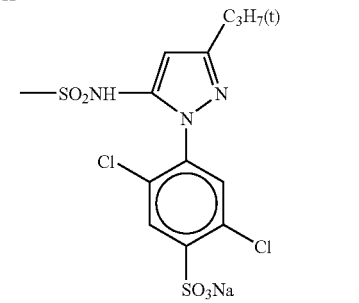 | | |
| 201 | Cu | H, H | H, 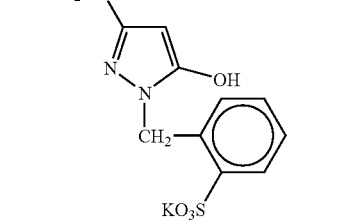 | H, H | H 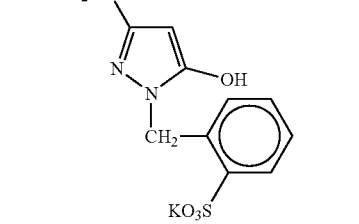 | | |

-continued
| | | | | | |
|---|---|---|---|---|---|
| 202 | Cu | H, H | H, 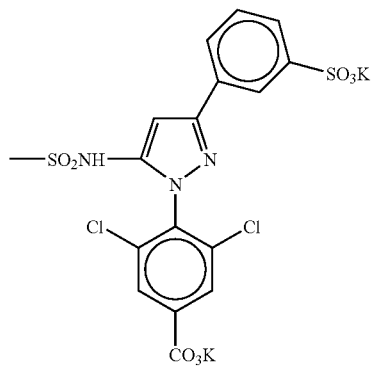 | H, H | H 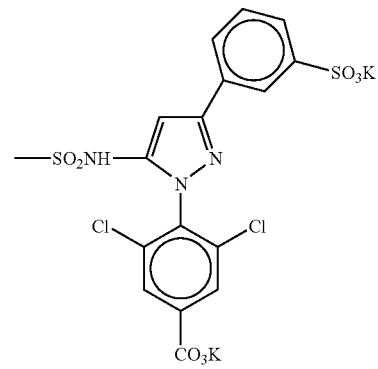 |
| 203 | Cu | H, H | H, 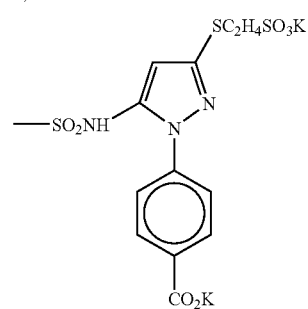 | H, H | H 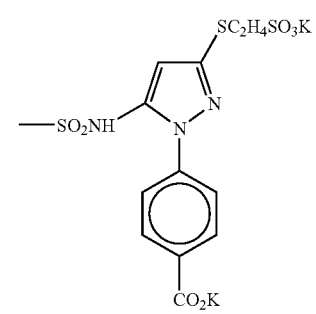 |
| 204 | Cu | H, H | H, 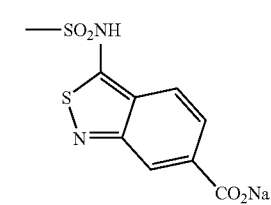 | H, H | H 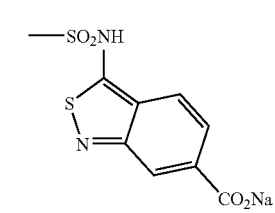 |
| 205 | Cu | H, H | H, 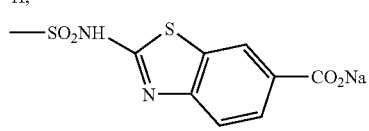 | H, H | H 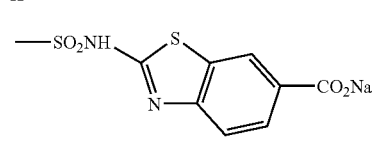 |
| 206 | Cu | H, Cl | H, 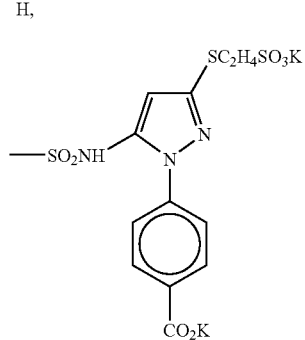 | H, Cl | H 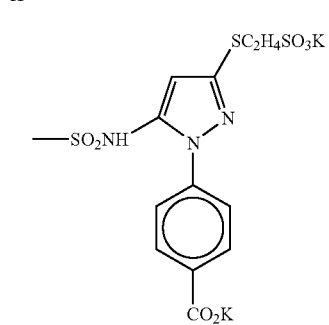 |

-continued

| | | | | | |
|---|---|---|---|---|---|
| 207 | Cu | H, SCH₃ | H, [structure: pyrazole with —SO₂NH—, SC₂H₄SO₃K, N-phenyl-CO₂K] | H, SCH₃ | H [structure: pyrazole with —SO₂NH—, SC₂H₄SO₃K, N-phenyl-CO₂K] |
| 208 | Cu | H, Cl | H, [structure: pyrazole with —SO₂NH—, OH, N-phenyl-SO₃Na] | H, Cl | H [structure: pyrazole with —SO₂NH—, OH, N-phenyl-SO₃Na] |
| 209 | Ni | H, H | H, [structure: pyrazole with —SO₂NH—, OH, N-phenyl-CO₂K] | H, H | H [structure: pyrazole with —SO₂NH—, OH, N-phenyl-CO₂K] |
| 210 | Zn | H, H | H, [structure: benzisothiazole with —SO₂NH— and CO₂Na] | H, H | H [structure: benzisothiazole with —SO₂NH— and CO₂Na] |
| 211 | Cu | H, H | H, [structure: —SO₂—pyrrolidine—NHSO₂—phenyl—SO₃K] | H, H | H, [structure: —SO₂—pyrrolidine—NHSO₂—phenyl—SO₃K] |
| 212 | Cu | H, H | H, [structure: —SO₂—pyrrolidine—O(CH₂)₃SO₃Na] | H, H | H, [structure: —SO₂—pyrrolidine—O(CH₂)₃SO₃Na] |

-continued
| | | | | | |
|---|---|---|---|---|---|
| 213 | Cu | H, H | H,  | H, H | H,  |
| 214 | Cu | H, H | H,  | H, H | H,  |
| 215 | Cu | H, H | H,  | H, H | H,  |
| Compound | $R_9\ R_{12}$ | $R_{10}\ R_{11}$ | $R_{13}\ R_{16}$ | $R_{14}\ R_{15}$ |
|---|---|---|---|---|
| 101 | H, H | H, —SO—(CH)$_3$SO$_3$Na | H, H | H, —SO—(CH)$_3$SO$_3$Na |
| 102 | H, H | H, —SO$_2$—(CH)$_3$SO$_3$Na | H, H | H, —SO$_2$—(CH)$_3$SO$_3$Na |
| 103 | H, H | H,  | H, H |  |
| 104 | H, H | H,  | H, H | H,  |
| 105 | H, H | —SO—(CH)$_3$SO$_3$Na, —SO—(CH)$_3$SO$_3$Na | H, H | —SO—(CH)$_3$SO$_3$Na, —SO—(CH)$_3$SO$_3$Na |
| 106 | H, H | —SO$_2$—(CH)$_3$SO$_3$Na, —SO$_2$—(CH)$_3$SO$_3$Na | H, H | —SO$_2$—(CH)$_3$SO$_3$Na, —SO$_2$—(CH)$_3$SO$_3$Na |
| 107 | H, H | H,  | H, H | H,  |
| 108 | H, H | H,  | H, H | H,  |

-continued
| | | | | |
|---|---|---|---|---|
| 109 | H, H | H, —SO— 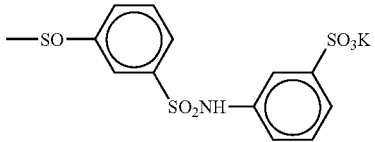 | | H, H | —SO— 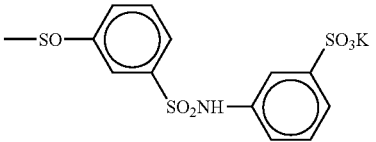 |
| 110 | H, H | H, —SO₂— 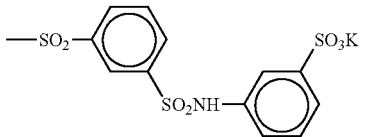 | | H, H | —SO₂— 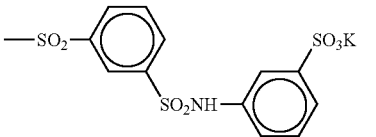 |
| 111 | H, H | H, —SO— 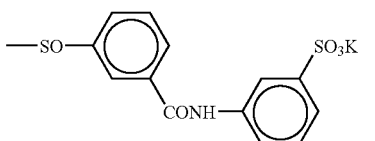 | | H, H | —SO— 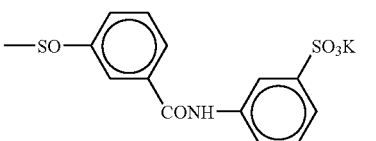 |
| 112 | H, H | H, —SO₂— 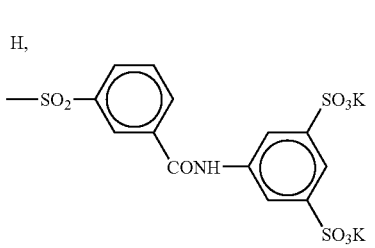 | | H, H | —SO₂— 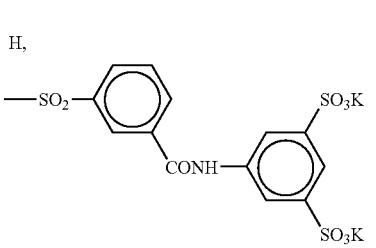 |
| 113 | H, H | H, —SO— 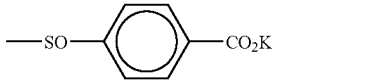 | | H, H | —SO— 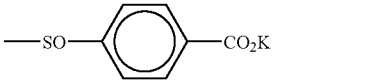 |
| 114 | H, H | H, —SO₂— 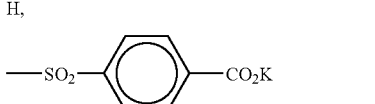 | | H, H | —SO₂— 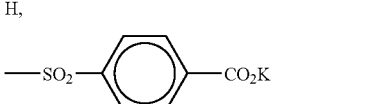 |
| 115 | H, H | H, —SO— 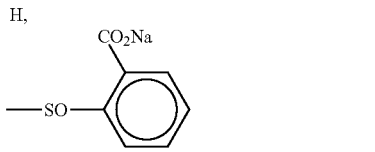 | | H, H | —SO— 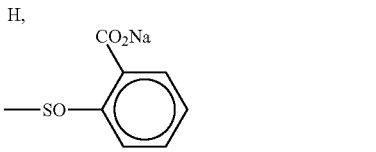 |
| 116 | H, H | H, —SO₂— 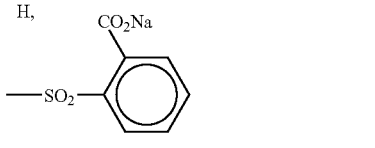 | | H, H | —SO₂— 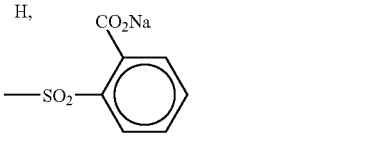 |
| 117 | H, H | H, —SO— 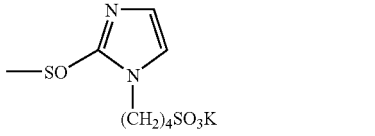 | | H, H | —SO— 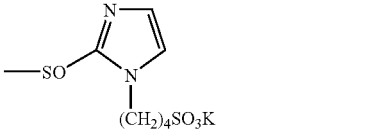 |

-continued
| 118 | H, H | H, 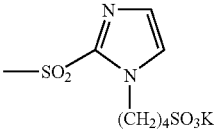 | H, H | H, 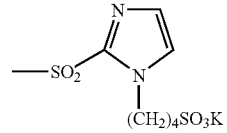 |
| 119 | H, H | H, 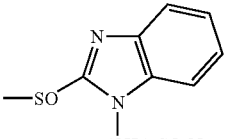 | H, H | H, 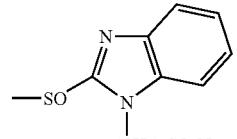 |
| 120 | H, H | H, 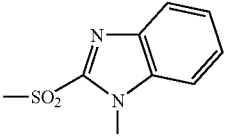 | H, H | H, 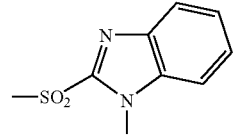 |
| 121 | H, H | H, 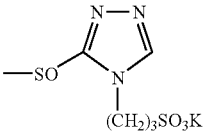 | H, H | H, 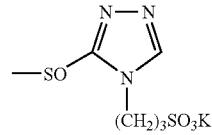 |
| 122 | H, H | H, 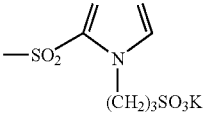 | H, H | H, 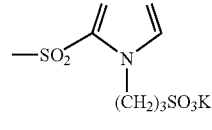 |
| 123 | H, H | H, 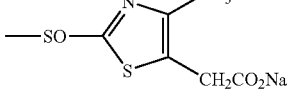 | H, H | H, 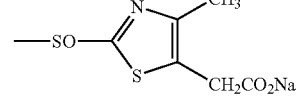 |
| 124 | H, H | H, 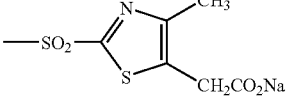 | H, H | H, 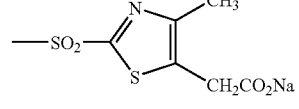 |
| 125 | H, H | H, 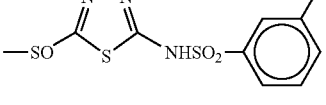 | H, H | H, 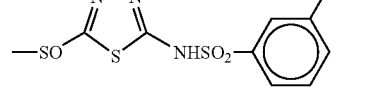 |
| 126 | H, H | H, 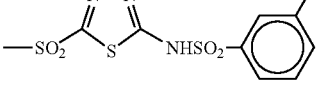 | H, H | H, 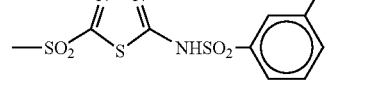 |

-continued
| | | | | |
|---|---|---|---|---|
| 127 | H, H | 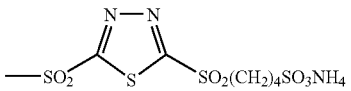 | H, H | 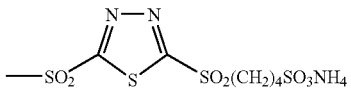 |
| 128 | H, H | 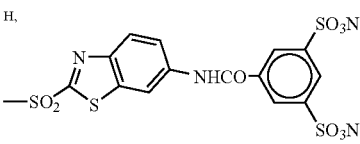 | H, H | 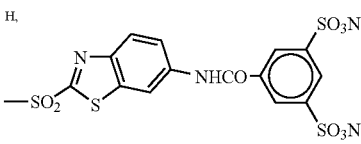 |
| 129 | H, H | 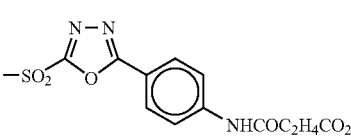 | H, H | 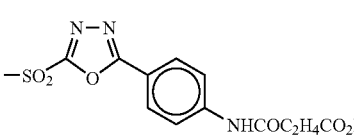 |
| 130 | H, H | 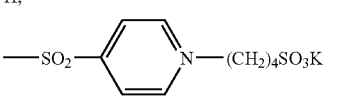 | H, H | 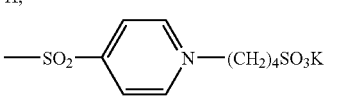 |
| 131 | H, H | —Cl, —SO$_2$—(CH$_3$)SO$_3$Na | H, H | —Cl, —SO$_2$—(CH$_3$)SO$_3$Na |
| 132 | H, H | —OCH$_3$, —SO—(CH$_3$)SO$_3$Na | H, H | —OCH$_3$, —SO—(CH$_3$)SO$_3$Na |
| 133 | H, H | —CN, —SO$_2$—(CH$_2$)$_4$—SO$_3$K | H, H | —CN, —SO$_2$—(CH$_2$)$_4$—SO$_3$K |
| 134 | H, H | —SO$_2$—(CH$_3$)SO$_3$Na, —SO$_2$—(CH$_3$)SO$_3$Na | H, H | —SO$_2$—(CH$_3$)SO$_3$Na, —SO$_2$—(CH$_3$)SO$_3$Na |
| 135 | H, H | H, —SO$_2$—(CH$_3$)SO$_3$Na | H, H | H, —SO$_2$—(CH$_3$)SO$_3$Na |
| 136 | H, H | 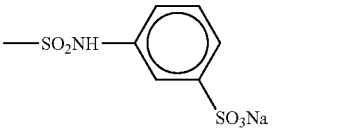 | H, H | 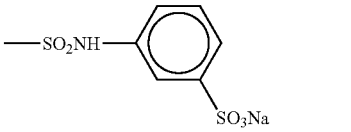 |
| 137 | H, H | 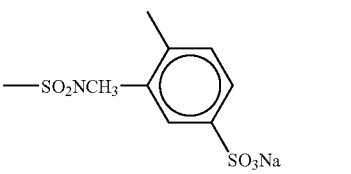 | H, H | 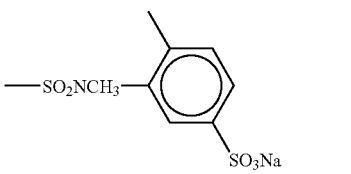 |
| 138 | H, H | 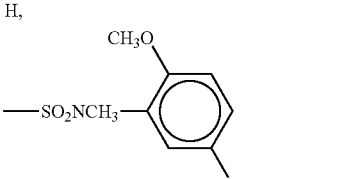 | H, H | 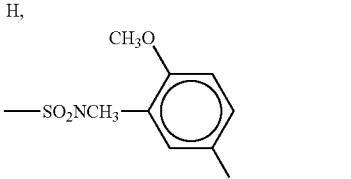 |
| 139 | H, H | 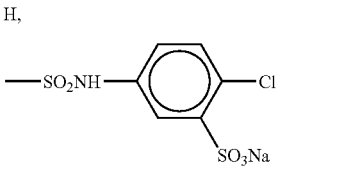 | H, H | 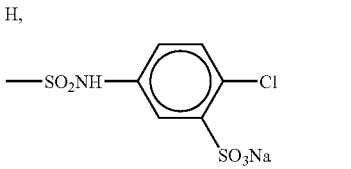 |

-continued
| | | | | |
|---|---|---|---|---|
| 140 | H, H | H, 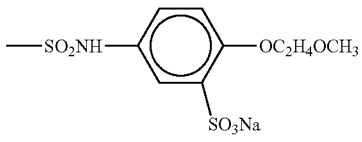 | | H, H | H, 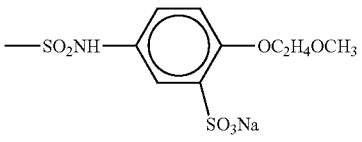 |
| 141 | H, H | H, 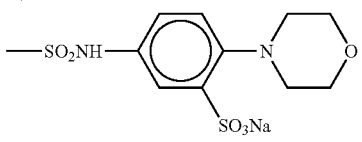 | | H, H | H, 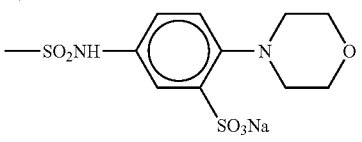 |
| 142 | H, H | H,  | | H, H | H, 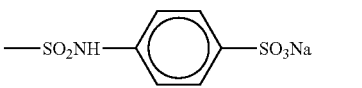 |
| 143 | H, H | H, 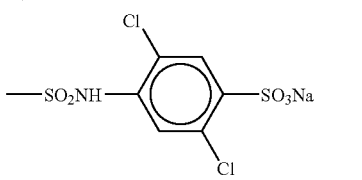 | | H, H | H, 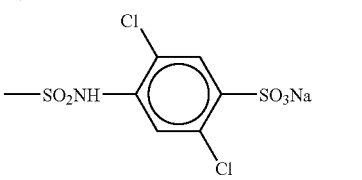 |
| 144 | H, H | H, 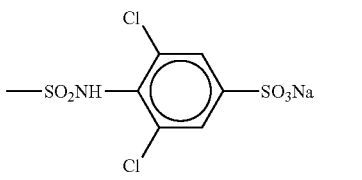 | | H, H | H, 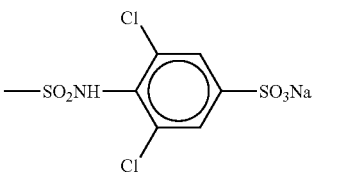 |
| 145 | H, H | H, 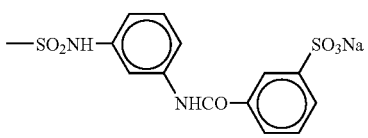 | | H, H | H,  |
| 146 | H, H | H, 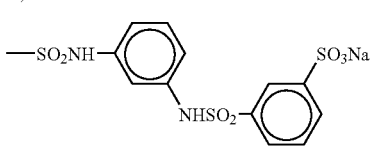 | | H, H | H, 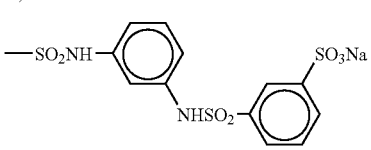 |
| 147 | H, H | H, 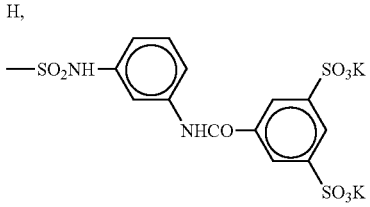 | | H, H | H, 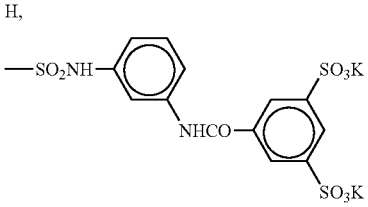 |

-continued
| | | | | |
|---|---|---|---|---|
| 148 | H, H | H, 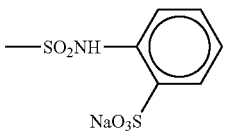 | H, H | H, 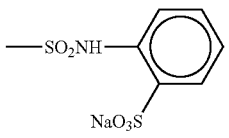 |
| 149 | H, H | H, 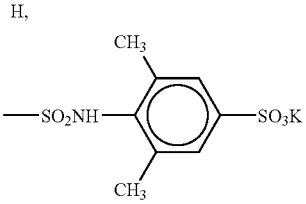 | H, H | H, 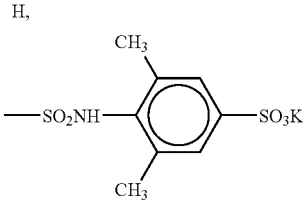 |
| 150 | H, H | H, 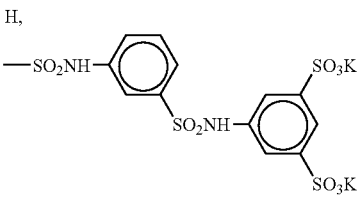 | H, H | H, 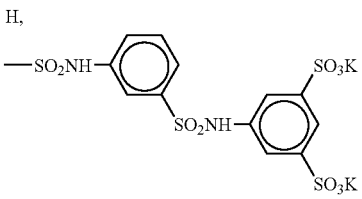 |
| 151 | H, H | H, 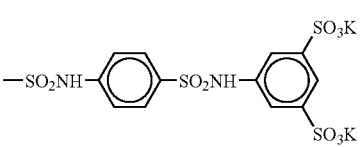 | H, H | H, 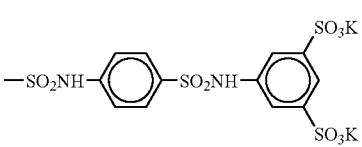 |
| 152 | H, H | H, 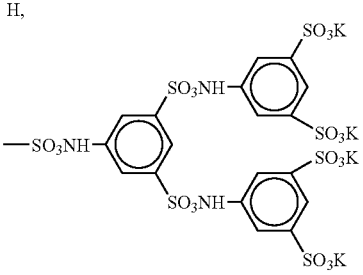 | H, H | H, 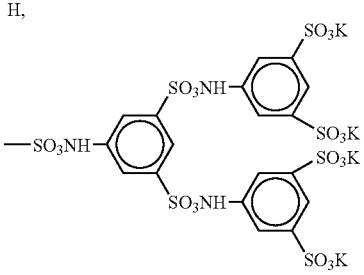 |
| 153 | H, H | H, 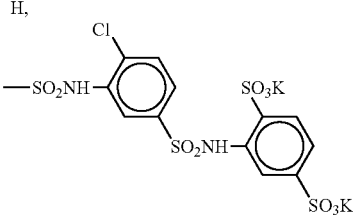 | H, H | H, 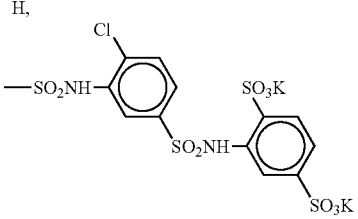 |
| 154 | H, H | H, 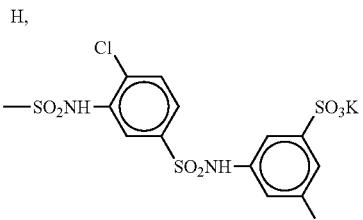 | H, H | H, 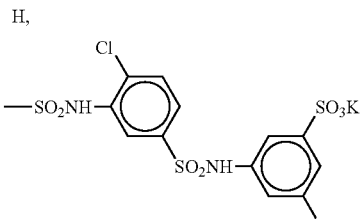 |

| | | | | |
|---|---|---|---|---|
| 155 | H, H | H, —SO$_2$NH—C$_6$H$_3$(SO$_2$NH(CH$_2$)$_2$SO$_3$NH$_4$) | H, H | H, —SO$_2$NH—C$_6$H$_3$(SO$_2$NH(CH$_2$)$_2$SO$_3$NH$_4$) |
| 156 | H, H | H, —SO$_2$NH—C$_6$H$_4$—SO$_2$NH(CH$_2$)$_3$SO$_3$K | H, H | H, —SO$_2$NH—C$_6$H$_4$—SO$_2$NH(CH$_2$)$_3$SO$_3$K |
| 157 | H, H | H, —SO$_2$NH—C$_6$H$_4$(SO$_2$NH(CH$_2$)$_4$SO$_3$Na) | H, H | H, —SO$_2$NH—C$_6$H$_4$(SO$_2$NH(CH$_2$)$_4$SO$_3$Na) |
| 158 | H, H | H, —SO$_2$NH—C$_6$H$_3$(SO$_2$CH$_3$)(SO$_3$Na) | H, H | H, —SO$_2$NH—C$_6$H$_3$(SO$_2$CH$_3$)(SO$_3$Na) |
| 159 | H, H | H, —SO$_2$NH—C$_6$H$_3$(SO$_3$Na)(SO$_2$CH$_3$) | H, H | H, —SO$_2$NH—C$_6$H$_3$(SO$_3$Na)(SO$_2$CH$_3$) |
| 160 | H, H | H, —SO$_2$NH—C$_6$H$_3$(CN)(SO$_3$Na) | H, H | H, —SO$_2$NH—C$_6$H$_3$(CN)(SO$_3$Na) |
| 161 | H, H | H, —SO$_2$NH—C$_6$H$_3$(SO$_3$K)(CN) | H, H | H, —SO$_2$NH—C$_6$H$_3$(SO$_3$K)(CN) |
| 162 | H, H | H, —SO$_2$NH—C$_6$H$_3$(Cl)(SO$_3$Na) | H, H | H, —SO$_2$NH—C$_6$H$_3$(Cl)(SO$_3$Na) |
| 163 | H, H | H, —SO$_2$NH—C$_6$H$_4$—NHSO$_2$—C$_6$H$_4$—SO$_3$Na | H, H | H, —SO$_2$NH—C$_6$H$_4$—NHSO$_2$—C$_6$H$_4$—SO$_3$Na |

-continued

| | | | | | |
|---|---|---|---|---|---|
| 164 | H, Cl | H, | [structure: —SO₂NH-(2-Cl, 5-SO₃Na phenyl)] | H, Cl | H, | [structure: —SO₂NH-(2-Cl, 5-SO₃Na phenyl)] |
| 165 | H, SO₂CH₃ | H, | [structure: —SO₂NH-(3-SO₃Na phenyl)] | H, SO₂CH₃ | H, | [structure: —SO₂NH-(3-SO₃Na phenyl)] |
| 166 | H, H | H, | [structure: —SO₂NH-naphthyl-SO₃Na] | H, H | H, | [structure: —SO₂NH-naphthyl-SO₃Na] |
| 167 | H, H | H, | [structure: —SO₂NH-naphthyl with SO₃Na and NaO₃S] | H, H | H, | [structure: —SO₂NH-naphthyl with SO₃Na and NaO₃S] |
| 168 | H, H | H, | [structure: —SO₂NH-naphthyl with SO₃Na and NaO₃S] | H, H | H, | [structure: —SO₂NH-naphthyl with SO₃Na and NaO₃S] |
| 169 | H, H | H, | [structure: —SO₂NH-naphthyl with two SO₃Na and NaO₃S] | H, H | H, | [structure: —SO₂NH-naphthyl with two SO₃Na and NaO₃S] |

-continued

| | | | | |
|---|---|---|---|---|
| 170 | H, H | ![naphthalene with —SO₂NH—, SO₃Na, NaO₃S, SO₃Na substituents] | H, H | ![naphthalene with —SO₂NH—, SO₃Na, NaO₃S, SO₃Na substituents] |
| 171 | H, H | —SO₂NH—(CH₂)₃—N(C₂H₄OH)₂·HCl | H, H | —SO₂NH—(CH₂)₃—N(C₂H₄OH)₂·HCl |
| 172 | H, H | —SO₂NH-(CH₂)₃-N(C₂H₄O-CO-C₆H₄-SO₃K)₂ | H, H | —SO₂NH-(CH₂)₃-N(C₂H₄O-CO-C₆H₄-SO₃K)₂ |
| 173 | H, H | —SO₂NH—(CH₂)₃—N⁺(C₂H₄OH)(CH₃)(C₂H₄OH) · CH₃-C₆H₄-SO₃⁻ | H, H | —SO₂NH—(CH₂)₃—N⁺(C₂H₄OH)(CH₃)(C₂H₄OH) · CH₃-C₆H₄-SO₃⁻ |
| 174 | H, H | —SO₂NH—(CH₂)₃—N(C₂H₄OH)₂·HCl | H, H | —SO₂NH—(CH₂)₃—N(C₂H₄OH)₂·HCl |
| 175 | H, H | —SO₂NH—(CH₂)₃—N(C₂H₄SO₃Na)₂ | H, H | —SO₂NH—(CH₂)₃—N(C₂H₄SO₃Na)₂ |
| 176 | H, H | —SO₂NH—(CH₂)₃—N(C₂H₄SO₃Na)₂ | H, H | —SO₂NH—(CH₂)₃—N(C₂H₄SO₃Na)₂ |
| 177 | H, H | —SO₂NH—(CH₂)₄—N(C₂H₄OH)((CH₂)₃SO₃K) | H, H | —SO₂NH—(CH₂)₄—N(C₂H₄OH)((CH₂)₃SO₃K) |

-continued
| | | | | |
|---|---|---|---|---|
| 178 | H, H | H, —SO₂NH—(CH₂)₃—O—⌬—SO₃Na | H, H | H, —SO₂NH—(CH₂)₃—O—⌬—SO₃Na |
| 179 | H, H | H, —SO₂N(—(CH₂)₄SO₃K)(—(CH₂)₃N(C₂H₄OH)(C₂H₄OH)) | H, H | H, —SO₂N(—(CH₂)₄SO₃K)(—(CH₂)₃N(C₂H₄OH)(C₂H₄OH)) |
| 180 | H, H | H, —SO₂NH—(CH₂)₃—SO₃Na | H, H | H, —SO₂NH—(CH₂)₃—SO₃Na |
| 181 | H, H | H, 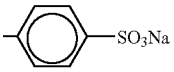 | H, H | 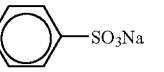 |
| 182 | H, H | CH₃, 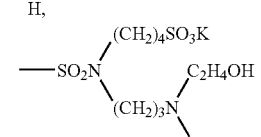 | H, H | CH₃, 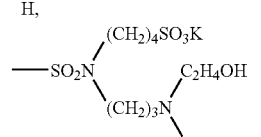 |
| 183 | H, H | H, 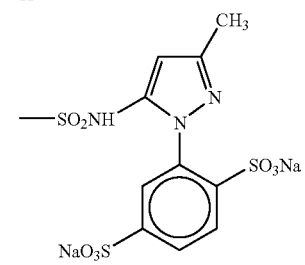 | H, H | 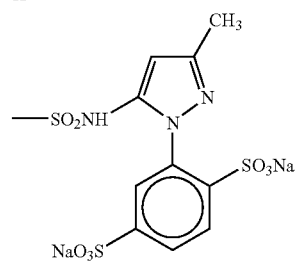 |
| 184 | H, H | H, 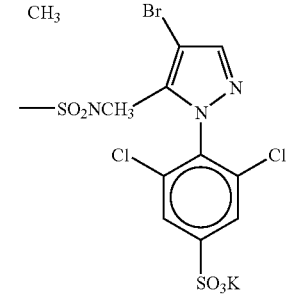 | H, H | 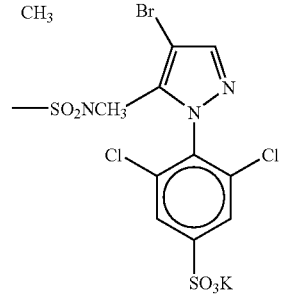 |

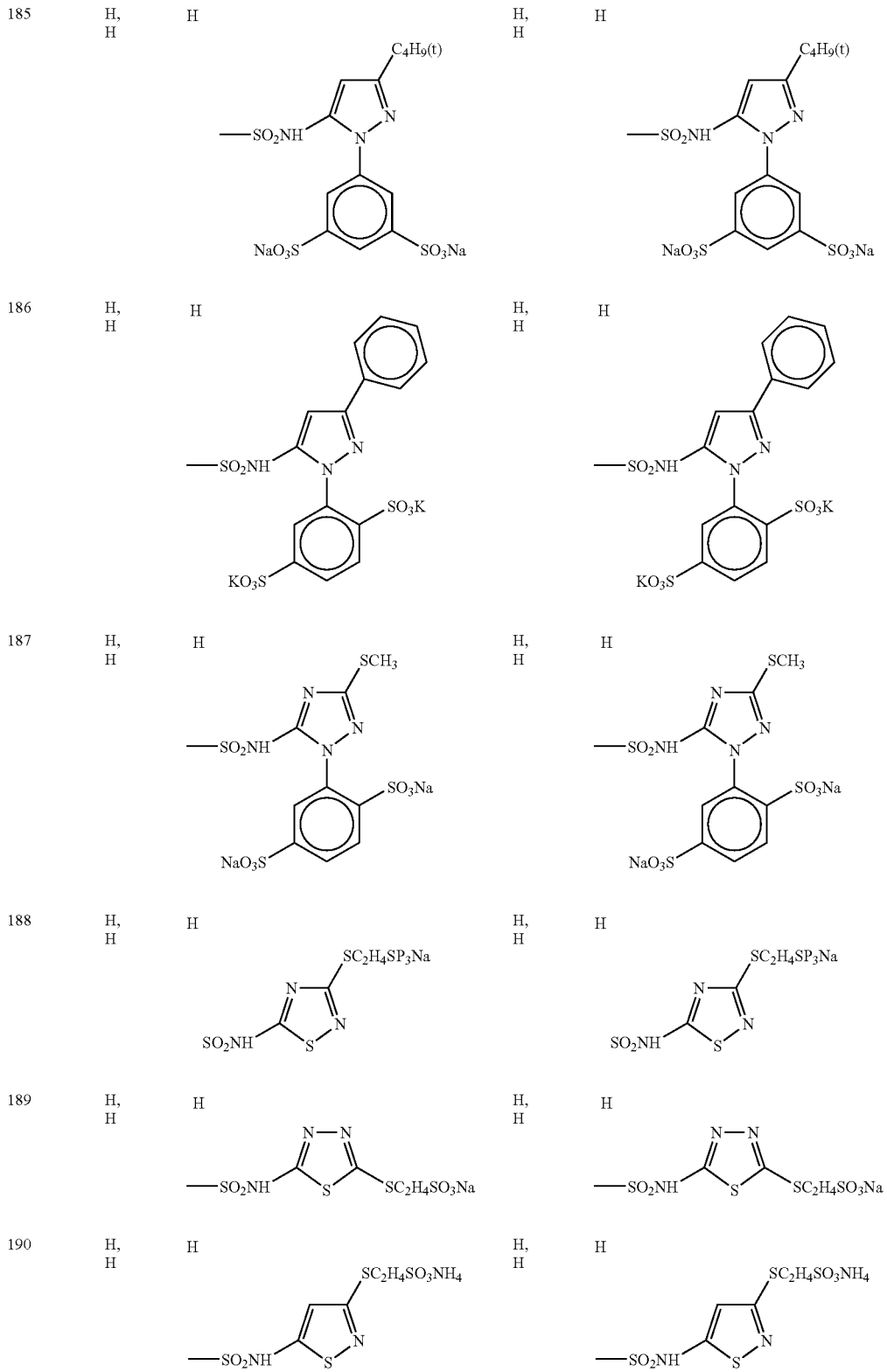

-continued
| | | | | | |
|---|---|---|---|---|---|
| 191 | H, H | H | 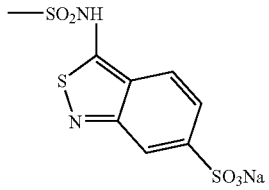 | H, H | H | 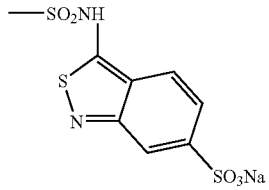 |
| 192 | H, H | H | 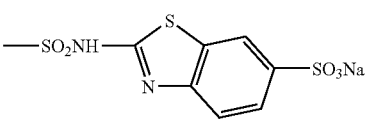 | H, H | H | 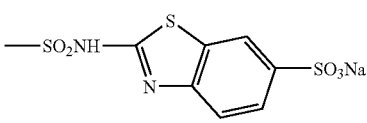 |
| 193 | H, H | H | 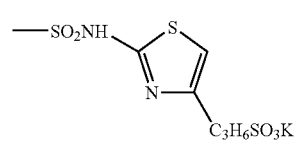 | H, H | H | 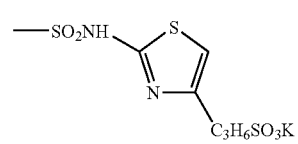 |
| 194 | H, H | H | 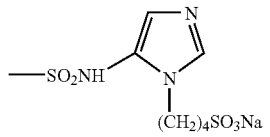 | H, H | H | 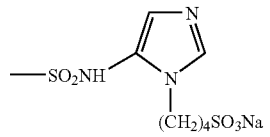 |
| 195 | H, H | H | 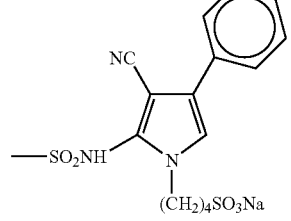 | H, H | H | 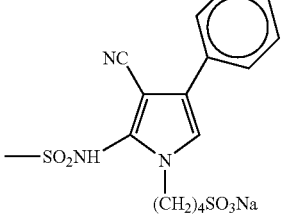 |
| 196 | H, H | H | 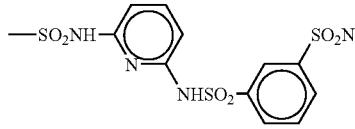 | H, H | H | 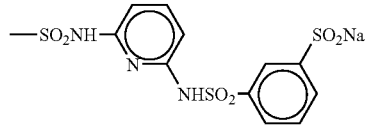 |
| 197 | H, H | H | 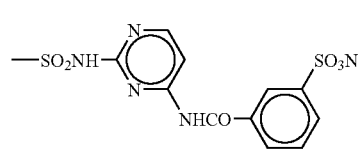 | H, H | H | 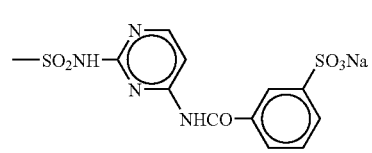 |
| 198 | H, H | H | 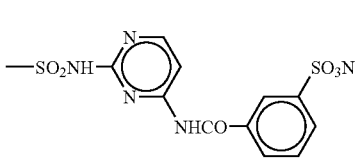 | H, H | H | 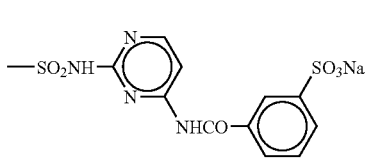 |

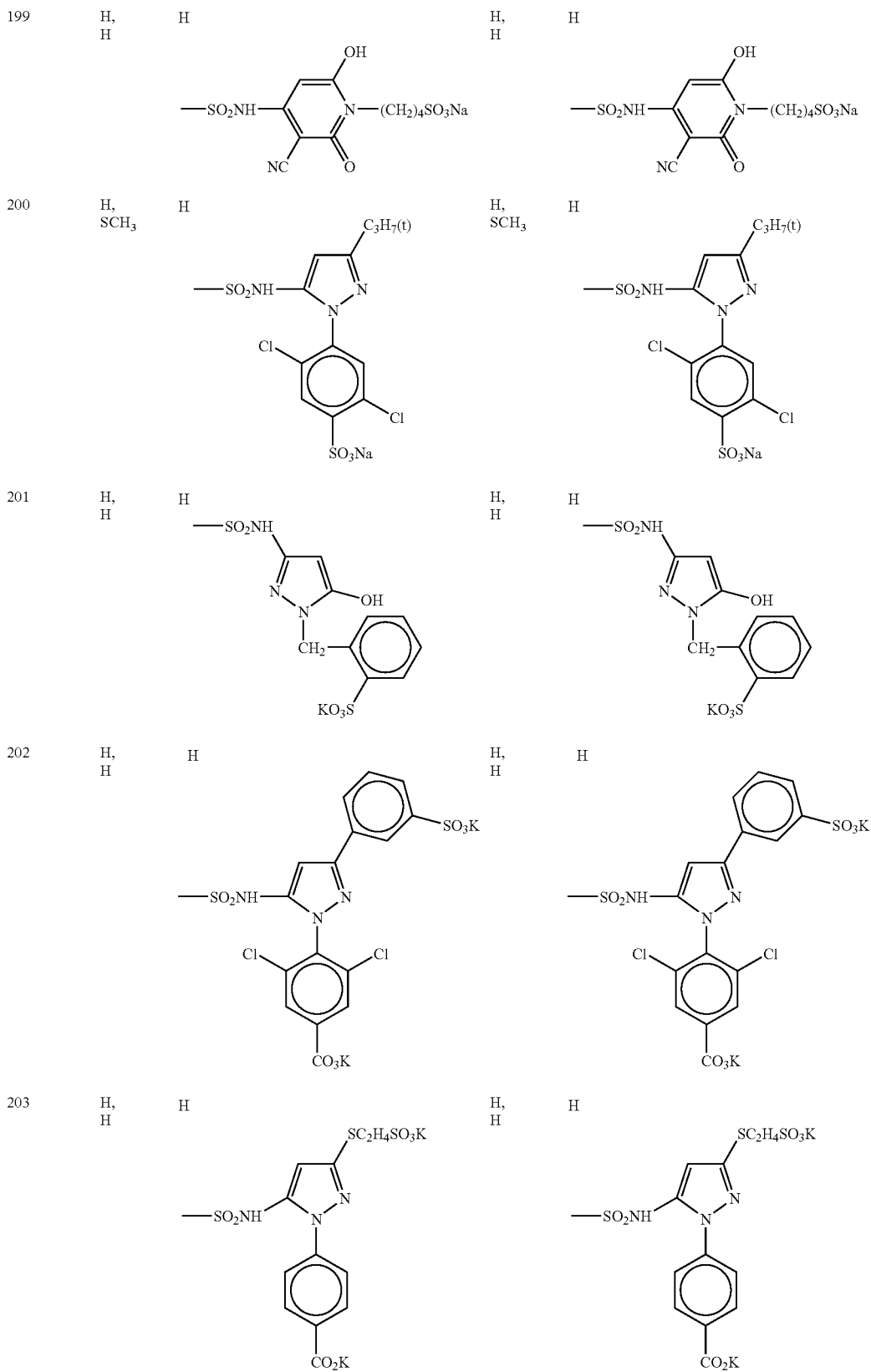

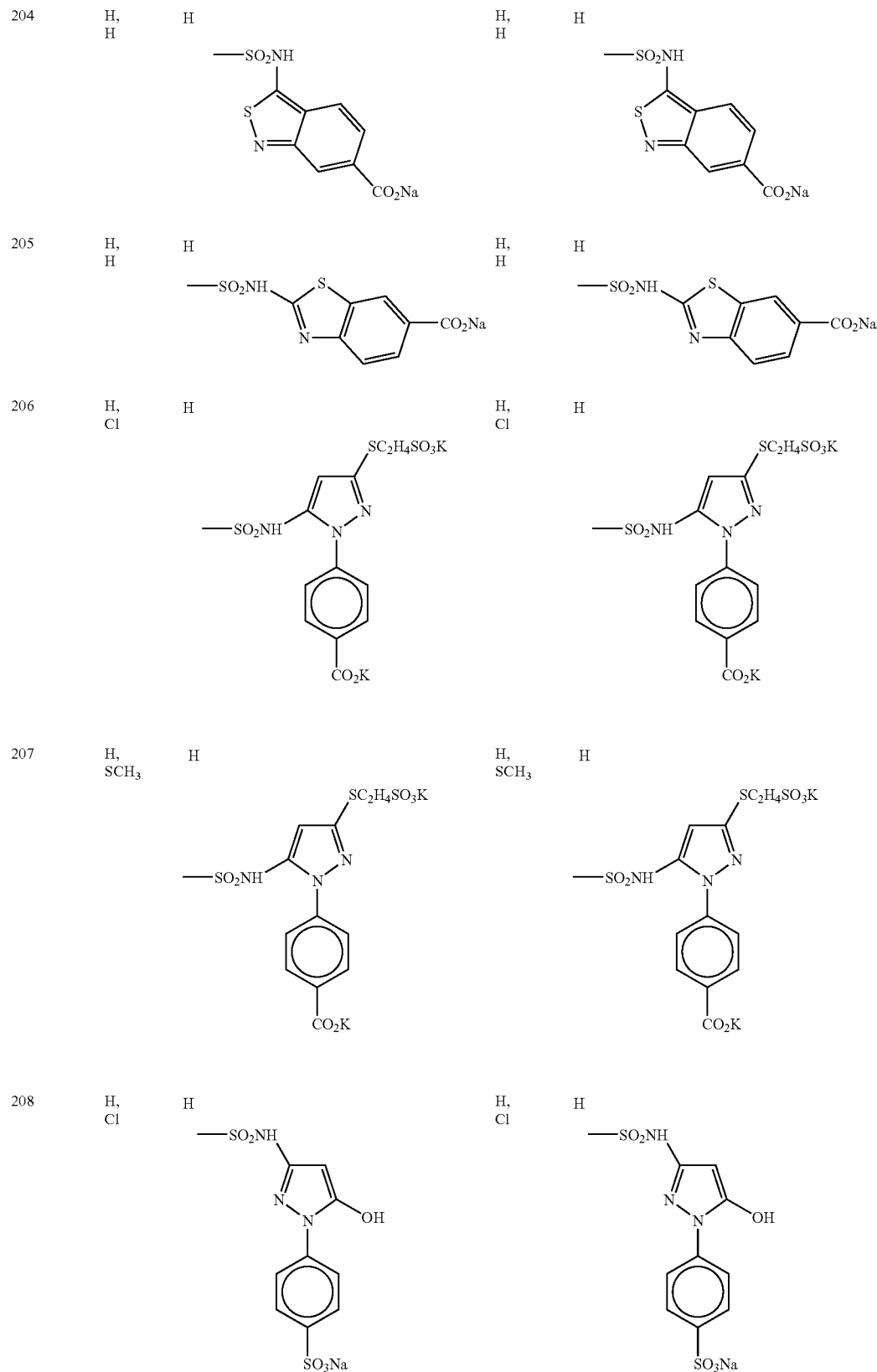

-continued

| | | | | |
|---|---|---|---|---|
| 209 | H, H | H | [pyrazole with SO2NH, OH, N-phenyl-CO2K substituents] | H, H | H | [same structure as left] |
| 210 | H, H | H | [benzisothiazole with SO2NH and CO2Na substituents] | H, H | H | [same structure as left] |
| 211 | H, H | H, | [SO2-pyrrolidine-NHSO2-phenyl-SO2K] | H, H | H, | [same structure as left] |
| 212 | H, H | H, | [SO2-pyrrolidine-O(CH2)3SO3Na] | H, H | H, | [same structure as left] |
| 213 | H, H | H, | [SO2-pyrrolidine with phenyl, CN, NHSO2-phenyl-SO3Na substituents] | H, H | H, | [same structure as left] |
| 214 | H, H | H, | [SO2-pyrrole with phenyl, CN, phenyl-NHSO2-phenyl-SO3Na substituents] | H, H | H, | [same structure as left] |

| 215 | 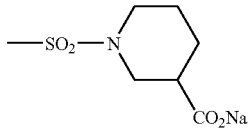 | 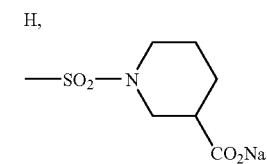 |

Compound 216:

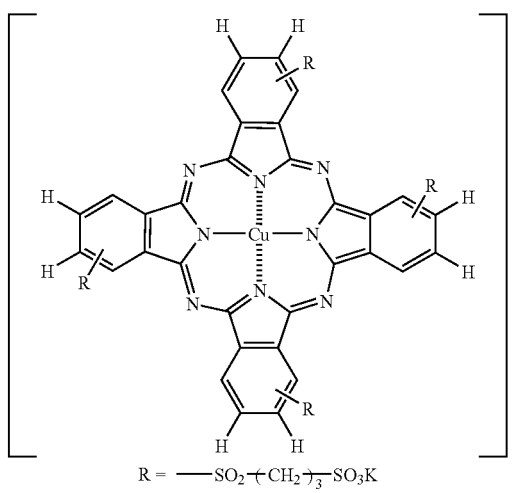

The phthalocyanine compound of the present invention can be used as an ink, preferably an ink for the formation of an image.

Examples of the use of the compound of the present invention include a material for forming an image, particularly a color image. Specific examples thereof include an inkjet recording material which is described in detail later, a heat-sensitive transfer-type image recording material, a pressure-sensitive recording material, a recording material using an electrophotographic system, a transfer-type silver halide light-sensitive material, a printing ink and a recording pen. Among these, preferred are an inkjet recording material, a heat-sensitive transfer-type image recording material and a recording material using an electrophotographic system, more preferred is an inkjet recording material. The compound of the present invention can also be applied to a color filter used in solid image pick-up devices such as LCD and CCD described in U.S. Pat. No. 4,808,501 and JP-A-6-35182 or to a dyeing solution for dyeing various fibers. The dye of the present invention is used after the physical properties such as solubility and heat transferability are adjusted to be suitable for use by the substituent. Furthermore, the compound of the present invention can be used in a uniformly dissolved state, a dispersed and dissolved state such as emulsification dispersion, or a solid dispersion state, according to the system where the compound is used.

[Inkjet Recording Ink]

The inkjet recording ink of the present invention is described below.

The inkjet recording ink can be produced by dissolving and/or dispersing the above-described phthalocyanine compound in a lipophilic or aqueous medium. An ink using an aqueous medium is preferred.

If desired, other additives are added within the range of not impairing the effect of the present invention. Examples of other additives include known additives such as drying inhibitor (wetting agent), discoloration inhibitor, emulsification stabilizer, permeation accelerator, ultraviolet absorbent, antiseptic, fungicide, pH adjusting agent, surface tension adjusting agent, defoaming agent, viscosity adjusting agent, dispersant, dispersion stabilizer, rust inhibitor and chelating agent. These various additives are directly added to the ink solution in the case of a water-soluble ink. When an oil-soluble dye is used in the form of a dispersion, the additives are generally added to the dispersion after the preparation of a dye dispersion but may be added to the oil or aqueous phase at the preparation.

The drying inhibitor is suitably used for the purpose of preventing occurrence of clogging due to drying of the inkjet ink at the ink jetting port of a nozzle used for the inkjet recording system.

The drying inhibitor is preferably a water-soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in the ink in an amount of 10 to 50 mass %.

The permeation accelerator is suitably used for the purpose of obtaining higher permeation of the inkjet ink into paper. Examples of the permeation accelerator which can be used include alcohols (e.g., ethanol, isopropanol, butanol, di(tri)ethylene glycol monobutyl ether, 1,2-hexanediol), sodium laurylsulfate, sodium oleate and nonionic surfactants. A sufficiently high effect can be obtained by adding from 5 to 30 mass % of the permeation accelerator to the ink. The permeation accelerator is preferably used in an amount within the range of causing no blurring of printed letter or no print through.

The ultraviolet absorbent is used for the purpose of improving the preservability of image. Examples of the ultraviolet absorbent which can be used include benzotriazole-base compounds described, for example, in JP-A-58-

185677, JP-A-61-190537, JP-A-2-782, JP-A-5-197075 and JP-A-9-34057, benzophenone-base compounds described, for example, in JP-A-46-2784, JP-A-5-194483 and U.S. Pat. No. 3,214,463, cinnamic acid-base compounds described, for example, in JP-B-48-30492 (the term "JP-B" as used herein means an "examined Japanese patent publication"), JP-B-56-21141 and JP-A-10-88106, triazine-base compounds described, for example, in JP-A-4-298503, JP-A-8-53427, JP-A-8-239368, JP-A-10-182621 and JP-T-8-501291, compounds described in *Research Disclosure* No. 24239, and compounds of absorbing ultraviolet light and emitting fluorescent light, so-called fluorescent brightening agents, represented by stilbene-base compound and benzoxazole-base compound.

The discoloration inhibitor is used for the purpose of improving the preservability of image. Examples of the discoloration inhibitor which can be used include various organic discoloration inhibitors and metal complex-base discoloration inhibitors. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide include sodium dehydroacetate, sodium benzoate, sodium pyridinethione-1-oxide, ethyl p-hydroxybenzoate, 1,2-benzisothiazolin-3-one and salts thereof. The fungicide is preferably used in the ink in an amount of 0.02 to 1.00 mass %.

As the pH adjusting agent, the above-described neutralizer (e.g., organic base, inorganic alkali) can be used. The pH adjusting agent is used for the purpose of improving the storage stability of the inkjet recording ink and is preferably added to adjust the inkjet recording ink to a pH of 6 to 10, more preferably to a pH of 7 to 10.

The surface tension adjusting agent includes nonionic, cationic and anionic surfactants. Here, the surface tension of the inkjet ink of the present invention is preferably from 25 to 70 mN/m, more preferably from 25 to 60 mN/m. Also, the viscosity of the inkjet recording ink of the present invention is preferably 30 mPa·s or less, more preferably 20 mPa·s or less. Preferred examples of the surfactant include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene-alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants such as N,N-dimethyl-N-alkylamine oxide are preferred. Furthermore, surfactants described in JP-A-59-157636 (pages (37) to (38)) and *Research Disclosure*, No. 308119 (1989) can be used.

A defoaming agent such as chelating agent represented by fluorine- or silicon-containing compounds and EDTA can also be used, if desired.

In the case of dispersing the phthalocyanine compound of the present invention in an aqueous medium, a colored fine particle containing the dye and an oil-soluble polymer is preferably dispersed in an aqueous medium as described in JP-A-11-286637 and Japanese Patent Application Nos. 2000-78491, 2000-80259 and 2000-62370, or the phthalocyanine compound of the present invention dissolved in a high boiling point organic solvent is preferably dispersed in an aqueous medium as described in Japanese Patent Application Nos. 2000-78454, 2000-78491, 2000-203856 and 2000-203857. With respect to the specific method for dispersing the compound of the present invention in an aqueous medium, the oil-soluble polymer, high boiling point organic solvent and additives used, and the amounts thereof, those described in these patent publications can be preferably used. Also, the phthalocyanine compound, which is solid, can be dispersed as it is in a fine particle state. At the dispersion, a dispersant or a surfactant can be used. As for the dispersing device, a simple stirrer, an impeller stirring system, an in-line stirring system, a mill system (e.g., colloid mill, ball mill, sand mill, attritor, roll mill, agitator mill), an ultrasonic wave system and a high-pressure emulsification dispersion system (high-pressure homogenizer; specific examples of the commercially available device include Gaulin Homogenizer, Microfluidizer and DeBEE 2000) can be used. The preparation method of the inkjet recording ink is described in detail, in addition to the above-described patent publications, in JP-A-5-148436, JP-A-5-295312, JP-A-7-97541, JP-A-7-82515, JP-A-7-118584, JP-A-11-286637 and Japanese Patent Application No. 2000-87539 and the contents described in these patent publications can be used also for the preparation of the inkjet recording ink of the present invention.

As the aqueous medium, a mixture comprising water as the main component and a water-miscible organic solvent added, if desired, can be used. Examples of the water-miscible organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol, monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethyl-propylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In 100 parts by mass of the inkjet recording ink of the present invention, from 0.2 to 10 parts by mass of the phthalocyanine compound is preferably contained. Furthermore, in the inkjet ink of the present invention, other dye may be used in addition to the phthalocyanine compound. In the case of using two or more dyes in combination, the total content of the dyes is preferably in the above-described range.

The viscosity of the inkjet recording ink of the present invention is preferably 40 cp or less. The surface tension thereof is preferably from 20 to 70 mN/m. The viscosity and the surface tension can be adjusted by the addition of various additives, for example, a viscosity adjusting agent, a surface tension adjusting agent, a resistivity adjusting agent, a film adjusting agent, an ultraviolet absorbent, an antioxidant, a discoloration inhibitor, a fungicide, a rust preventive, a dispersant and a surfactant.

The inkjet recording ink of the present invention can be used not only for the formation of a monochromatic image but also for the formation of a full color image. For forming a full color image, a magenta color tone ink, a cyan color tone ink and a yellow color tone ink can be used. Also, for adjusting the color tone, a black color tone ink may be further used.

The yellow dye which can be used may be any yellow dye. Examples thereof include aryl- or heteryl-azo dyes having a phenol, a naphthol, an aniline, a heterocyclic ring (e.g., pyrazolone, pyridone), an open chain-type active methylene compound or the like as the coupling component (hereinafter referred to as a "coupler component"); azomethine dyes having an open chain-type active methylene compound or the like as the coupler component; methine dyes such as benzylidene dye and monomethine oxonol dye; and quinone-base dyes such as naphthoquinone dye and anthraquinone dye. Other examples of the dye species include quinophthalone dye, nitro-nitroso dye, acridine dye and acridinone dye.

The magenta dye which can be used may be any magenta dye. Examples thereof include aryl- or heteryl-azo dyes having a phenol, a naphthol or an aniline as the coupler component; azomethine dyes having a pyrazolone or a pyrazolotriazole as the coupler component; methine dyes such as arylidene dye, styryl dye, merocyanine dye, cyanine dye and oxonol dye; carbonium dyes such as diphenylmethane dye, triphenylmethane dye and xanthene dye; quinone dyes such as naphthoquinone, anthraquinone and anthrapyridone; and condensed polycyclic dyes such as dioxazine dye.

The cyan dye which can be used may be any cyan dye. Examples thereof include aryl- or heteryl-azo dyes having a phenol, a naphthol or an aniline as the coupler component; azomethine dyes having a phenol, a naphthol or a heterocyclic ring (e.g., pyrrolotriazole) as the coupler component; polymethine dyes such as cyanine dye, oxonol dye and merocyanine dye; carbonium dyes such as diphenylmethane dye, triphenylmethane dye and xanthene dye; phthalocyanine dyes; anthraquinone dyes; and indigo-thioindigo dyes.

These dyes may be a dye which provides a yellow, magenta or cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

Examples of the black coloring material which can be used include dis-azo, tris-azo and tetra-azo dyes and a dispersion of carbon black.

[Inkjet Recording Method]

According to the inkjet recording method of the present invention, an energy is provided to the inkjet recording ink and thereby an image is formed on a known image-receiving material, namely, plain paper, resin coated paper, inkjet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal, ceramic or the like.

In forming an image, a polymer fine particle dispersion (also called polymer latex) may be used in combination for the purpose of giving glossiness or water resistance or improving the weather resistance. The timing of imparting the polymer latex compound to the image-receiving material may be before, after or simultaneous with the addition of the coloring agent. Accordingly, the site to which the polymer latex is added may be in the image-receiving paper or ink or a liquid material composed of the polymer latex alone may be prepared and used. More specifically, the methods described in Japanese Patent Application Nos. 2000-363090, 2000-315231, 2000-354380, 2000-343944, 2000-268952, 2000-299465 and 2000-297365 can be preferably used.

The recording paper and recording film used in the inkjet printing using the ink of the present invention are described below.

The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP by mixing, if desired, additives such as conventionally known pigment, binder, sizing agent, fixing agent, cation agent and paper strength increasing agent and then sheeting the mixture using various devices such as Fourdrinier paper machine and cylinder paper machine. Other than this support, synthetic paper or plastic film sheet may be used. Th thickness of the support is preferably from 10 to 250 μm and the basis weight is preferably from 10 to 250 g/m$^2$.

An ink-accepting layer and a backcoat layer may be provided on the support as it is or may be provided after providing a size press or an anchor coat layer using starch, polyvinyl alcohol or the like. The support may also be subjected to a flattening treatment by a calendering device such as machine calender, TG calender and soft calender. In the present invention, the support is preferably paper or plastic film of which both surfaces are laminated with polyolefin (for example, polyethylene, polystyrene, polyethylene terephthalate, polybutene or a copolymer thereof).

In the polyolefin, a white pigment (for example, titanium oxide or zinc oxide) or a tinting dye (for example, cobalt blue, ultramarine or neodymium oxide) is preferably added.

The ink-accepting layer provided on the support contains a pigment and an aqueous binder. The pigment is preferably a white pigment. Examples of the white pigment include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. The white pigment contained in the ink-accepting layer is preferably a porous inorganic pigment, more preferably a synthetic amorphous silica having a large pore area. The synthetic amorphous silica may be either a silicic acid anhydride obtained by a dry production method or a silicic acid hydrate obtained by a wet production method but is preferably a silicic acid hydrate.

Examples of the aqueous binder contained in the ink-accepting layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of attaching property to the pigment and peeling resistance of the ink-accepting layer.

The ink-accepting layer may contain a mordant, a waterproofing agent, a light fastness enhancer, a surfactant and other additives in addition to the pigment and the aqueous binder.

The mordant added to the ink-accepting layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JPA-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for water-proofing the image. The water-proofing agent is preferably a cationic resin. Examples of the cationic resin include polyamidopolyamine epichlorohydrin, polyethyleneimine, polyaminesulfone, poly-dimethyldiallylammonium chloride, cation polyacrylamide and colloidal silica. Among these cationic resins, polyamidopolyamine epichlorohydrin is preferred. The content of the cationic resin is preferably from 1 to 15 mass %, more preferably from 3 to 10 mass %, based on the entire solid content of the ink-accepting layer.

Examples of the light fastness enhancer include zinc sulfate, zinc oxide, hindered amine-base antioxidants and benzophenone-base or benzotriazole-base ultraviolet absorbents. Among these, zinc sulfate is preferred.

The surfactant functions as a coating aid, a releasability improver, a slipperiness improver or an antistatic agent. The surfactant is described in JP-A-62-173463 and JP-A-62-183457. In place of the surfactant, an organic fluoro compound may be used. The organic fluoro compound is preferably hydrophobic. Examples of the organic fluoro compound include a fluorine-containing surfactant, an oily fluorine-base compound (for example, fluorine oil) and a solid fluorine compound resin (for example, ethylene tetrafluoride resin). The organic fluoro compound is described in JP-B-57-9053 (columns 8 to 17), JP-A-61-20994 and JP-A-62-135826. Other examples of the additive added to the ink-accepting layer include a pigment dispersant, a thickener, a defoaming agent, a dye, a fluorescent brightening agent, an antiseptic, a pH adjusting agent, a matting agent and a hardening agent. The ink-accepting layer may be composed of either one layer or two layers.

In the recording paper or film, a backcoat layer may also be provided. Examples of the component which can be added to this layer include a white pigment, an aqueous binder and other components. Examples of the white pigment contained in the backcoat layer include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

A polymer latex may be added to a constituent layer (including the backcoat layer) of the inkjet recording paper or film. The polymer latex is used for the purpose of improving film properties, for example, stabilizing the dimension and preventing the curling, adhesion or film cracking. The polymer latex is described in JP-A-62-245258, JP-A-62-1316648 and JP-A-62-110066. When a polymer latex having a low glass transition temperature (40° C. or less) is added to a layer containing a mordant, the layer can be prevented from cracking or curling. The curling can also be prevented by adding a polymer latex having a high glass transition temperature to the backcoat layer.

The ink of the present invention is not limited in the inkjet recording system and is used in a known system, for example, an electric charge controlling system of jetting out the ink by using the electrostatic induction force, a drop-on-demand system (pressure pulse system) of using a vibration pressure of a piezoelectric element, an acoustic inkjet system of converting electric signals into acoustic beams, irradiating the beams on the ink and jetting out the ink by using the radiation pressure, and a thermal inkjet system of heating the ink to form a bubble and utilizing the generated pressure. The inkjet recording system includes a system of ejecting a large number of small volumes of so-called photo-ink having a low concentration, a system designed to improve the image quality by using a plurality of inks having substantially the same color hue but differing in the concentration, and a system of using a colorless transparent ink.

EXAMPLES

The present invention is described in greater detail below by referring to Examples, however, the present invention is not limited to these Examples.

Synthesis Example

The synthesis method of the phthalocyanine compound of the present invention is described in detail below, however, the starting material, dye intermediate and synthesis route are not limited thereto.

A representative phthalocyanine compound of the present invention can be derived, for example, through the following synthesis route. In the following Examples, λmax means an absorption maximum wavelength and εmax means a molar absorption coefficient at the absorption maximum wavelength.

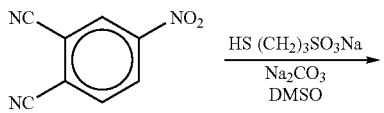

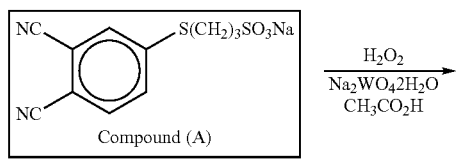

Compound (A)

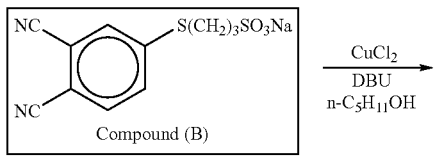

Compound (B)

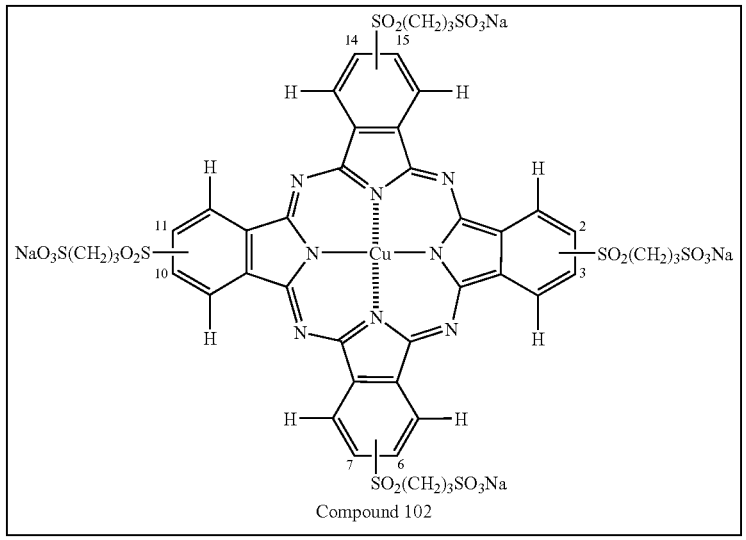

Compound 102

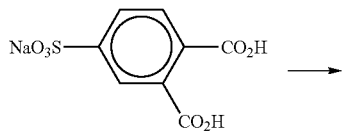

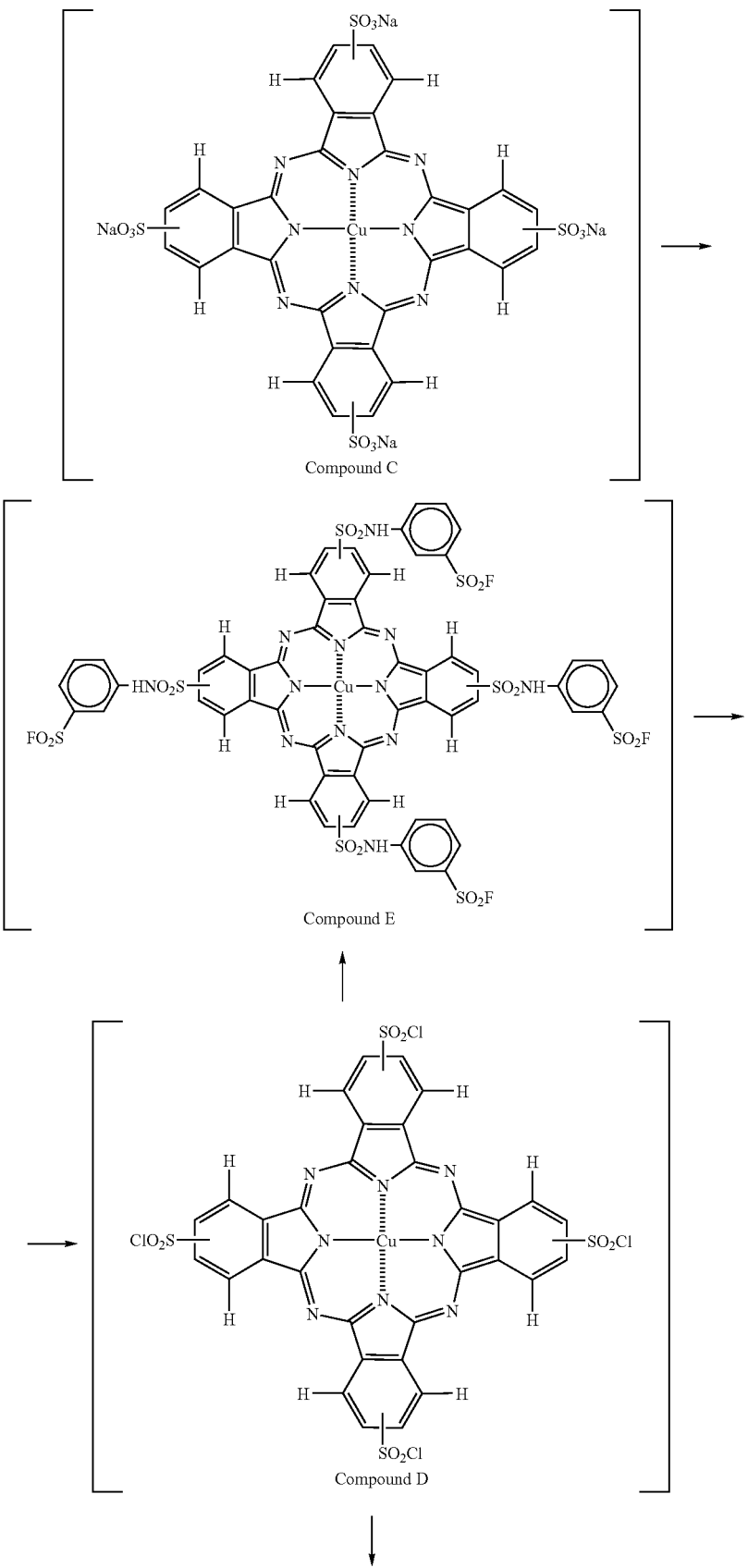

-continued
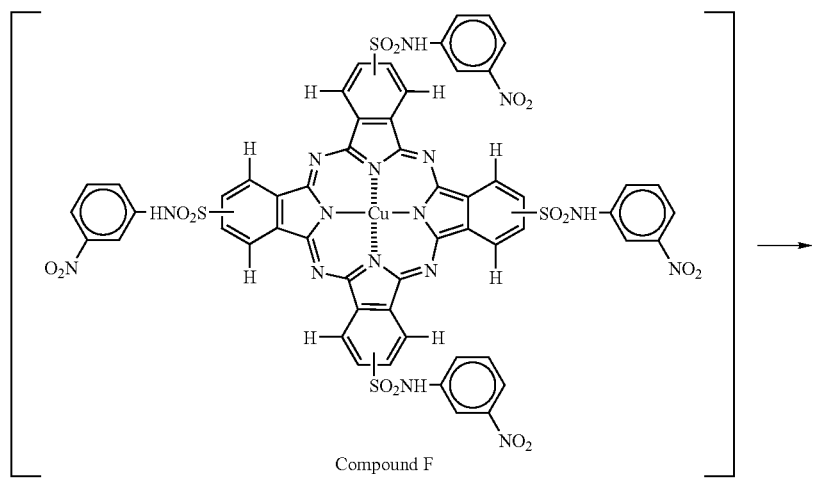
Compound F
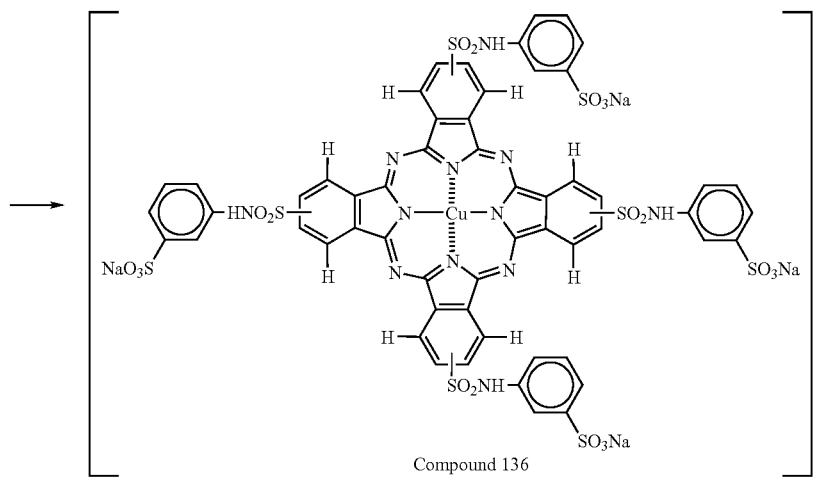
Compound 136
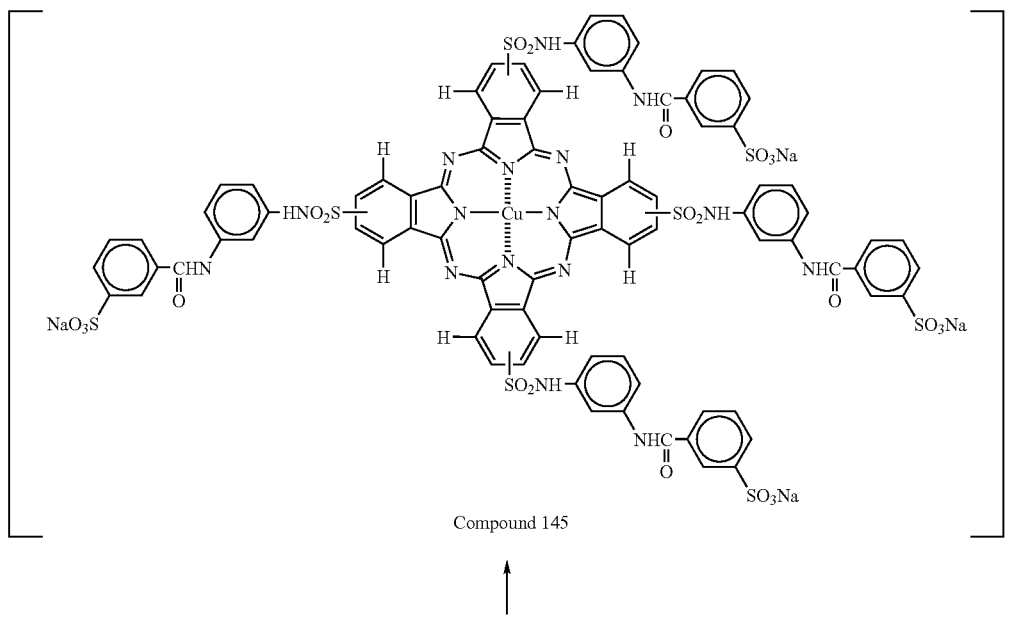
Compound 145

-continued
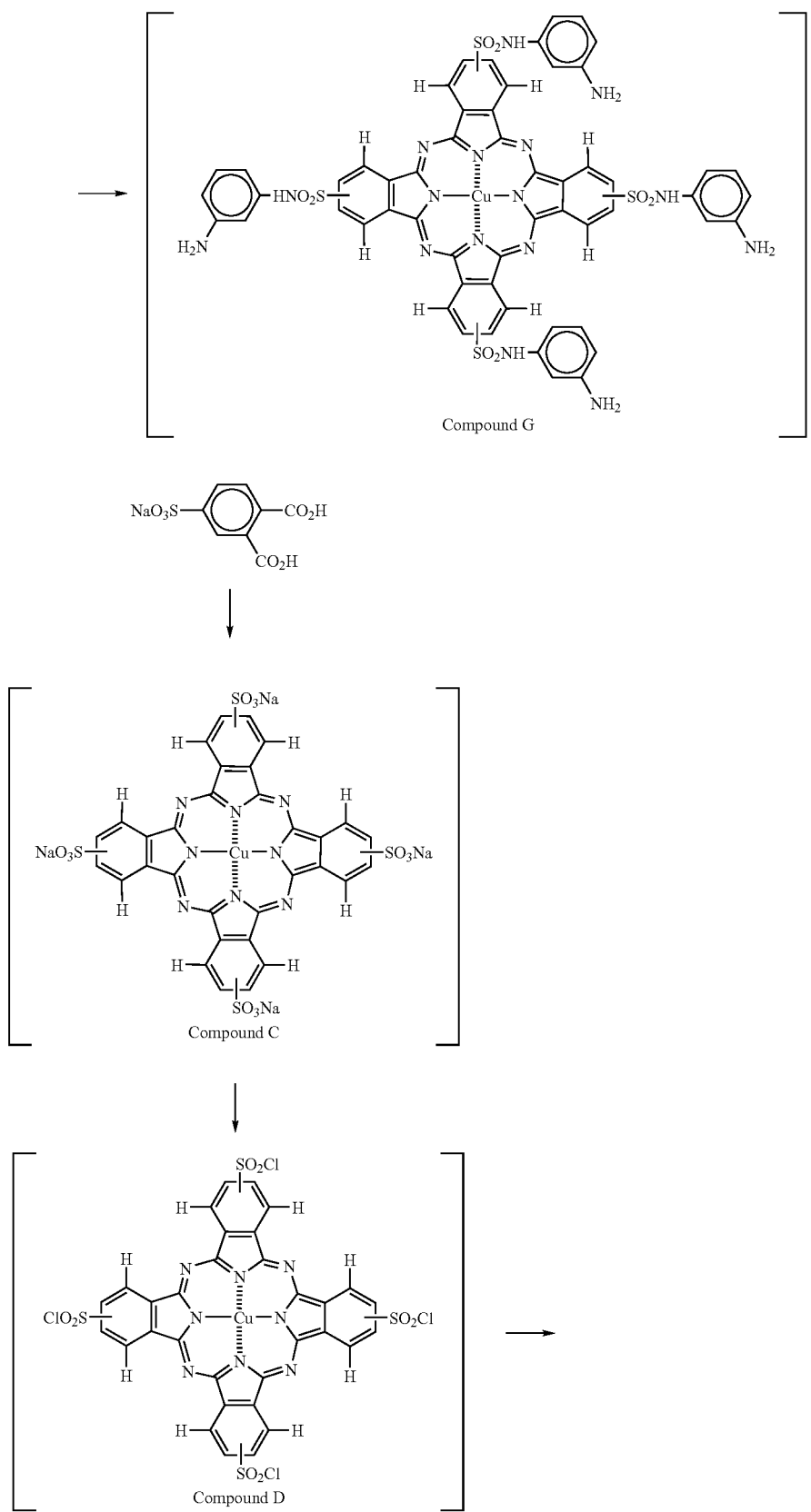

-continued
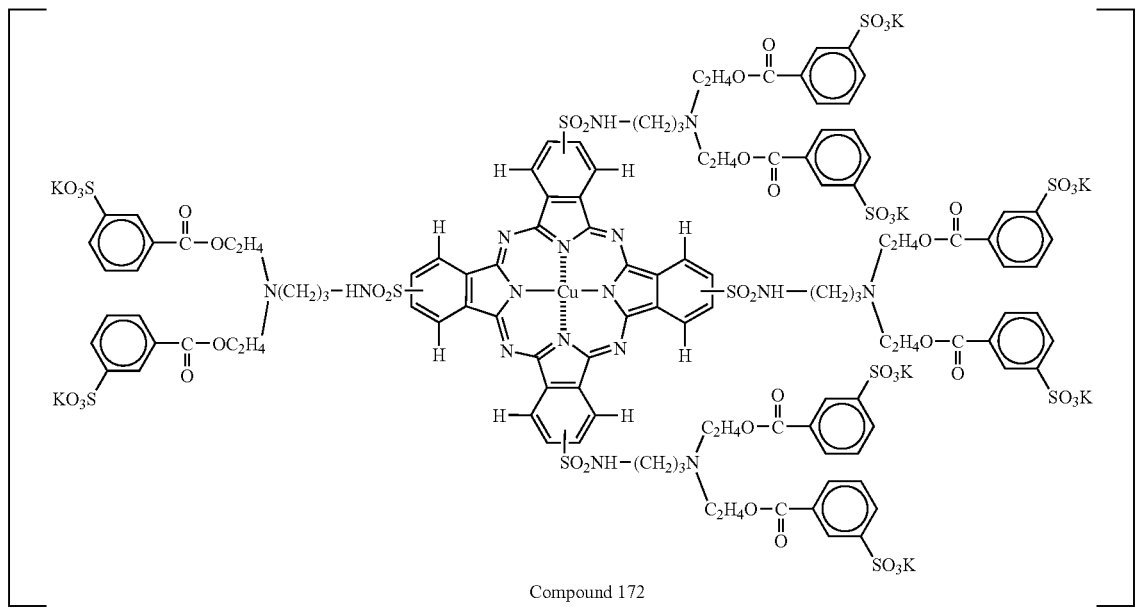
Compound 172
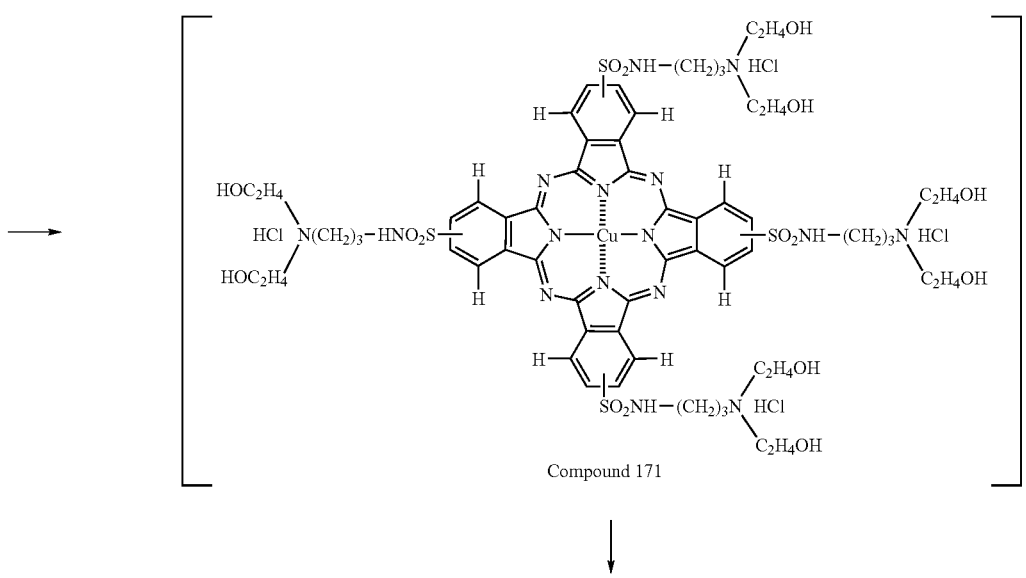
Compound 171

-continued
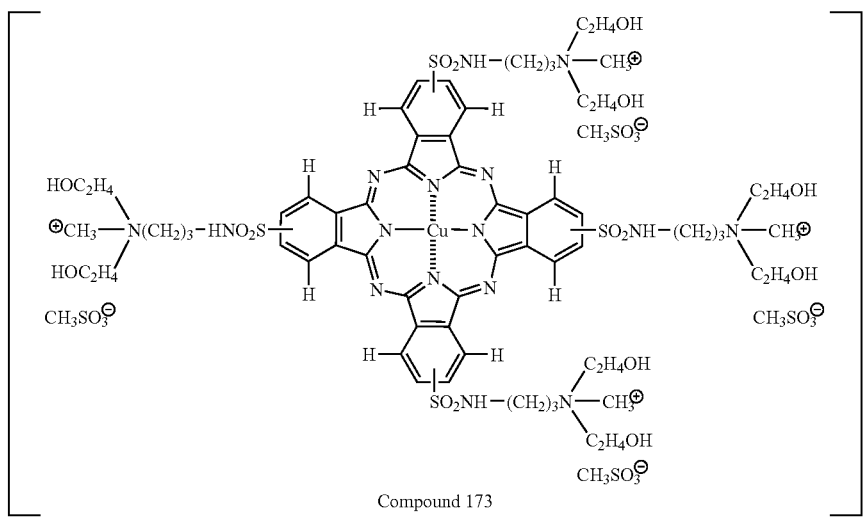
Compound 173
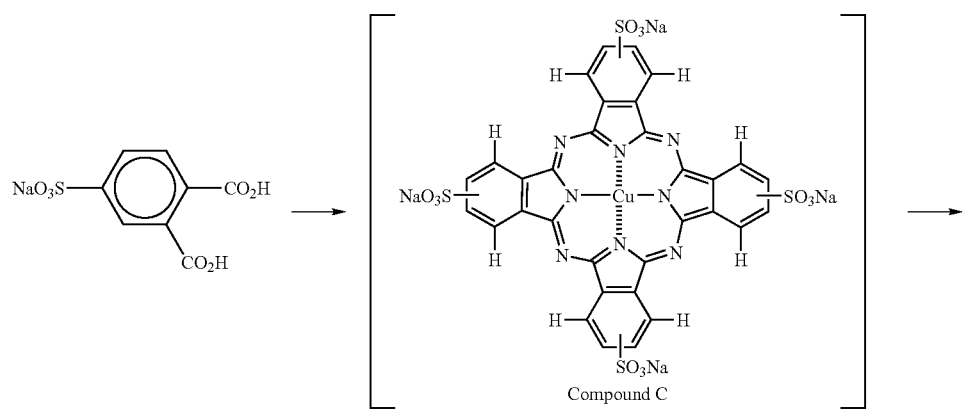
Compound C
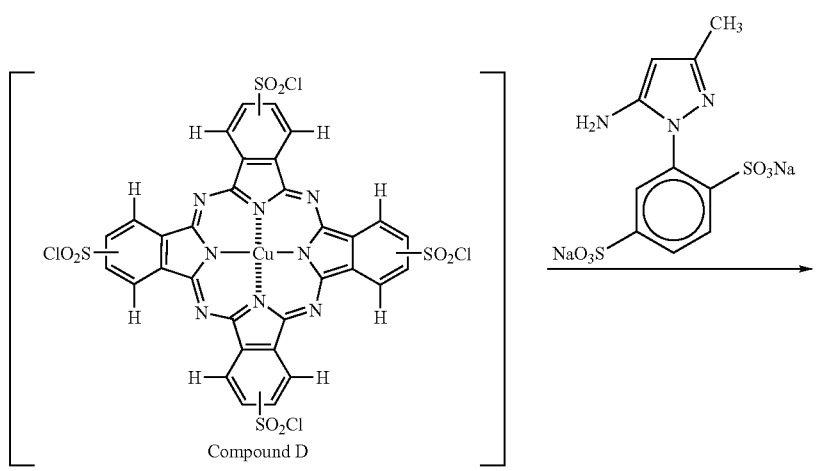
Compound D -continued

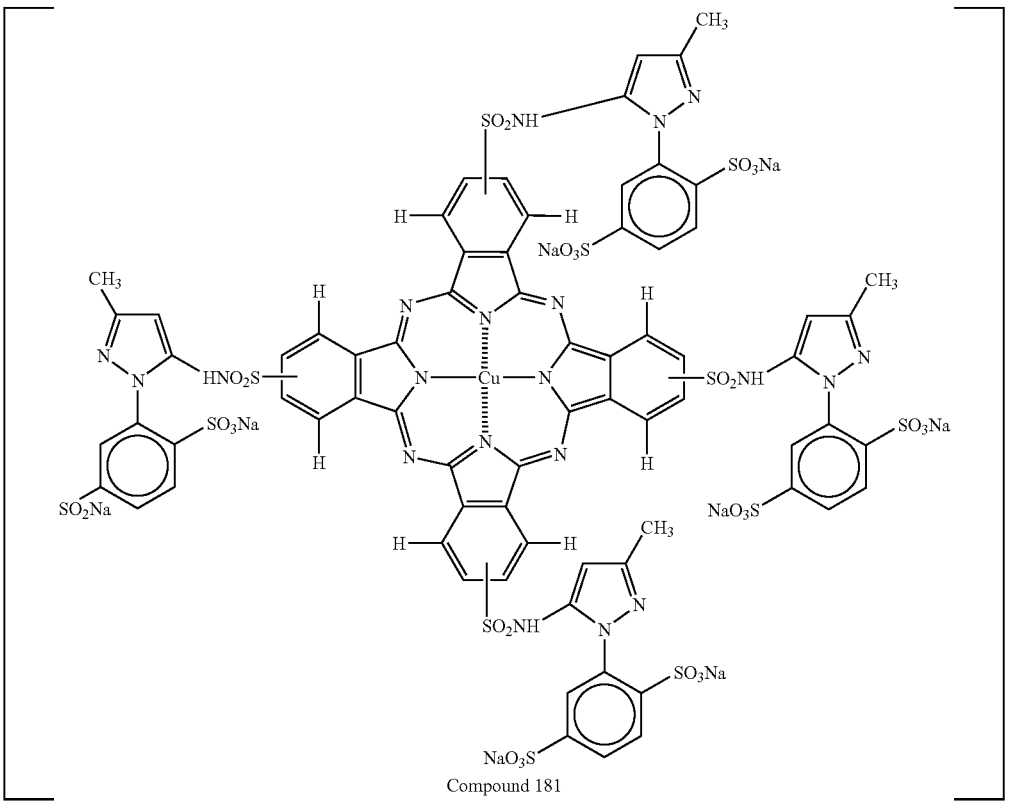

Compound 181

Synthesis Example 1

Synthesis of Compound A

4-Nitrophthalonitrile (produced by Tokyo Kasei) (26.0 g) was dissolved in 200 mL of DMSO (dimethylsulfoxide) in a nitrogen stream and to the obtained solution under stirring at an inner temperature of 20° C., 30.3 g of sodium 3-mercapto-propane-sulfonate (produced by Aldrich) was added. To the resulting solution under stirring at an inner temperature of 20° C., 24.4 g of anhydrous sodium carbonate was gradually added. Subsequently, the reaction solution was heated to 30° C. while stirring and then stirred at the same temperature for 1 hour. After cooling to 20° C., the reaction solution was filtered by Nutsche, the filtrate was poured in 15,000 mL of ethyl acetate, thereby crystallizing, and then stirred at room temperature for 30 minutes, and the precipitated crude crystal was filtered by Nutsche, washed with ethyl acetate and dried. The obtained crude crystal was recrystallized from methanol/ethyl acetate to obtain 42.5 g of Compound A. $^1$H-NMR (DMSO-d6), δ value on TMS basis: 1.9–2.0 (2H, t); 2.5–2.6 (2H, m); 3.2–3.3 (2H, t); 7.75–7.85 (1H, d); 7.93–8.03 (1H, d); 8.05–8.13 (1H, s).

Synthesis Example 2

Synthesis of Compound B

Compound A (42.4 g) was dissolved in 300 mL of acetic acid and to the obtained solution under stirring at an inner temperature of 20° C., 2.5 g of $Na_2WO_4 \cdot 2H_2O$ was added. Thereafter, the solution was cooled to an inner temperature of 10° C. in an ice bath. Thereto, 35 mL of aqueous hydrogen peroxide (30%) was gradually added dropwise while caring about heat generation. After stirring at an inner temperature of 15 to 20° C. for 30 minutes, the reaction solution was heated to an inner temperature of 60° C. and then stirred at the same temperature for 1 hour. After cooling to 20° C., 1,500 mL of ethyl acetate was poured in the reaction solution and then the reaction solution stirred at the same temperature for 30 minutes. The precipitated crude crystal was filtered by Nutsche, washed with 200 mL of ethyl acetate and dried. The obtained crude crystal was washed under heat using methanol/ethyl acetate and thereby purified to obtain 41.0 g of Compound B. $^1$H-NMR (DMSO-d6), δ value on TMS basis: 1.8–1.9 (2H, t); 2.4–2.5 (2H, m); 3.6–3.7 (2H, t); 8.3–8.4 (1H, d); 8.4–8.5 (1H, d); 8.6–8.7 (1H, s).

Synthesis Example 3

Synthesis of Compound 102

In a three-neck flask with a condenser tube, 70 mL of n-amyl alcohol was added and thereto 40.2 g of Compound B and 6.0 g of cupric chloride were added. Furthermore, 40.0 mL of 1,8-diazabicyclo[5.4.0]-7-undecene (DBU) was added dropwise at room temperature while stirring. Subsequently, the reaction solution was heated to an inner temperature of 100° C. and then stirred at the same temperature for 8 hours. After cooling to 40° C., 150 mL of methanol heated at 50° C. was poured in the reaction solution and the resulting solution was stirred under reflux for 1 hour. Then, the reaction solution was cooled to room temperature and the obtained solid was filtered by Nutsche and washed with 1,200 mL of methanol. The obtained solid was added to 600 mL of an aqueous 1M hydrochloric acid solution saturated with sodium chloride and thereby unreacted copper salt was dissolved out. The insoluble matter was filtered, 1,800 mL of methanol was added dropwise to the filtrate, thereby crystallizing, and the obtained crude crystal was filtered by Nutsche and washed with 1,200 mL of methanol. The crude crystal was dissolved in 300 mL of water and while stirring the aqueous solution, 600 mL of a saturated methanol solution of sodium acetate was gradually added to form a salt. While stirring, the temperature was elevated to a reflux temperature and the solution was stirred at the same temperature for 1 hour. After cooling to room temperature, the precipitated crystal was filtered and washed with methanol. The obtained crystal was added to 600 mL of 80% methanol, stirred under reflux for 1 hour and cooled to room temperature. The precipitated crystal was filtered and the obtained crystal was added to 600 mL of a 70% methanol solution, stirred under reflux for 1 hour and cooled to room temperature. The precipitated crystal was filtered, washed with 100 mL of methanol and then dried to obtain 30.1 g of Compound 102 as a blue crystal. $\lambda$max (absorption maximum wavelength): 628.9 nm, $\epsilon$max (molar absorption coefficient at the absorption maximum wavelength)=6.53×10$^4$ (in an aqueous solution). The obtained compound was analyzed (mass spectrometry; measured by various devices and analysis methods such as ESI-MS, elemental analysis and neutralization titration), as a result, it was confirmed that the substitution site of copper(II) phthalocyanine defined in the specification was the $\beta$-position substitution type (each benzene nucleus has one —{SO$_2$—(CH$_2$)$_3$—SO$_3$Na} group at the (2- or 3-position), (6- or 7-position), (10- or 11-position) and (14- or 15-position) and four —{SO$_2$—(CH$_2$)$_3$—SO$_3$Na} groups in total are present in one molecule of the copper phthalocyanine}.

Synthesis Example 4

Synthesis of Compound C

In a three-neck flask with a condenser tube, 100 mL of nitrobenzene was added. After elevating the temperature to 180° C. over 1 hour, 43.2 g of monosodium 4-sulfophthalate, 4.7 g of ammonium chloride, 58 g of urea, 0.68 g of ammonium molybdate and 6.93 g of cupric chloride were added thereto and the resulting solution was stirred at the same temperature for 6 hours. Subsequently, the reaction solution was cooled to 40° C., 200 mL of methanol heated at 50° C. was poured in the reaction solution and the resulting solution was stirred at room temperature for 1 hour while cracking the produced solid matter. The obtained dispersion was filtered by Nutsche and washed with 400 mL of methanol. The obtained solid was added to 1,000 mL of an aqueous 1M hydrochloric acid solution saturated with sodium chloride and boiled to dissolve out unreacted copper salt. After cooling, the precipitated solid was filtered by Nutsche and washed with 100 mL of a 1M hydrochloric acid saturated brine solution. The obtained solid was dissolved in 700 mL of an aqueous 0.1M sodium hydroxide solution and the resulting solution was heated to 80° C. while stirring and then stirred at the same temperature for 1 hour. The aqueous solution was hot filtered to remove dusts and while stirring the filtrate, 270 mL of sodium chloride was gradually added, thereby salting out the solution. This salted-out solution was heated to 80° C. while stirring and then stirred at the same temperature for 1 hour. After cooling to room temperature, the precipitated crystal was filtered and washed with 150 mL of 20% brine. Subsequently, the obtained crystal was added to 200 mL of 80% ethanol, stirred under reflux for 1 hour and then cooled to room temperature. The precipitated crystal was filtered and the obtained crystal was added to 200 mL of an aqueous 60% ethanol solution, stirred under reflux for 1 hour and then cooled to room temperature. The precipitated crystal was filtered, washed with 300 mL of ethanol and then dried to obtain 29.25 g of Compound A as a blue crystal. $\lambda$max: 629.9 nm, $\epsilon$max=6.11×10$^4$ (in an aqueous solution).

The obtained Compound C was analyzed (mass spectrometry; measured by various devices and analysis methods such as ESI-MS, elemental analysis and neutralization titration), as a result, it was confirmed that the copper(II) phthalocyanine defined in the specification, that is, the substitution site was the $\beta$-position substitution type {each benzene nucleus has one sulfo group at the (2- or 3-position), (6- or 7-position), (10- or 11-position) and (14- or 15-position) and four sulfo groups in total are present in one molecule of the copper phthalocyanine}.

Synthesis Example 5

Synthesis of Compound D

In a three-neck flask with a condenser tube, –100 mL of chlorosulfonic acid was added and while stirring at 30° C. or less, 19.0 g of Compound C synthesized above was gradually added thereto in parts. The resulting solution was stirred at 20° C. for 30 minutes and thereto 60 g of phosphorus pentachloride was gradually added in parts at 25° C. or less. The reaction solution was heated to 140° C. and stirred at the same temperature for 3 hours. After cooling to 80° C., 30 mL of thionyl chloride was added dropwise over 15 minutes. Subsequently, the reaction solution was heated to 80° C. and stirred at the same temperature for 2 hours. After cooling to 10° C., the reaction solution was gradually added to a mixture of 1,000 mL of water and 500 g of ice to precipitate the objective compound as a blue crystal. The temperature of the suspension was kept at 0 to 5° C. by supplementarily adding ice. The solution was further stirred at room temperature for 1 hour, then filtered by Nutsche and washed with 1,500 mL of cold water. Thereafter, the crystal was washed with 150 mL of cold acetonitrile and dried over night in a desiccator containing a drying agent under reduced pressure to obtain 15.6 g of Compound D as a blue crystal.

The obtained Compound B was analyzed, as a result, it was confirmed that this compound was tetrasulfonyl chloride of $\beta$-type copper(II) phthalocyanine defined in the specification, that is, $\beta$-position substitution type. Furthermore, 0.01 part of the obtained crystal was quenched by 2-ethylhexyloxypropylamine/acetone and then subjected to a purity verification by HPLC (detection wavelength: 254 nm; 0.1% acetic acid/triethylamine buffer system, THF/H$_2$O=7/3), as a result, the relative area % was 90.95% [verification as a total of Cu-Pc(—SO$_2$NH—R)$_4$ derivatives].

Synthesis Example 6

Synthesis of Compound E m-Aminobenzenesulfonyl fluoride (5.4 g) was dissolved in 50 mL of DMAc and to the resulting solution under stirring at an inner temperature of 5° C., 3.0 g of Compound D synthesized above was gradually added and reacted. After stirring at room temperature for 30 minutes, the temperature was elevated to 55° C. and the reaction solution was stirred at the same temperature for 1 hour. After cooling to 20° C., the reaction solution was poured in 300 mL of water and subsequently stirred at room temperature for 30 minutes. The precipitated crude crystal was filtered by Nutsche, washed with 100 mL of cold water and dried. The obtained crude crystal was subjected to the removal of byproducts [for example, Cu-Pc-$(SO_3X)_m(SO_2NHAr)_n$ derivative, where m+n=4 and m≠0] using silica gel column chromatography ($CH_2Cl_2$/THF) and then recrystallized from ethyl acetate to obtain 3.5 g of Compound E.

Synthesis Example 7

Synthesis of Compound 136

Compound E (3.5 g) synthesized above was dissolved in 20 mL of THF and to the resulting solution under stirring at room temperature, an aqueous saturated sodium hydrogencarbonate solution was added. The obtained solution was further stirred for 30 minutes and after the completion of reaction, saturated brine was added thereto and the precipitated crystal was filtered. The obtained crude crystal was desalted (boil-washed twice with 70% ethanol) and then recrystallized from ethanol to obtain 2.8 g of Compound 136. λmax=628.5 nm, εmax=4.30×10$^4$ (in an aqueous solution).

Synthesis Example 8

Synthesis of Compound F m-Nitroaniline (4.3 g) was dissolved in 50 mL of DMAc and to the resulting solution under stirring at an inner temperature of 5° C., 3.0 g of Compound D synthesized above was gradually added and reacted. After stirring at room temperature for 30 minutes, the temperature was elevated to 55° C. and the reaction solution was stirred at the same temperature for 1 hour. After cooling to 20° C., the reaction solution was poured in 300 mL of water and subsequently stirred at room temperature for 30 minutes. The precipitated crude crystal was filtered by Nutsche, washed with 100 mL of cold water and dried. The obtained crude crystal was subjected to the removal of by-products [for example, Cu-Pc-$(SO_3X)_m(SO_2NHAr)_n$ derivative, where m+n=4 and m≠0] using silica gel column chromatography ($CH_2Cl_2$/THF) and then recrystallized from ethyl acetate to obtain 3.8 g of Compound F.

Synthesis Example 9

Synthesis of Compound G

In a three-neck flask with a condenser tube, 150 mL of isopropyl alcohol was added and while stirring at 30° C. or less, 11.2 g of reduced iron was gradually added thereto in parts. Furthermore, an aqueous solution obtained by dissolving 0.2 g of ammonium chloride in 15 mL of water was added dropwise and the resulting solution was heated to the reflux temperature and stirred at the same temperature for 1 hour. Subsequently, a solution obtained by dissolving 3.0 g of Compound F synthesized above in 100 mL of acetone was added dropwise at the same temperature and the resulting solution was stirred at the reflux temperature for 45 minutes. Thereafter, the reaction solution was hot filtered by Celite, the filtrate was distilled in a rotary evaporator to remove the solvent and the obtained crude crystal was subjected to the removal of by-products by using silica gel column chromatography ($CH_2Cl_2$/THF) and then recrystallized from ethyl acetate to obtain 2.3 g of Compound G.

Synthesis Example 10

Synthesis of Compound 145

Compound G (1.3 g) synthesized above was dissolved in 50 mL of DMAc (N,N-dimethylacetamide) and to the resulting solution under stirring at an inner temperature of 5° C., 1.2 g of m-chlorosulfonylbenzoyl chloride was gradually added and reacted. After stirring for 30 minutes, an aqueous saturated sodium hydrogencarbonate solution was added to the reaction solution. The obtained solution was further stirred for 30 minutes and after the completion of reaction, saturated brine was added thereto and the precipitated crystal was filtered. The obtained crude crystal was desalted (boil-washed twice with 70% ethanol) and then recrystallized from ethanol to obtain 1.9 g of Compound 145. λmax=634.2 nm, εmax=3.33×10$^4$ (in an aqueous solution).

Synthesis Example 11

Synthesis of Compound 145

A β-position substitution type {Cu-Pc-{$SO_2NH$-(3-sulfophenyl) derivative was synthesized starting from Compound (H) shown below under the reaction conditions described above in detail.

The obtained compound was analyzed, as a result, this compound was the β-position substitution type derivative defined in the specification having four sulfo groups within one molecule of copper phthalocyanine and the same as the compound synthesized in Synthesis Example 10 (the synthesis route is different, however, it is apparent from the commonsense in the organic synthesis that the compounds synthesized in Synthesis Examples 4 and 8 are the same β-position substitution type copper(II) phthalocyanine), though the mixture distribution of substitution sites [each benzene nucleus has one sulfo group at the (2- or 3-position), (6- or 7-position), (10- or 11-position) and (14- or 15-position)] is slightly different.

Compound H:

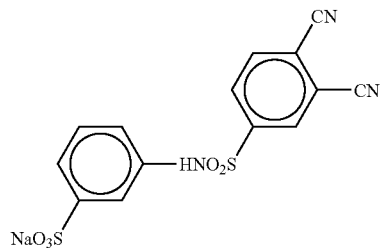

Synthesis Example 11

Synthesis of Compound 171

N-(3-Aminopropyl)diethanolamine (16.2 g) was dissolved in 100 mL of DMAc and to the resulting solution under stirring at an inner temperature of 5° C., 9.7 g of Compound D synthesized above was gradually added and reacted. After elevating the inner temperature to room temperature over 30 minutes while stirring, the reaction solution was stirred at the same temperature for 1 hour. The reaction solution was poured in 1,000 mL of isopropyl alcohol and subsequently stirred at room temperature for 30 minutes. Thereafter, 12.5 mL of concentrated hydrochloric acid was added dropwise and the precipitated crude crystal was filtered by Nutsche, washed with 200 mL of isopropyl alcohol and dried. The obtained crude crystal was hot (reflux temperature) washed using 200 mL of methanol for 1 hour and after lowering the inner temperature to room temperature, the crystal was filtered by Nutsche, washed with 100 mL of methanol and dried. The obtained crystal was subjected to the removal of by-products [for example, Cu-Pc-$(SO_3X)_m(SO_2NHAr)_n$ derivative, where m+n=4 and m≠0] using gel permeation chromatography (SEPHADEX™ LH-20, produced by Pharmacia, $H_2O$) and then recrystallized from $H_2O$/methanol/hydrochloric acid to obtain 14.2 g of Compound 171. $\lambda max=618.6.2$ nm, $\epsilon max=5.34\times10^4$ (in an aqueous solution).

Synthesis Example 12

Synthesis of Compound 172

Compound 171 (1.0 g) synthesized above was dissolved in 20 mL of DMAc and to the resulting solution under stirring at an inner temperature of 5° C., 2.0 mL of triethylamine was gradually added dropwise. To the obtained solution under stirring at an inner temperature of 5° C., 1.6 g of m-chlorosulfonylbenzoylchloride was gradually added and reacted. After stirring for 30 minutes, the reaction solution was poured in 100 mL of acetonitrile and further stirred for 30 minutes. The precipitated crystal was filtered by Nutsche, washed with 100 mL of water and then with 50 mL of acetonitrile and dried at room temperature. The obtained crystal was dissolved in 15 mL of DMAc and to the resulting solution under stirring at an inner temperature of 15° C., 1.0 mL of pyridine was gradually added dropwise. To the obtained solution under stirring at the same temperature, 3.0 mL of water was gradually added and reacted. After stirring for 60 minutes, the reaction solution was poured in 100 mL of acetonitrile and further stirred for 30 minutes. The precipitated crystal was filtered by Nutsche, washed with 100 mL of acetonitrile and dried at room temperature to obtain 1.6 g of crude crystal. The obtained crystal was subjected to the removal of by-products using gel permeation chromatography (SEPHADEX™ LH-20, produced by Pharmacia, $H_2O$) and then to the salt formation from $H_2O$/methanol/potassium acetate to obtain 1.28 g of Compound 172. $\lambda max=624.9$ nm, $\epsilon max=6.53\times10^4$ (in an aqueous solution).

Synthesis Example 13

Synthesis of Compound 173

Compound 171 (1.5 g) synthesized above was dissolved in 20 mL of DMAc and to the filtrate under stirring at room temperature, 2.0 g of methyl p-toluenesulfonate was gradually added dropwise. The obtained solution was stirred at an inner temperature of 100° C. for 160 minutes and the reaction solution was cooled to room temperature. After adding 55 mL of acetonitrile, the reaction solution was stirred at a reflux temperature for 1 hour. Thereafter, the inner temperature was lowered to room temperature and the precipitated crystal was filtered by Nutsche, washed with 50 mL of acetonitrile and dried at room temperature to obtain 1.7 g of crude crystal. The obtained crystal was subjected to the removal of by-products using gel permeation chromatography (SEPHADEX™ LH-20, produced by Pharmacia, $H_2O$) and then recrystallized from acetonitrile to obtain 1.5 g of Compound 173. $\lambda max=617.2$ nm, $\epsilon max=5.50\times10^4$ (in an aqueous solution).

Synthesis Example 14

Synthesis of Compound 181

1-(2,5-Disulfo(sodium salt)phenyl}-3-methyl-5-aminopyrazole (15.1 g) was suspended in 150 mL of DMAc and to the resulting suspension under stirring at an inner temperature of 5° C., 6.5 mL of pyridine was added dropwise and subsequently 9.7 g of Compound D synthesized above was gradually added and reacted. After stirring at 5 to 10° C. for 30 minutes, the temperature was elevated to 35° C. and the reaction solution was stirred at the same temperature for 1 hour. After cooling to 20° C., the reaction solution was filtered to remove inorganic materials and the filtrate was poured in 1,000 mL of ethyl acetate and stirred at room temperature for 30 minutes. The precipitated crude crystal was filtered by Nutsche, washed with 100 mL of ethyl acetate and dried. The obtained crude crystal was dissolved in 30 mL of water and subjected to the removal of by-products {for example, Cu-Pc-$(SO_3X)_m(SO_2NH$-heterocyclic ring$)_n$ derivative, where m+n=4 and m≠0] using gel permeation chromatography (SEPHADEX™ LH-20, produced by Pharmacia) and then to the salt formation from potassium acetate/methanol to obtain 0.0 g of crude crystal. The obtained crude crystal was desalted (boil-washed twice with 70% methanol) and then recrystallized from methanol to obtain 7.9 g of Compound 181. $\lambda max=634.9$ nm, $\epsilon max=6.05\times10^4$ (in an aqueous solution).

The obtained compound was analyzed (mass spectrometry; measured by various devices and analysis methods such as ESI-MS, elemental analysis and neutralization titration), as a result, it was confirmed that the substitution site of copper(II) phthalocyanine defined in the specification was the β-position substitution type {each benzene nucleus has one —{$SO_2NH$-heterocyclic ring} group at the (2- or 3-position), (6- or 7-position), (10- or 11-position) and (14- or 15-position) and four —{$SO_2NH$-heterocyclic ring} groups in total are present in one molecule of the copper phthalocyanine}.

Synthesis Examples of Comparative Compounds

Comparative Synthesis Example 1

(a) Synthesis of Comparative Compound 1

In a three-neck flask with a condenser tube, 150 mL of chlorosulfonic acid was added and subsequently, 25.0 g of copper phthalocyanine was gradually added in parts with stirring while keeping the temperature not to exceed 20° C. (due to generation of heat, cooling was simultaneously performed).

This mixture was heated to 100° C. over 1 hour, further heated to 135° C. over 1 hour and stirred at the same temperature for 4 hours until the generation of gas was terminated. The reaction solution was cooled to 75° C. and thereto 30 mL of thionyl chloride was added dropwise over 30 minutes. Subsequently, the reaction solution was heated to 80° C., stirred at the same temperature for 2 hours and then cooled to 10° C.

Thereafter, the reaction solution was gradually added to a mixture of 1,500 mL of water and 500 g of ice to precipitate the objective compound as a blue crystal. The temperature of the suspension was kept at 0 to 5° C. by supplementarily adding ice. The solution was further stirred at room temperature for 1 hour, then filtered by Nutsche and washed with 2,500 mL of cold water. Thereafter, the crystal was washed with 100 mL of cold acetonitrile and dried over night in a desiccator containing a drying agent under reduced pressure to obtain 35.5 g of Comparative Compound 1 shown below as a blue crystal.

The obtained compound was analyzed, as a result, it was confirmed that this compound was tetrasulfonyl chloride of copper(II) phthalocyanine of the α,β-position mixed substitution type defined in the specification and having a mixed substitution number of di-, tri- and tetra-. Furthermore, 0.01 part of the obtained crystal was quenched by 2-ethylhexyloxypropylamine/acetone and then subjected to a purity verification by HPLC (detection wavelength: 254 nm; 0.1% acetic acid/triethylamine buffer system, THF/H$_2$O=7/3), as a result, the relative area % was 80.52% [a total of Cu-Pc(—SO$_2$NH—R)$_n$ derivatives].

Comparative Compound 1:

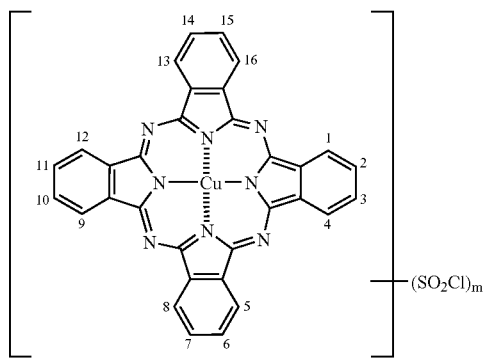

A mixture of substitution sites of 1-position to 16-position and substitution numbers of m = 4, 3 and 2.

(b) Synthesis of Comparative Compound 2

Comparative Compound 2 was synthesized using a method described in JP-A-10-130517, WO00/08101, WO00/08103 and the like and the obtained compound was analyzed. As a result, as compared with Comparative Compound 1, (1) the mixture distribution of substitution sites was slightly different, (2) the mixture distribution of substitution numbers (di-substitution product, tri-substitution product, tetra-substitution product) was slightly different and (3) the purity as sulfonyl chloride [verification as a total of Cu-Pc(—SO$_2$NH—R)$_n$ derivatives] was different. However, Comparative Compounds 1 and 2 synthesized by the method described (the synthesis method of Comparative Compound 1) both were confirmed to be sulfonyl chloride where the substitution site of copper(II) phthalocyanine defined in the specification was the α,β-mixed type and the substitution number was a mixture of di-, tri- and tetra-substitutions.

(c) Synthesis of Comparative Compound 3

In a three-neck flask with a condenser tube, 100 mL of nitrobenzene was added. After elevating the temperature to 180° C. over 1 hour, 32 g of monosodium 4-sulfophthalate, 6.0 g of phthalic anhydride, 4.7 g of ammonium chloride, 58 g of urea, 0.68 g of ammonium molybdate and 6.93 g of cupric chloride were added thereto and the resulting solution was stirred at the same temperature for 6 hours. Subsequently, the reaction solution was cooled to 40° C., 200 mL of methanol heated at 50° C. was poured in the reaction solution and the resulting solution was stirred at room temperature for 1 hour while cracking the produced solid matter. The obtained dispersion was filtered by Nutsche and washed with 400 mL of methanol. The obtained solid was added to 1,000 mL of an aqueous 1M hydrochloric acid solution saturated with sodium chloride and boiled to dissolve out unreacted copper salt. After cooling, the precipitated solid was filtered by Nutsche and washed with 100 mL of a 1M hydrochloric acid saturated brine solution. The obtained solid was dissolved in 700 mL of an aqueous 0.1M sodium hydroxide solution and the resulting solution was heated to 80° C. while stirring and then stirred at the same temperature for 1 hour. The aqueous solution was hot filtered to remove dusts and while stirring the filtrate, 270 mL of sodium chloride was gradually added, thereby salting out the solution. This salted-out solution was heated to 80° C. while stirring and then stirred at the same temperature for 1 hour. After cooling to room temperature, the precipitated crystal was filtered and washed with 150 mL of 20% brine. Subsequently, the obtained crystal was added to 200 mL of 80% ethanol, stirred under reflux for 1 hour and then cooled to room temperature. The precipitated crystal was filtered and the obtained crystal was added to 200 mL of an aqueous 60% ethanol solution, stirred under reflux for 1 hour and then cooled to room temperature. The precipitated crystal was filtered, washed with 300 mL of ethanol and then dried to obtain 26.3 g of Comparative Compound 3 shown below as a blue crystal. λmax: 629.1 nm, εmax=6.00×10$^4$ (in an aqueous solution).

The obtained compound was analyzed, as a result, it was confirmed that the substitution site of copper(II) phthalocyanine defined in the specification was the β-position substitution type {having three sulfo groups on average per one molecule of phthalocyanine; a 1:3:1 mixture of sulfo group substitution numbers of 4, 3 and 2 at the (2- or 3-position), (6- or 7-position), (10- or 11-position) and (14- or 15-position) of respective benzene nuclei (ESI-MS)}.

Comparative Compound 3:

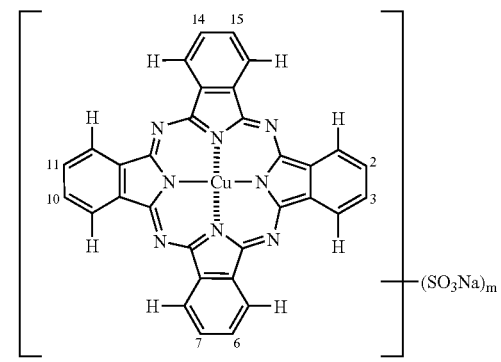

A mixture of substitution numbers of m = 4, 3 and 2.

(d) Synthesis of Comparative Compound 4

Starting from Compound (I) shown below which was synthesized by the method described in JP-A-10-204053, an α-position substitution-type copper(II) phthalocyanine derivative shown below was synthesized under the reaction conditions described in detail in that patent publication The obtained compound was analyzed, as a result, it was confirmed that the substitution site of copper(II) phthalocyanine defined in the specification was the α-position substitution type [each benzene nucleus has one sulfo group at the (1- or 4-position), (5- or 8-position), (9- or 12-position) and (13- or 16-position) and four sulfo groups in total are present in one molecule of copper phthalocyanine].

Compound I

Comparative compound 4:

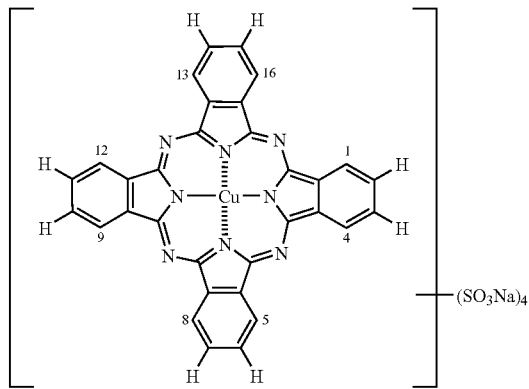

(e) Synthesis of Comparative Compound 5

Starting from both monosodium 4-sulfophthalate (raw material for β-position substitution-type derivative) and Compound (I) (raw material for α-position substitution-type derivative), an α,β-position mixed substitution-type copper (II) phthalocyanine derivative shown below was synthesized under the reaction conditions described in detail in JP-A-10-204053. The obtained compound was analyzed, as a result, it was confirmed that this compound had a mixture distribution of substitution sites {in respective benzene nuclei, (α-position+β-position=four sulfo groups and in one molecule of copper phthalocyanine, three sulfo groups on average at the β-position and one sulfo group on average at the α-position)}.

Comparative Compound 5:

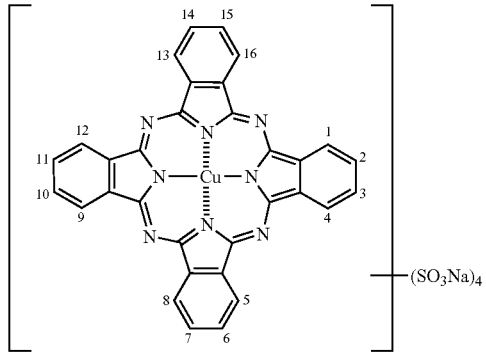

A mixture of substitution sites of 1-position to 16-position

Example 1

Deionized water was added to the following components to make 1 liter and the resulting solution was stirred for 1 hour under heating at 30 to 40° C. Thereafter, the solution was adjusted to a pH of 9 with 10 mol/L of KOH and then filtered under pressure through a microfilter having an average pore size of 0.25 μm to prepare an ink solution for cyan color.

| Composition of Ink Solution A: | |
| --- | --- |
| Phthalocyanine compound of the present invention (Compound 102) | 20.0 g |
| Diethylene glycol | 20 g |
| Glycerin | 120 g |
| Diethylene glycol monobutyl ether | 230 g |
| 2-Pyrrolidone | 80 g |
| Triethanolamine | 17.9 g |
| Benzotriazole | 0.06 g |
| Surfynol TG | 8.5 g |
| PROXEL XL2 | 1.8 g |

In the same manner as in the preparation of Ink Solution A, Ink Solutions B to E were prepared except for changing the phthalocyanine compound as shown in Table 1 below, and Comparative Ink Solution 101, 102 and 103 were prepared except for using those comparative compounds.

When the dye was changed, the dye was used such that the amount added thereof became equimolar to the dye used in Ink Solution A. In the case of using two or more dyes in combination, these were used each in an equimolar amount.

(Recording and Evaluation of Image)

Each inkjet ink of Examples (Ink Solutions A to E) and Comparative Examples (Ink Solutions 101 to 108) was subjected to the following evaluations. The results obtained are shown in Table 1.

In Table 1, the "color tone", "paper dependency", "water resistance" and "light fastness" were evaluated after an image was recorded using each inkjet ink on a photo gloss paper (PM Photographic Paper "KOTAKU" (KA420PSK, EPSON), produced by EPSON) in an inkjet printer (PM-700C, manufactured by EPSON).

<Color Tone>

The image formed on the photo gloss paper was subjected to colorimetry of the reflection spectrum at intervals of 10 nm in the region from 390 to 730 nm using GRETAG SPM100-II (manufactured by GRETAG) and a* and b* were calculated based on the CIE (International Commission on Illumination) L*a*b* color space system.

By comparing with the standard cyan color sample (a color when solid batches of proof provided from 21 companies as members of the Japan Printing Machinery Manufacturers Association were subjected to colorimetry and the printing was performed using Japan Color Ink SF-90 and Japan Paper to give a smallest color difference (ΔE) from the average value) of JAPAN Color of JNC (Japan Printing Machinery Manufacturers Association), the preferred cyan color tone was defined as follows and the following three-stage rating was performed.

Preferred Color Tone:

A color tone where with L* in the range of 53.6±0.2, a* is in the range of −35.9±6 and b* is in the range of −50.4±6.

○: a* and b* both are in the preferred ranges defined above.

Δ: Only one of a* and b* is in the preferred region defined above.

X: a* nor b* both are out of the preferred regions defined above.

The colorimetry values of the standard cyan color sample of JAPAN color used as the reference are shown below:

| | |
|---|---|
| L*: | 53.6 ± 0.2 |
| a*: | −37.4 ± 0.2 |
| b*: | −50.2 ± 0.2 |
| ΔE: | 0.4 (0.1 to 0.7) |

(1) Printer:

MANLORAND R-704, ink: JAPAN Color SF-90, paper: TOKUHISHI ART.

(2) Colorimetry:

Colorimeter: X-rite 938, 0/45, D50, 2 deg., black backing.

<Paper Dependency>

The image formed on the above-described photo gloss paper and the image separately formed on Professional Photo Paper $PR_{101}$ (QBJPRA4, produced by CANON) were compared on the color tone. The evaluation was performed by the two-stage rating, that is, A (good) is when the difference between two images is small, and B (bad) is when the difference between two images is large.

<Water Resistance>

The photo gloss paper having formed thereon an image was dried at room temperature for 1 hour, dipped in deionized water for 10 seconds and then naturally dried at room temperature. The bleeding was observed and evaluated by the three-stage rating, that is, A is no bleeding, B is slight bleeding and C is serious bleeding.

<Light Fastness>

On the photo gloss paper having formed thereon an image, xenon light (85,000 lx) was irradiated for 14 days using a weather meter (Atlas C. 165). The image density before and after the xenon irradiation was measured by a reflection densitometer (X-Rite 310TR) and evaluated as the dye residual percentage. The reflection density was measured at three points of 1, 1.5 and 2.0.

The light fastness was evaluated by the three-stage rating, that is, A is when the dye residual percentage is 70% or more at all densities, B is when less than 70% at one or two points, and C is when less than 70% at all densities.

<Dark Heat Preservability>

The photo gloss paper having formed thereon an image was stored for 14 days under the conditions of 80° C. and 15% RH. The image density before and after the storage was measured by a reflection densitometer (X-Rite 310TR) and evaluated as the dye residual percentage. The dye residual percentage was evaluated at three points having a reflection density of 1, 1.5 and 2.0. The rating is A when the dye residual percentage is 90% or more at all densities, B when less than 90% at two points, and C when less than 90% at all densities.

<Ozone Gas Resistance>

In a box set to an ozone gas concentration of 0.5±0.1 ppm, room temperature and dark place by using a Siemens-type ozonizer to which an a.c. voltage of 5 kV was applied while passing a dry air through the double glass tube, the photo gloss paper having formed thereon an image was left standing for 14 days. The image density before and after standing in the ozone gas atmosphere was measured by a reflection densitometer (X-Rite 310TR) and evaluated as the dye residual percentage. The reflection density was measured at three points of 1, 1.5 and 2.0. The ozone gas concentration in the box was set by using an ozone gas monitor (Model OZG-EM-01) manufactured by APPLICS.

The evaluation was performed by a three-stage rating, namely, rated A when the dye residual percentage was 70% or more at all densities, B when less than 70% at one or two points, and C when less than 70% at all densities.

<Oxidation Potential, Eox>

The phthalocyanine compounds used in Examples and Comparative Examples were measured under the following conditions.

A graphite electrode was used in N,N-dimethylformamide (dye concentration: 0.001 mold $m^{-3}$) containing 0.1 mold $m^{-3}$ of tetrapropylammonium perchlorate as the supporting electrolyte and the oxidation potential was measured according to d.c. polarography by using POLARTOGRAPHIC ANALYZER P-100. The oxidation potential values (vs SCE) of phthalocyanine compounds measured are shown in Table 1.

TABLE 1

| Sample No. | Dye No. | Phthalocyanine Structure, substitution site (α or β), substituent number (n) | Color Tone | Paper Dependency | Water Resistance | Light Fastness | Dark Heat Preservability | Ozone Resistance | Oxidation Potential (Eox) |
|---|---|---|---|---|---|---|---|---|---|
| Ink Solution A | 102 | β-position (n = 4) | ○ | A | A | A | A | A | 1.16 |
| Ink Solution B | 108 | β-position (n = 4) | ○ | A | A | A | A | A | 1.26 |
| Ink Solution C | 110 | β-position (n = 4) | ○ | A | A | A | A | A | 1.36 |
| Ink Solution D | 171 | β-position (n = 4) | ○ | A | A | A | A | A | 1.29 |
| Ink Solution E | 181 | β-position (n = 4) | ○ | A | A | A | A | A | 1.23 |
| Ink Solution 101 | Comparative Composition 3 | β-position (n = 4, 3, 2) | Δ | B | B | B | B | C | 0.75 |

TABLE 1-continued

| Sample No. | Dye No. | Phthalocyanine Structure, substitution site (α or β), substituent number (n) | Color Tone | Paper Dependency | Water Resistance | Light Fastness | Dark Heat Preservability | Ozone Resistance | Oxidation Potential (Eox) |
|---|---|---|---|---|---|---|---|---|---|
| Ink Solution 102 | Comparative Composition 4 | β-position (n = 4) | Δ | B | B | C | B | C | 0.80 |
| Ink Solution 103 | Comparative Composition 5 | α, β-mixture (n = 4) | Δ | B | B | B | C | C | 0.82 |

As is apparent from Table 1, the inkjet ink of the present invention has excellent color tone, low paper dependency and high resistance against water, light and ozone gas. In particular, the image preservability such as light fastness and ozone resistance is apparently excellent.

Example 2

Using the same ink as produced in Example 1, an image was printed on Inkjet Photo Gloss Paper EX produced by Fuji Photo Film Co., Ltd. by means of the same printer as used in Example 1 and evaluated in the same manner as in Example 1. Then, the same results as in Example 1 were obtained.

Example 3

The same ink as produced in Example 1 was filled in a cartridge of Inkjet Printer BJ-F850 (manufactured by CANON) and using this printer, an image was printed on Photo Gloss Paper GP-301 produced by the same company and evaluated in the same manner as in Example 1. Then, the same results as in Example 1 were obtained.

Example 4

A test was performed by using the same operation as in Example 1 except that the test method of Example 1 was changed to the following environmental test method. That is, an oxidative gas resistance test method simulating the outdoor environment exposed to oxidative gases such as exhaust gas of automobiles and to irradiation with solar light was performed according to an oxidation resistance test method using a fluorescent light irradiation chamber at a relative humidity of 80% and a hydrogen peroxide concentration of 120 ppm described in H. Iwano et al., *Journal of Imaging Science and Technology*, Vol. 38, 140–142 (1944). The test results were the same as those in Example 1.

INDUSTRIAL APPLICABILITY

According to the present invention, a novel dye having absorption properties ensuring excellent color reproduction as a dye for three primary colors and at the same time, having sufficiently high fastness to light, heat, humidity and active gases in the environment is provided;

various coloring compositions of giving a color image or a color material excellent in the color hue and fastness, for example, an ink composition for printing by ink jetting or the like, an ink sheet of a heat-sensitive transfer type image forming material, an electrophotographic toner, a coloring composition for a color filter used in LCD, PDP or CCD, and a dyeing solution for the dyeing of various fibers are provided; and an inkjet recording ink and an inkjet recording method are provided, which can form an image having good color hue due to use of the phthalocyanine compound and having high fastness to heat, water, light and active gases in the environment, particularly ozone gas.

The invention claimed is:

1. An ink comprising at least one compound represented by the following formula (I) or (II):

Formula (I):

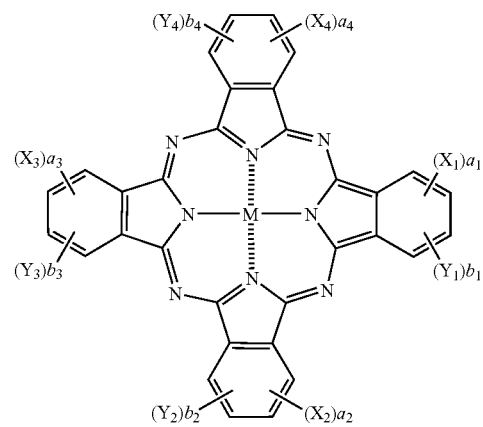

wherein $X_1$, $X_2$, $X_3$ and $X_4$ each independently represents —SO-Z or —SO$_2$-Z, wherein each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_1$ to $a_4$ and $b_1$ to $b_4$ represent a number of substituents $X_1$ to $X_4$ and $Y_1$ to $Y_4$, respectively, $a_1$ to $a_4$ each independently represents an integer of 0 to 4, provided that all are not 0 at the same time, and $b_1$ to $b_4$ each independently represents an integer of 0 to 4; and M represents a hydrogen atom, a metal element or an oxide, hydroxide or halide thereof;

provided that at least one of $X_1$, $X_2$, $X_3$, $X_4$, $Y_1$, $Y_2$, $Y_3$ and $Y_4$ is an ionic hydrophilic group or a group having an ionic hydrophilic group as a substituent;

Formula (II):

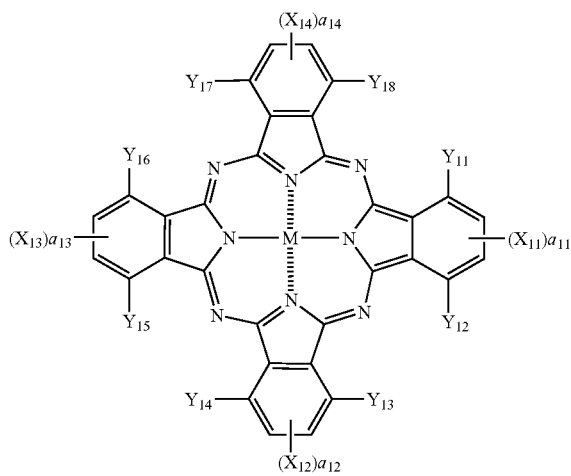

wherein $X_{11}$, $X_{12}$, $X_{13}$ and $X_{14}$ each independently represents —$SO_2NR_1R_2$ and/or a sulfo group, provided that $X_{11}$, $X_{12}$, $X_{13}$ and $X_{14}$ all are not a sulfo group at the same time, wherein $R_1$ represents, when a plurality of $R_1$s are present, each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, $R_2$ represents, when a plurality of $R_2$s are present, each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, and $R_1$ and $R_2$ may combine with each other to form a 5- or 6-membered nitrogen-containing heterocyclic ring;

wherein at least one —$SO_2NR_1R_2$ group having an ionic hydrophilic group is present at the 2-, 3-, 6-, 7-, 10-, 11-, 14- or 15-position of formula (II);

wherein when a sulfo group is directly bonded to a benzene nucleus, the sulfo group is bonded at the 2-, 3-, 6-, 7-, 10-, 11-, 14- or 15-position of formula (II);

$Y_{11}$, $Y_{12}$, $Y_{13}$, $Y_{14}$, $Y_{15}$, $Y_{16}$, $Y_{17}$ and $Y_{18}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_{11}$ to $a_{14}$ represent a number of substituents $X_{11}$ to $X_{14}$, respectively, and each independently represents an integer of 0 to 2, provided that all are not 0 at the same time; and M represents a hydrogen atom, a metal element or an oxide, hydroxide or halide thereof;

provided that at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$ and $Y_{18}$ is an ionic hydrophilic group or a group having an ionic hydrophilic group as a substituent.

2. The ink according to claim 1, wherein the compound represented by the formula (I) or (II) comprises at least one compound represented by the following formula (III) or (IV):

Formula (III):

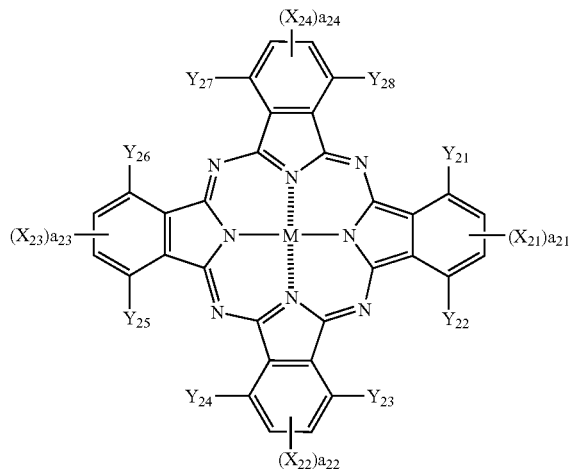

wherein $X_{21}$, $X_{22}$, $X_{23}$ and $X_{24}$ each independently represents —SO-Z and/or —$SO_2$-Z, wherein each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_{21}$, $Y_{22}$, $Y_{23}$, $Y_{24}$, $Y_{25}$, $Y_{26}$, $Y_{27}$ and $Y_{28}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_{21}$ to $a_{24}$ represent a number of substituents $X_{21}$ to $X_{24}$, respectively, and each independently represents an integer of 1 to 2; and M has the same meaning as M in the formula (I);

provided that at least one of $X_{21}$, $X_{22}$, $X_{23}$, $X_{24}$, $Y_{21}$, $Y_{22}$, $Y_{23}$, $Y_{24}$, $Y_{25}$, $Y_{26}$, $Y_{27}$ and $Y_{28}$ is an ionic hydrophilic group or a group having an ionic hydrophilic group as a substituent;

Formula (IV):

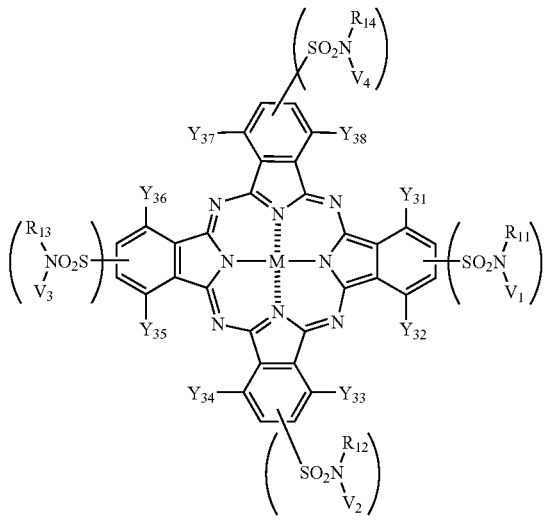

wherein $R_{11}$, $R_{12}$, $R_{13}$ and $R_{14}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$V_1$, $V_2$, $V_3$ and $V_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_{31}$, $Y_{32}$, $Y_{33}$, $Y_{34}$, $Y_{35}$, $Y_{36}$, $Y_{37}$ and $Y_{38}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent; and M has the same meaning as M in the formula (I);

provided that at least one of $R_{11}$, $R_{12}$, $R_{13}$, $R_{14}$, $V_1$, $V_2$, $V_3$, $V_4$, $Y_{31}$, $Y_{32}$, $Y_{33}$, $Y_{34}$, $Y_{35}$, $Y_{36}$, $Y_{37}$ and $Y_{38}$ is an ionic hydrophilic group or a group having an ionic hydrophilic group as a substituent.

3. The ink according to claim 1, wherein the compound represented by the formula (I) or (II) comprises at least one compound represented by the following formula (V) or (IV):

Formula (V):

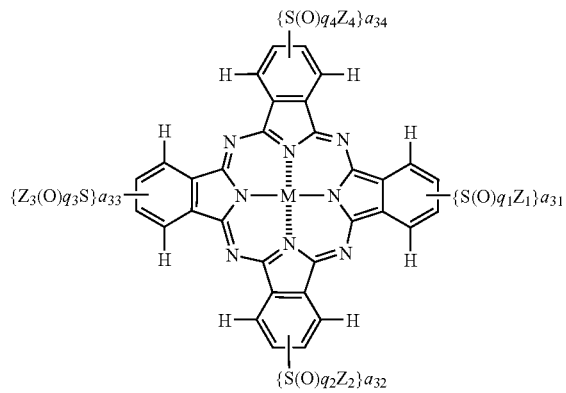

wherein $Z_{11}$, $Z_{12}$, $Z_{13}$ and $Z_{14}$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$q_1$, $q_2$, $q_3$ and $q_4$ each independently represents an integer of 1 or 2;

$a_{31}$, $a_{32}$, $a_{33}$ and $a_{34}$ each independently represents an integer of 1 or 2; and M has the same meaning as M in the formula (I);

provided that at least one of $Z_1$, $Z_2$, $Z_3$ and $Z_4$ has an ionic hydrophilic group as a substituent;

Formula (VI):

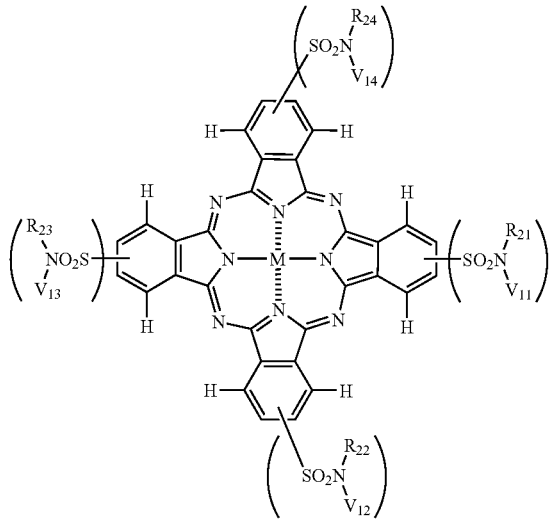

wherein $R_{21}$, $R_{22}$, $R_{23}$ and $R_{24}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$V_{11}$, $V_{12}$, $V_{13}$ and $V_{14}$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; and M has the same meaning as M in the formula (I);

provided that at least one of $R_{21}$, $R_{22}$, $R_{23}$, $R_{24}$, $V_{11}$, $V_{12}$, $V_{13}$ and $V_{14}$ has an ionic hydrophilic group as a substituent.

4. The ink according to any one of claims 1 to 3, wherein a phthalocyanine compound represented by the formulae (I) to (VI) has at least two ionic hydrophilic groups selected from the group consisting a carboxyl group, a sulfo group and a quaternary ammonium within one molecule.

5. The ink according to claim 4, wherein the ionic hydrophilic group is at least either a carboxyl group or a sulfo group.

6. The ink according to any one of claims 1 to 5, which is an inkjet recording ink.

7. The ink according to any one of claims 1 to 5, which comprises a phthalocyanine compound represented by the formulae (I) to (VI) in an amount of 0.2% by mass to 10 parts by mass per 100 parts by mass of the ink.

8. An inkjet recording method, comprising forming an image with the inkjet recording ink according to claim 6 on an image-receiving material comprising an ink-accepting layer containing a white inorganic pigment particle on a support.

9. A method for improving an ozone gas resistance of a color image material, comprising forming an image with the inkjet recording ink according to claim 6.

10. An ink comprising a phthalocyanine compound having an oxidation potential nobler than 1.0 V (vs SCE), wherein the ink comprises at least one compound represented by the following formula (I) or (II):

Formula (I)

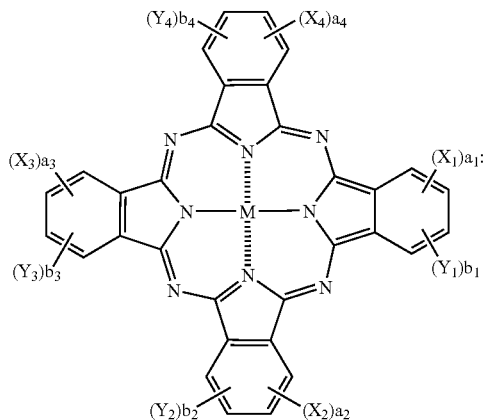

wherein $X_1$, $X_2$, $X_3$ and $X_4$ each independently represents —SO-Z or —$SO_2$-Z, wherein each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group; a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_1$ to $a_4$ and $b_1$ to $b_4$ represent a number of substituents $X_1$ to $X_4$ and $Y_1$ to $Y_4$, respectively, $a_1$ to $a_4$ each independently represents an integer of 0 to 4, provided that all are not 0 at the same time, and $b_1$ to $b_4$ each independently represents an integer of 0 to 4; and M represents a hydrogen atom, a metal element or an oxide, hydroxide or halide thereof;

provided that at least one of $X_1$, $X_2$, $X_3$, $X_4$, $Y_1$, $Y_2$, $Y_3$ and $Y_4$ is an ionic hydrophilic group or a group having an ionic hydrophilic group as a substituent:

Formula (II)

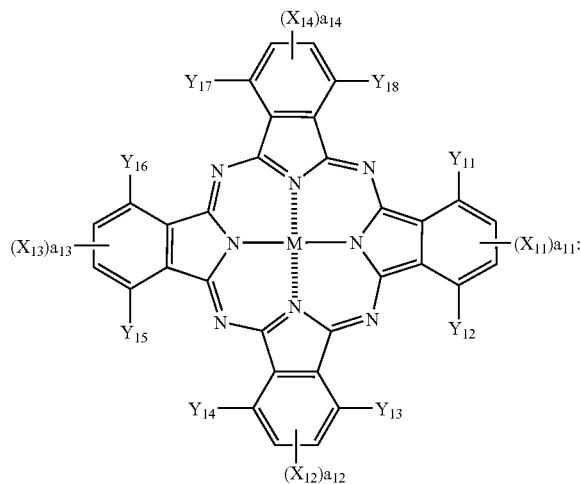

wherein $X_{11}$, $X_{12}$, $X_{13}$ and $X_{14}$ each independently represents —$SO_2NR_1R_2$ and/or a sulfo group, provided that $X_{11}$, $X_{12}$, $X_{13}$ and $X_{14}$ all are not a sulfo group at the same time, wherein $R_1$ represents, when a plurality of $R_1$s are present, each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, $R_2$, represents, when a plurality of $R_2$s are present, each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, and $R_1$ and $R_2$ may combine with each other to form a 5- or 6-membered nitrogen-containing heterocyclic ring;

wherein at least one —$SO_2NR_1R_2$ group having an ionic hydrophilic group is present at the 2-, 3-, 6-, 7-, 10-, 11-, 14- or 15-position of formula (II);

wherein when a sulfo group is directly bonded to a benzene nucleus, the sulfo group is bonded at the 2-, 3-, 6-, 7-, 10-, 11-, 14- or 15-position of formula (II);

$Y_{11}$, $Y_{12}$, $Y_{13}$, $Y_{14}$, $Y_{15}$, $Y_{16}$, $Y_{17}$ and $Y_{18}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_{11}$ to $a_{14}$ represent a number of substituents $X_{11}$ to $X_{14}$, respectively, and each independently represents an integer of 0 to 2, provided that all are not 0 at the same time; and M represents a hydrogen atom, a metal element or an oxide, hydroxide or halide thereof;

provided that at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$ and $Y_{18}$ is an ionic hydrophilic group or a group having an ionic hydrophilic group as a substituent.

11. A phthalocyanine compound represented by the formula (I) or (II):

Formula (I)

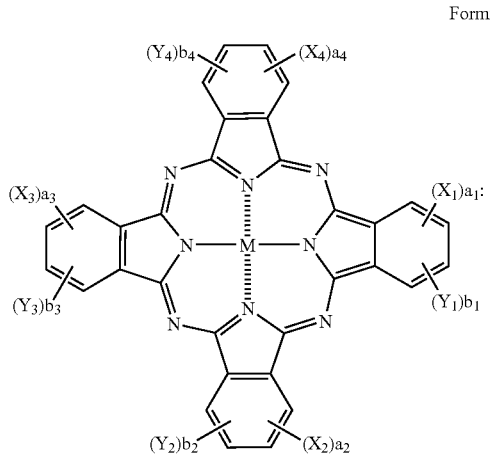

wherein $X_1$, $X_2$, $X_3$ and $X_4$ each independently represents —SO-Z or —$S_2$-Z, wherein each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_1$ to $a_4$ and $b_1$ to $b_4$ represent a number of substituents $X_1$ to $X_4$ and $Y_1$ to $Y_4$, respectively, $a_1$ to $a_1$ each independently represents an integer of 0 to 4, provided that all are not 0 at the same time, and $b_1$ to $b_4$ each independently represents an integer of 0 to 4; and M represents a hydrogen atom, a metal element or an oxide, hydroxide or halide thereof;

provided that at least one of $X_1$, $X_2$, $X_3$, $X_4$, $Y_1$, $Y_2$, $Y_3$ and $Y_4$ is an ionic hydrophilic group or a group having an ionic hydrophilic group as a substituent;

Formula (II)

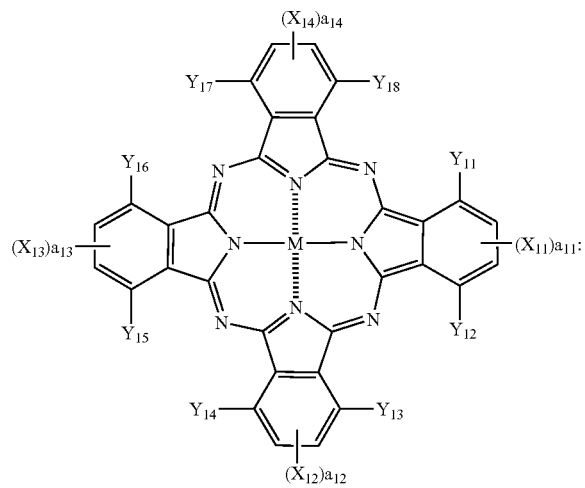

wherein $X_{11}$, $X_{12}$, $X_{13}$ and $X_{14}$ each independently represents —$SO_2NR_1R_2$ and/or a sulfo group, provided that $X_{11}$, $X_{12}$, $X_{13}$ and $X_{14}$ all are not a sulfo group at the same time, wherein $R_1$ represents, when a plurality of $R_1$s are present, each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, $R_2$ represents, when a plurality of $R_2$s are present, each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, and $R_1$ and $R_2$ may combine with each other to form a 5- or 6-membered nitrogen-containing heterocyclic ring;

wherein at least one —$SO_2NR_1R_2$ group having an ionic hydrophilic group is present at the 2-, 3-, 6-, 7-, 10-, 11-, 14- or 15-position of formula (II);

wherein when a sulfo group is directly bonded to a benzene nucleus, the sulfo group is bonded at the 2-, 3-, 6-, 7-, 10-, 11-, 14- or 15-position of formula (II);

$Y_{11}$, $Y_{12}$, $Y_{13}$, $Y_{14}$, $Y_{15}$, $Y_{16}$, $Y_{17}$ and $Y_{18}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_{11}$ to $a_{14}$ represent a number of substituents $X_{11}$ to $X_{14}$, respectively, and each independently represents an integer of 0 to 2, provided that all are not 0 at the same time; and M represents a hydrogen atom, a metal element or an oxide, hydroxide or halide thereof;

provided that at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$ and $Y_{18}$ is an ionic hydrophilic group or a group having an ionic hydrophilic group as a substituent.

12. The phthalocyanine compound according to claim 11, wherein either one of the formulae (I) or (II) is represented by either one of the following formulae (III) or (IV):

Formula (III)

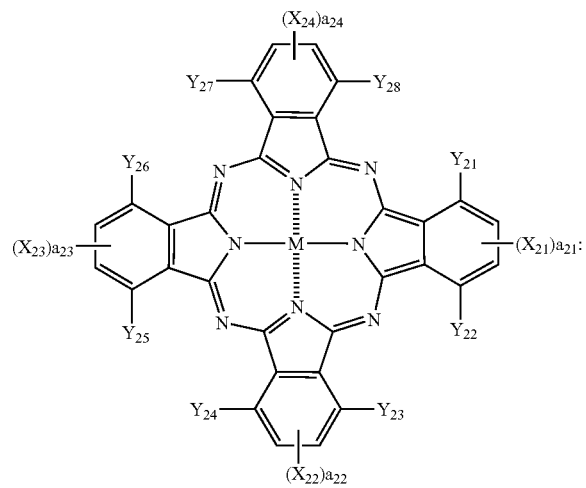

wherein $X_{21}$, $X_{22}$, $X_{23}$ and $X_{24}$ each independently represents —SO-Z and/or —$S_2$-Z, wherein each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_{21}$, $Y_{22}$, $Y_{23}$, $Y_{24}$, $Y_{25}$, $Y_{26}$, $Y_{27}$, and $Y_{28}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent;

$a_{21}$ to $a_{24}$ represent a number of substituents $X_{21}$ to $X_{24}$, respectively, and each independently represents an integer of 1 to 2; and M has the same meaning as M in the formula (I);

provided that at least one of $X_{21}$, $X_{22}$, $X_{23}$, $X_{24}$, $Y_{21}$, $Y_{22}$, $Y_{23}$, $Y_{24}$, $Y_{25}$, $Y_{26}$, $Y_{27}$ and $Y_{28}$ is an ionic hydrophilic group or a group having an ionic hydrophilic group as a substituent;

Formula (IV)

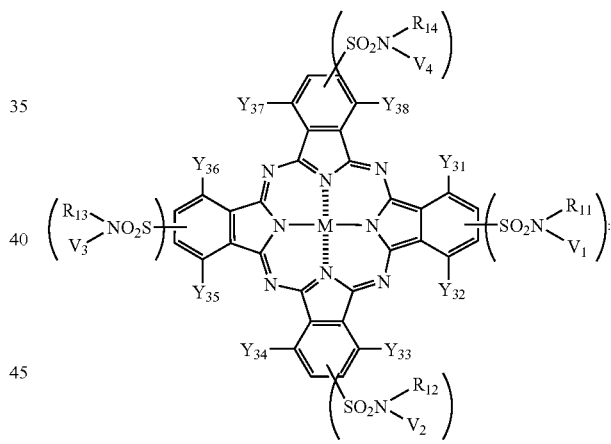

wherein $R_{11}$, $R_{12}$, $R_{13}$ and $R_{14}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$V_1$, $V_2$, $V_3$ and $V_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$Y_{31}$, $Y_{32}$, $Y_{33}$, $Y_{34}$, $Y_{35}$, $Y_{36}$, $Y_{37}$ and $Y_{38}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group or an ionic hydrophilic group, which groups each may further have a substituent; and M has the same meaning as M in the formula (I);

provided that at least one of $R_{11}$, $R_{12}$, $R_{13}$, $R_{14}$, $V_1$, $V_2$, $V_3$, $V_4$, $Y_{31}$, $Y_{32}$, $Y_{33}$, $Y_{34}$, $Y_{35}$, $Y_{36}$, $Y_{37}$ and $Y_{38}$ is an ionic hydrophilic group or a group having an ionic hydrophilic group as a substituent.

13. The phthalocyanine compound according to claim 11, wherein either one of the formulae (I) or (II) is represented by either one of the following formulae (V) or (VI):

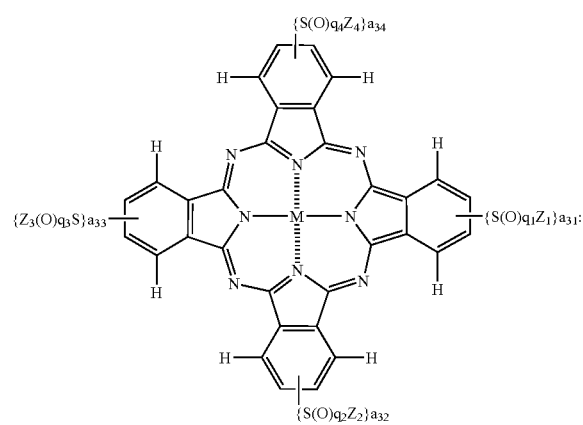

Formula (V)

wherein $Z_1$, $Z_2$, $Z_3$ and $Z_4$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$q_1$, $q_2$, $q_3$ and $q_4$ each independently represents an integer of 1 or 2;

$a_{31}$, $a_{32}$, $a_{33}$ and $a_{34}$ each independently represents an integer of 1 or 2; and M has the same meaning as M in the formula (I);

provided that at least one of $Z_1$, $Z_2$, $Z_3$ and $Z_4$ has an ionic hydrophilic group as a substituent;

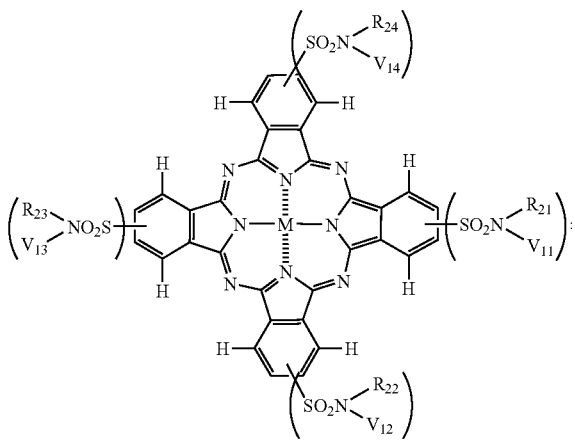

Formula (VI)

wherein $R_{21}$, $R_{22}$, $R_{23}$ and $R_{24}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group;

$V_{11}$, $V_{12}$, $V_{13}$ and $V_{14}$ each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; and M has the same meaning as M in the formula (I);

provided that at least one of $R_{21}$, $R_{22}$, $R_{23}$, $R_{24}$, $V_{11}$, $V_{12}$, $V_{13}$ and $V_{14}$ has an ionic hydrophilic group as a substituent.

14. The ink according to claim 1, wherein at least one —$SO_2NR_1R_2$ group having an ionic hydrophilic group is present at each of the 2- and/or 3-position, the 6- and/or 7-position, the 10- and/or 11-position, and the 14- and/or 15-position of formula (II).

15. The ink according to claim 10, wherein at least one —$SO_2NR_1R_2$ group having an ionic hydrophilic group is present at each of the 2- and/or 3-position, the 6-and/or 7-position, the 10- and/or 11-position, and the 14- and/or 15-position of formula (II).

16. The phthalocyanine compound according to claim 11, wherein at least one —$SO_2NR_1R_2$ group having an ionic hydrophilic group is present at each of the 2-and/or 3-position, the 6- and/or 7-position, the 10- and/or 11-position, and the 14- and/or 15-position of formula (II).

* * * * *